United States Patent
Ogawa et al.

(10) Patent No.: US 10,688,580 B2
(45) Date of Patent: Jun. 23, 2020

(54) WELDED STRUCTURE MEMBER AND MANUFACTURING METHOD THEREOF

(71) Applicant: NIPPON STEEL & SUMITOMO METAL CORPORATION, Tokyo (JP)

(72) Inventors: Masahiro Ogawa, Ashiya (JP); Shoko Oami, Yokohama (JP); Shinji Kodama, Kisarazu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 717 days.

(21) Appl. No.: 15/515,937

(22) PCT Filed: Oct. 2, 2015

(86) PCT No.: PCT/JP2015/078039
§ 371 (c)(1),
(2) Date: Mar. 30, 2017

(87) PCT Pub. No.: WO2016/052722
PCT Pub. Date: Apr. 7, 2016

(65) Prior Publication Data
US 2017/0297132 A1 Oct. 19, 2017

(30) Foreign Application Priority Data

Oct. 3, 2014 (JP) .................................. 2014-204583
Aug. 11, 2015 (JP) .................................. 2015-158817

(51) Int. Cl.
*B23K 9/025* (2006.01)
*B62D 21/11* (2006.01)
(Continued)

(52) U.S. Cl.
CPC ................ *B23K 9/025* (2013.01); *B23K 9/02* (2013.01); *B23K 31/003* (2013.01); *B62D 21/11* (2013.01); *B62D 27/02* (2013.01); *F16B 5/08* (2013.01)

(58) Field of Classification Search
CPC .......... B23K 9/025; B23K 9/02; B62D 27/02; B62D 21/11; F16B 5/08; Y10T 403/479
(Continued)

(56) References Cited

U.S. PATENT DOCUMENTS

2010/0176108 A1 7/2010 Nakajima et al.
2013/0153092 A1 6/2013 Kasuya et al.
(Continued)

FOREIGN PATENT DOCUMENTS

CN 1039201 A 1/1990
CN 101687267 A 3/2010
(Continued)

OTHER PUBLICATIONS

Chinese Office Action and Search Report, dated Jul. 19, 2018, for counterpart Chinese Application No. 201580053164.3, with a partial translation of the Search Report.
(Continued)

*Primary Examiner* — Daniel J Wiley
(74) *Attorney, Agent, or Firm* — Birch, Stewart, Kolasch & Birch, LLP

(57) ABSTRACT

This welded structure member includes a base metal member including a first surface and a second surface; a joined metal member including an abutting surface of which an end surface abuts onto the first surface; a weld bead which is formed on the first surface; and a weld overlay section which is formed on the second surface of the base metal member,
(Continued)

in which the weld bead includes a weld bead end section in a position which is separated to the front of the abutting end section.

17 Claims, 32 Drawing Sheets

(51) Int. Cl.
*B23K 9/02* (2006.01)
*B23K 31/00* (2006.01)
*B62D 27/02* (2006.01)
*F16B 5/08* (2006.01)

(58) Field of Classification Search
USPC .......................................................... 403/272
See application file for complete search history.

(56) References Cited

U.S. PATENT DOCUMENTS

| | | |
|---|---|---|
| 2015/0071703 A1 | 3/2015 | Ishida et al. |
| 2015/0196967 A1 | 7/2015 | Tsuchiya et al. |

FOREIGN PATENT DOCUMENTS

| | | |
|---|---|---|
| CN | 102770227 A | 11/2012 |
| JP | 51-014844 A | 2/1976 |
| JP | 53-141140 A | 12/1978 |
| JP | 4-135067 A | 5/1992 |
| JP | 6-63756 A | 3/1994 |
| JP | 7-299578 A | 11/1995 |
| JP | 8-118012 A | 5/1996 |
| JP | 8-132273 A | 5/1996 |
| JP | 2012-110950 A | 6/2012 |
| SU | 1698021 A1 | 12/1991 |
| WO | WO 2013/157557 A1 | 10/2013 |
| WO | WO 2014/084317 A1 | 6/2014 |

OTHER PUBLICATIONS

International Search Report for PCT/JP2015/078039 dated Dec. 28, 2015.
Written Opinion of the International Searching Authority for PCT/JP2015/078039 (PCT/ISA/237) dated Dec. 28, 2015.
Extended European Search Report, dated Jun. 25, 2018, for corresponding European Application No. 15847981.6.
Russian Notice of Allowance dated Jun. 18, 2018, issued in counterpart Russian Patent Application No. 2017111030.

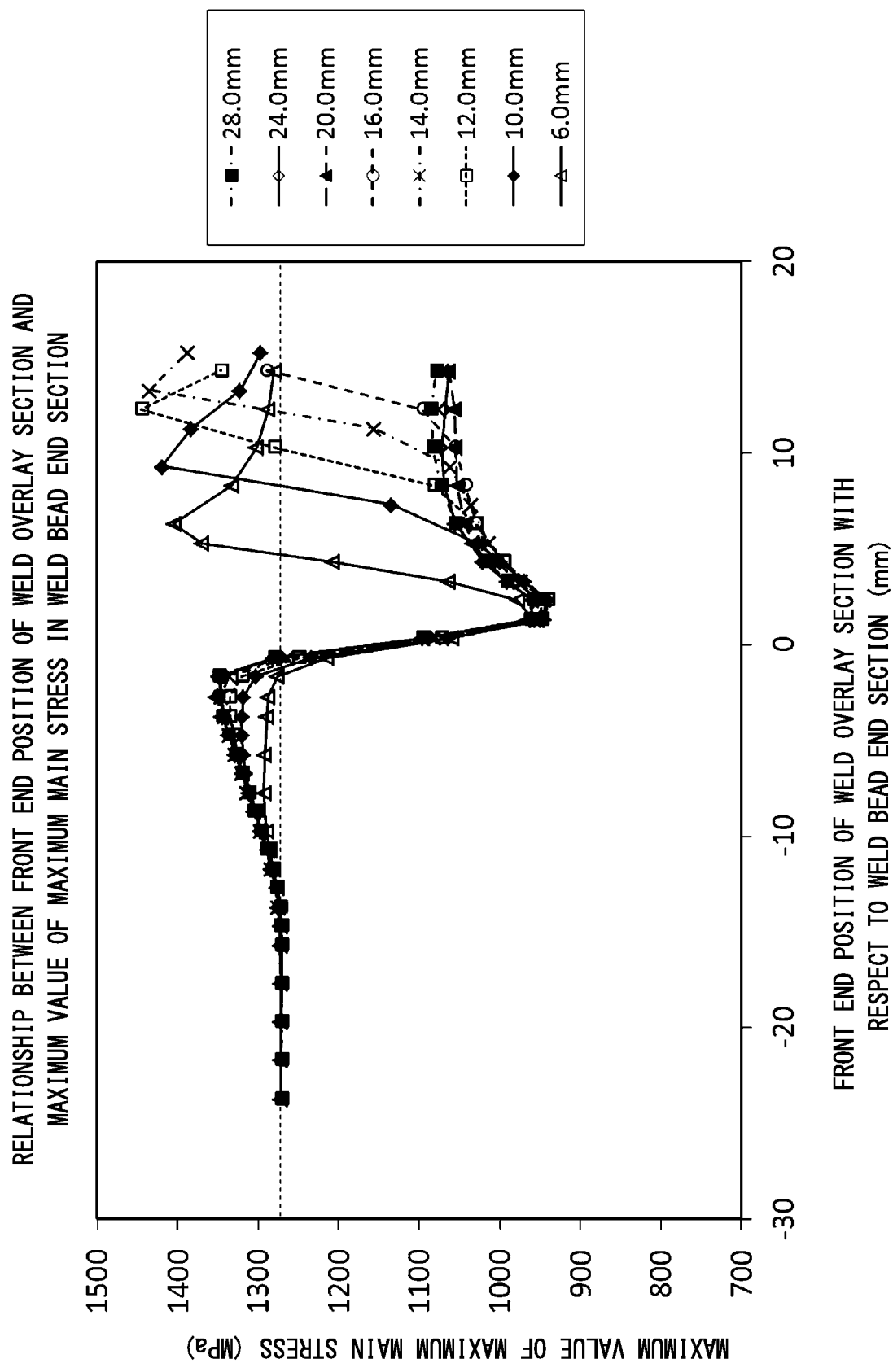

WELDED STRUCTURE MEMBER AND MANUFACTURING METHOD THEREOF

TECHNICAL FIELD OF THE INVENTION

The present invention relates to a welded structure member and a manufacturing method thereof.

Priority is claimed on Japanese Patent Application No. 2014-204583, filed on Oct. 3, 2014, and Japanese Patent Application No. 2015-158817, filed on Aug. 11, 2015, the contents of which are incorporated herein by reference.

RELATED ART

Recently, in order to improve a fuel efficiency of a vehicle, weight saving of a vehicle body has progressed. Then, in order to realize the weight saving of the vehicle body, a welded structure member in which high-strength steel sheets are welded to each other is used as a vehicle body material.

The welded structure member which is used as the vehicle body material is required to have an excellent fatigue strength. However, in the related art, it is known that even in a case of using the high-strength steel sheet, it is difficult to sufficiently improve the fatigue strength of the welded structure member. Therefore, for example, in Patent Document 1, a technology for improving the fatigue strength of the welded structure member is proposed.

A fillet arc welded joint described in Patent Document 1 includes a bead for reinforcement separately from a fillet bead which is formed at the time of performing fillet arc welding with respect to metal members. The bead for reinforcement is formed on the same plane as that of the fillet bead by using the fillet bead as a starting point. By the bead for reinforcement, it is possible to improve a fatigue strength of the welded joint.

PRIOR ART DOCUMENT

Patent Document

[Patent Document 1] PCT International Publication No. WO2013/157557

DISCLOSURE OF THE INVENTION

Problems to be Solved by the Invention

However, in a chassis section (a section supporting a suspension) of the vehicle body, a T-shaped welded joint (hereinafter, also referred to as a T-joint) is used as the welded structure member. The chassis section is a section supporting a vehicle body load, and thus, in the T-joint which is used in the chassis section, in particular, it is necessary to improve a fatigue strength.

In Patent Document 1, the T-joint formed of a vertical steel sheet and a horizontal steel sheet is also disclosed. In the T-joint of Patent Document 1, the bead for reinforcement is formed to intersect with the fillet bead joining the vertical steel sheet to the horizontal steel sheet. In Patent Document 1, it is described that the deformation of the T-joint is prevented, and fatigue life is improved, by forming the bead for reinforcement as described above.

However, in the technology of Patent Document 1, there is a case where a restriction on the manufacturing increases according to the structure of the T-joint. Hereinafter, the case will be specifically described.

As described above, in the technology of Patent Document 1, the bead for reinforcement has to be formed to intersect with the fillet bead. For this reason, when the bead for reinforcement is formed, a welding torch has to be moved to intersect with the fillet bead. At this time, in a case where the welding torch can be smoothly moved between the vertical steel sheet and the horizontal steel sheet, it is possible to easily form a suitable bead for reinforcement. However, for example, as with a T-joint 1 illustrated in FIG. 25, in a case where a vertical steel sheet 2 is welded to a horizontal steel sheet 3 by being greatly inclined, a section is generated in which the vertical steel sheet 2 and the horizontal steel sheet 3 intersect at an acute angle. In such a section, when the bead for reinforcement is formed, it is not possible to ensure a sufficient space in a movement direction of the welding torch 4 (a direction intersecting with a fillet bead 5). In this case, it is difficult to smoothly move the welding torch 4 between the vertical steel sheet 2 and the horizontal steel sheet 3, and it is not possible to easily form a suitable bead for reinforcement.

The present invention has been made for solving such problems, and an object of the present invention is to provide a configuration in which a fatigue strength can be easily improved in a welded structure member including a T-shaped joint portion.

Means for Solving the Problem

The gist of the present invention is as follows.

(1) According to a first aspect of the present invention, there is provided a welded structure member, including: a base metal member including a first surface and a second surface which are both surfaces each other; a joined metal member including an abutting surface of which an end surface abuts onto the first surface; a weld bead which is formed on the first surface, and joins the joined metal member to the base metal member; and a weld overlay section which is formed on the second surface of the base metal member, and is formed into a shape of a line such that the weld overlay section overlaps at least one of the abutting surface and the weld bead, in the view of facing the second surface and of penetrating through the base metal member, in which when a direction from an abutting end section which is an end section of the abutting surface towards a direction in which the abutting surface exists is set to the rear, and the opposite direction thereof is set to the front, the weld bead includes a weld bead end section in a position which is separated to the front of the abutting end section.

(2) In the welded structure member according to (1) described above, the weld overlay section may be disposed over a position which is separated from the abutting end section to the rear by 1.9 mm to 7.0 mm, in the view of facing the second surface and of penetrating through the base metal member.

(3) In the welded structure member according to (2) described above, a front end of the weld overlay section may be positioned from the abutting end section to the front, and a rear end of the weld overlay section may be positioned from the abutting end section to the rear, in the view of facing the second surface and of penetrating through the base metal member.

(4) In the welded structure member according to (2) or (3) described above, the weld overlay section may be parallel to the abutting surface, in the view of facing the second surface and of penetrating through the base metal member.

(5) In the welded structure member according to any one of (2) to (4) described above, a separation distance $L_W$ (mm)

between the abutting end section and the weld bead end section, and a plate thickness T (mm) of the base metal member may satisfy Expression (A) described below.

$$-0.125L_W+4.06 \text{ mm} \leq T \leq 4.5 \text{ mm} \quad \text{Expression (A)}$$

(6) In the welded structure member according to any one of (2) to (5) described above, a length of the weld overlay section may be greater than or equal to 10.0 mm.

(7) In the welded structure member according to (1) described above, the weld overlay section may be disposed over a position which is separated from the weld bead end section to the rear by 0.1 mm to 3.0 mm, in the view of facing the second surface and of penetrating through the base metal member.

(8) In the welded structure member according to (7) described above, a front end of the weld overlay section may be positioned from the weld bead end section to the front, and a rear end of the weld overlay section may be positioned from the weld bead end section to the rear, in the view of facing the second surface and of penetrating through the base metal member.

(9) In the welded structure member according to (7) or (8) described above, the weld overlay section may be parallel to the weld bead, in the view of facing the second surface and of penetrating through the base metal member.

(10) In the welded structure member according to any one of (7) to (9) described above, a separation distance $L_W$ (mm) between the abutting end section and the weld bead end section, and a plate thickness T (mm) of the base metal member may satisfy Expression (B) described below.

$$0.8 \text{ mm} \leq T < -0.125L_W+4.06 \text{ mm} \quad \text{Expression (13)}$$

(11) In the welded structure member according to any one of (7) to (10) described above, a length of the weld overlay section may be greater than or equal to 6.0 mm.

(12) In the welded structure member according to any one of (1) to (11) described above, a height of the weld overlay section from the second surface may be 2.0 mm to 20.0 mm.

(13) In the welded structure member according to any one of (1) to (12) described above, the weld overlay section may be a weld overlay bead which is not involved in the joint between the base metal member and the other member.

(14) In the welded structure member according to any one of (1) to (13) described above, the weld overlay section may be formed to enter the base metal member.

(15) In the welded structure member according to any one of (1) to (14) described above, the weld bead may not penetrate through the base metal member.

(16) In the welded structure member according to any one of (1) to (15) described above, the base metal member may be a steel sheet having a tensile strength of greater than or equal to 270 MPa.

(17) According to a second aspect of the present invention, there is provided a method of manufacturing the welded structure member according to any one of (1) to (16) described above, the method including: a weld bead applying step of applying a weld bead which joins the first surface of the base metal member to the end surface of the joined metal member by the abutting surface; and a weld overlay section applying step of applying the weld overlay section onto the second surface of the base metal member by arc welding or brazing, before the weld bead applying step or after the weld bead applying step.

Effects of the Invention

According to the present invention, it is possible to improve a fatigue strength of the welded structure member by a simple configuration, that is, by forming the linear weld overlay section on the second surface (a rear surface) of the base metal member. In this case, a restriction on the manufacturing decreases, and it is possible to easily improve the fatigue strength of the welded structure member. Specifically, for example, even in a case where a plate-like section of the joined metal member is welded to a plate-like section of the base metal member by being greatly inclined, it is not necessary to form the weld overlay section between both of the plate-like sections, and thus, the restriction on the manufacturing does not increase. Accordingly, it is possible to easily manufacture the welded structure member of which the fatigue strength is improved.

BRIEF DESCRIPTION OF THE DRAWINGS

FIG. 15A is a graph illustrating a relationship between the front end position of the weld overlay section with respect to a weld bead end section and the maximum value of the maximum main stress in the weld bead end section at each length of the weld overlay section, which is obtained by the computer analysis.

EMBODIMENTS OF THE INVENTION

The present inventors have conducted intensive studies about a configuration in which a fatigue strength can be easily improved in a T-welded joint member obtained by welding a front surface of a horizontal plate to an end surface of a vertical plate with a weld bead. As a result thereof, the present inventors have newly found that:

(a) in a case where a weld overlay bead is formed on a rear surface of the horizontal plate (a surface on which a joint portion with respect to the vertical plate does not exist), an effect of reducing a maximum main stress is high, and workability is not impaired, and thus, it is possible to efficiently improve a fatigue strength, compared to a case where the weld overlay bead is formed on the front surface of the horizontal plate.

Further, the present inventors have newly found that:

(b) in the horizontal plate configuring the T-welded joint member, the value of the maximum main stress which is generated in the vicinity of the joint portion increases in the vicinity of an end section of the joint portion or in the vicinity of an end section of the weld bead, and a fatigue fracture occurs from such a position;

(c) the maximum main stress in the vicinity of the end section of the joint portion tends to be larger than the maximum main stress in the vicinity of the end section of the weld bead as the thickness of the horizontal plate increases, and the maximum main stress in the vicinity of the end section of the weld bead tends to be larger than the maximum main stress in the vicinity of the end section of the joint portion as the thickness of the horizontal plate decreases; and (d) in a case where the vertical plate is pulled in a direction perpendicular to the front surface of the horizontal plate, the direction of the maximum main stress which is generated in the vicinity of the joint portion between the vertical plate and the horizontal plate is parallel to a stretching direction of the joint portion or the weld bead.

Hereinafter, the present invention will be described in detail on the basis of a first embodiment and a second embodiment.

First Embodiment

Figure 1:
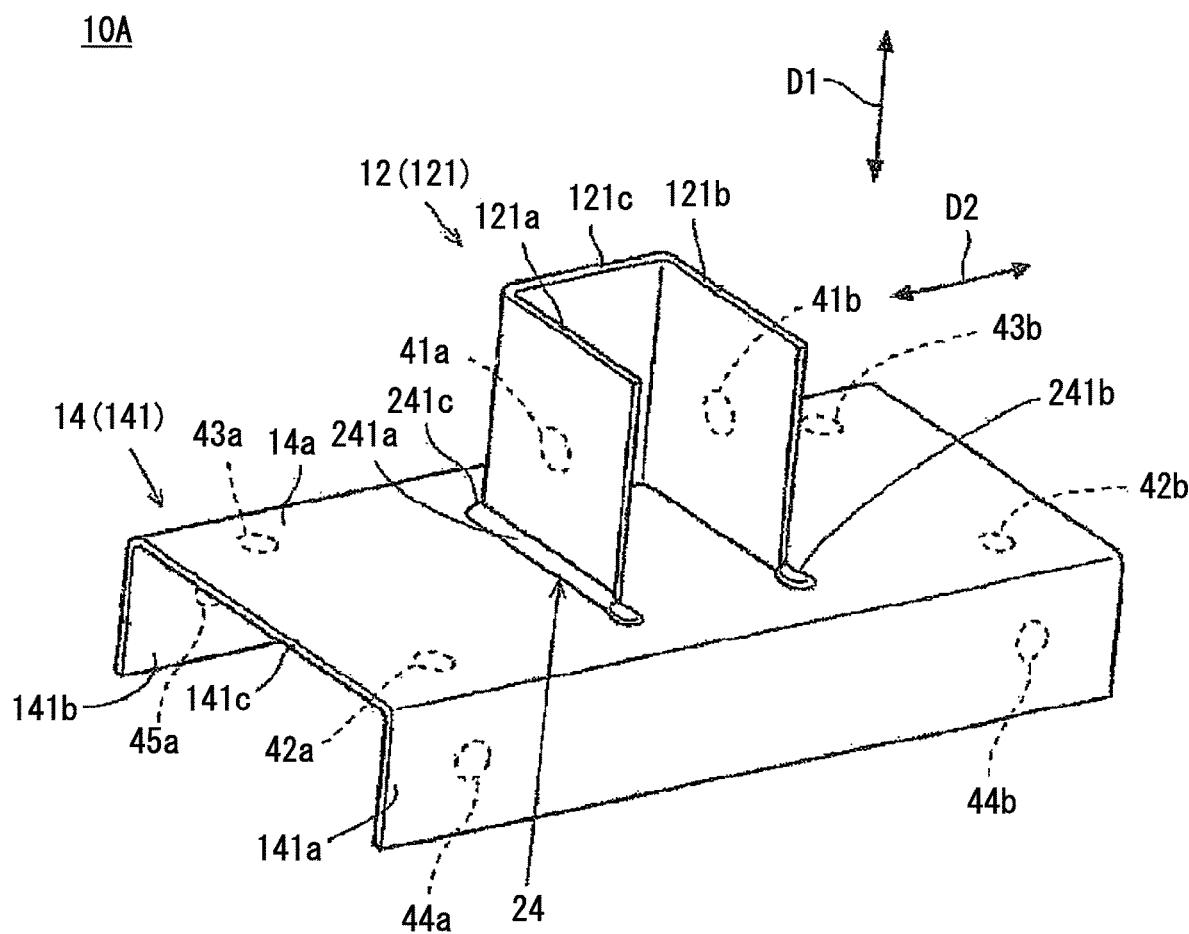
FIG. 1 is a perspective view illustrating a welded structure member 10A according to a first embodiment of the present invention.
Figure 2:
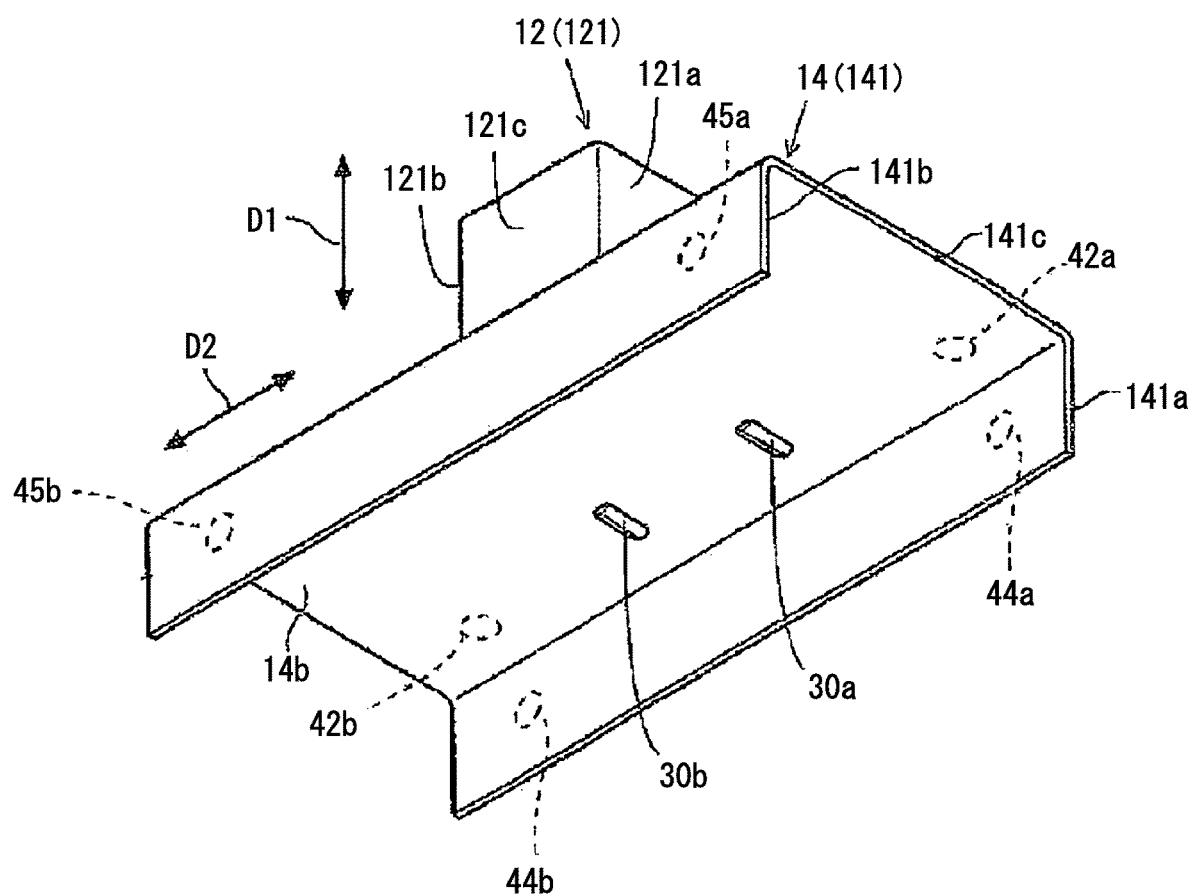
FIG. 2 is a perspective view of the welded structure member 10A according to the same embodiment seen from a lower side.
Figure 3:
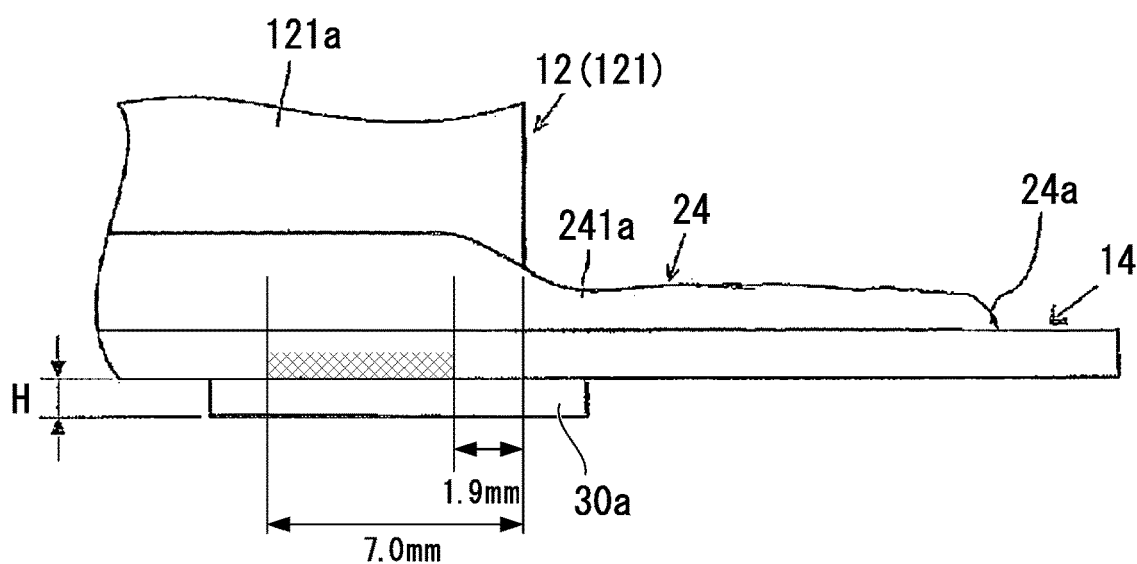
FIG. 3 is a side view illustrating a part of the welded structure member 10A according to the same embodiment.
Figure 4:
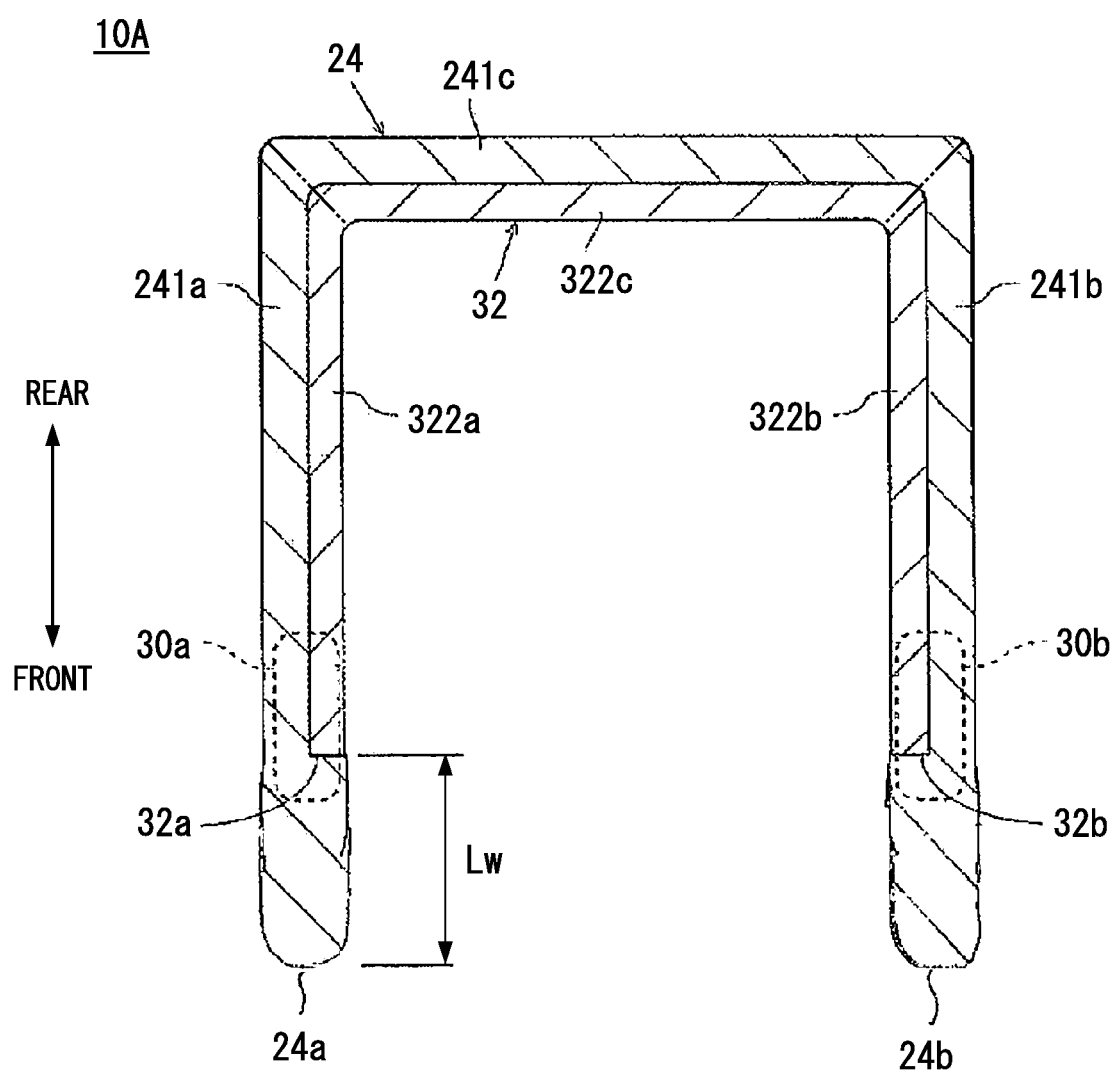
FIG. 4 is a projection view of an abutting surface, a weld bead, and a weld overlay section of the welded structure member 10A according to the same embodiment.

FIG. 1 is a perspective view illustrating a welded structure member 10A according to a first embodiment of the present invention, FIG. 2 is a perspective view of the welded structure member 10A seen from a lower side, FIG. 3 is a side view illustrating a part of the welded structure member 10A, and FIG. 4 is a projection view of an abutting surface 32, a weld bead 24, and weld overlay sections 30a and 30b of the welded structure member 10A. Furthermore, in FIG. 1 and FIG. 2, dotted circles 41a, 41b, 42a, 42b, 43a, 43b, 44a, 44b, 45a, and 45b illustrate positions of holes formed on an analysis model in a simulation described below. The details thereof will be described below.

As illustrated in FIG. 1, the welded structure member 10A according to this embodiment includes a joined metal member 12 which extends in a first direction D1, a base metal member 14 which extends in a second direction D2 intersecting with the first direction D1 and to which an end surface of the joined metal member 12 is joined, the weld bead 24 which joins the joined metal member 12 to the base metal member 14, and the weld overlay sections 30a and 30b which are formed on a rear surface of the base metal member 14.

The welded structure member 10A is a so-called T-joint, in which a joint portion joins the joined metal member 12 and the base metal member 14 to have a T-shape. In a case of projecting the welded structure member 10A according to this embodiment in a direction parallel to a front surface 14a described below, the joint portion between the joined metal member 12 and the base metal member 14 has a T-shape.

In the welded structure member 10A according to this embodiment, the first direction D1 is perpendicular to the second direction D2, and the first direction D1 may be inclined to the second direction D2. That is, in the welded structure member 10A according to this embodiment, the joined metal member 12 is welded to the base metal member 14 to be perpendicular to the base metal member 14, and the joined metal member 12 may be welded to the base metal member 14 to be inclined to the base metal member 14. Furthermore, in the following description, the first direction D1 is set to a vertical direction, and the second direction D2 is set to a right-left direction.

The joined metal member 12 is configured with a plate-like metal member. In addition, the joined metal member 12 is configured with a plate-like section 121 having an opened cross-sectional shape. The plate-like section 121 of the joined metal member 12 includes a pair of side wall sections 121a and 121b, and a bottom wall section 121c. The pair of side wall sections 121a and 121b is disposed in parallel such that the surfaces of the side wall sections 121a and 121b face each other. The bottom wall section 121c is disposed to connect one end section of the side wall section 121a to one end section of the side wall section 121b.

The base metal member 14 is configured with a plate-like metal member, and includes a front surface 14a and a rear surface 14b which are both surfaces each other. In addition, the base metal member 14 is configured with a plate-like section 141 having an opened cross-sectional shape. The plate-like section 141 of the base metal member 14 includes a pair of side wall sections 141a and 141b, and a top plate section 141c. The pair of side wall sections 141a and 141b is disposed in parallel such that the surfaces of the side wall sections 141a and 141b face each other. The top plate section 141c is disposed to connect one end section of the side wall section 141a to one end section of the side wall section 141b.

In the following description, in a front surface of the base metal member 14, a section corresponding to a front surface of the top plate section 141c will be referred to as the front surface 14a of the base metal member 14, and in the rear surface of the base metal member 14, a section corresponding to a rear surface of the top plate section 141c will be referred to as the rear surface 14b of the base metal member 14.

In addition, a joint interface between the end surface of the joined metal member 12 and the front surface 14a of the base metal member 14 will be referred to as the abutting surface 32. Further, a direction towards a direction in which the abutting surface 32 exists will be referred to as the rear, and the opposite direction thereof will be referred to as the front, on the basis of abutting end sections 32a and 32b which are end sections of the abutting surface 32.

When the joined metal member 12 is welded to the base metal member 14, a part of the joined metal member 12 and a part of the base metal member 14 are melted, and thus, in a state of actually welding both of the members to each other, it is not possible to obviously define the abutting surface 32 which is the joint interface. Therefore, in the present invention, when the joined metal member 12 is welded to the base metal member 14, the abutting surface 32 is defined by assuming that both of the members are not melted (in other words, by assuming that the joined metal member 12 and the base metal member 14 maintain the shape before being welded). Therefore, in the present invention, in a case where the abutting surface 32 and the end surface of the joined metal member 12 are seen from a direction perpendicular to the front surface 14a of the base metal member 14, an outer edge of the abutting surface 32 is coincident with an outer edge of the end surface of the joined metal member 12.

Each of the joined metal member 12 and the base metal member 14, for example, can be obtained by performing bending with respect to a metal sheet. The material of the metal sheet is not particularly limited, and may be steel or aluminum. As an example, a steel sheet having a tensile strength of greater than or equal to 270 MPa can be used as the material of the joined metal member 12 and the base metal member 14. In particular, in order to sufficiently ensure the strength of the welded structure member 10A, it is preferable to use a steel sheet having a tensile strength of greater than or equal to 590 MPa, it is more preferable to use a steel sheet having a tensile strength of greater than or equal to 780 MPa, it is even more preferable to use a steel sheet having a tensile strength of greater than or equal to 980 MPa, it is even more preferable to use a steel sheet having a tensile strength of greater than or equal to 1,180 MPa, and it is even more preferable to use a steel sheet having a tensile strength of greater than or equal to 1,500 MPa, as the material of the joined metal member 12 and the base metal member 14.

The thickness of the base metal member 14, for example, may be equivalent to the thickness of a steel sheet which is well used as the material of a vehicle chassis member. Specifically, the thickness of the base metal member 14 may be set to be in a range of 0.8 mm to 4.5 mm.

Here, as described below, in the welded structure member 10A according to this embodiment, the weld overlay sections 30a and 30b are disposed to reduce a maximum main stress in the vicinity of the abutting end sections 32a and 32b. The maximum main stress in the vicinity of the abutting end sections 32a and 32b tends to be larger than a maximum main stress in the vicinity of the weld bead end sections 24a and 24b as the thickness of the base metal member 14 increases, and thus, in order to reduce a maximum main stress of the welding metal member 10A according to this embodiment, it is effective that the weld overlay sections 30a and 30b are disposed in the vicinity of the abutting end sections 32a and 32b.

As a result of conducting further studies by the present inventors on the basis of the tendency described above, it has been found that in the welded structure member 10A according to this embodiment, it is preferable to set a separation distance $L_W$ (mm) between the abutting end sections 32a and 32b and the weld bead end sections 24a and 24b, and a plate thickness T (mm) of the base metal member 14 to satisfy Expression (A) described below.

$$-0.125L_W+4.06 \leq T \leq 4.5 \qquad \text{Expression (A)}$$

Here, even in a case where Expression (A) is not satisfied, it is preferable that the weld overlay sections 30a and 30b are disposed in the vicinity of the abutting end sections 32a and 32b. This is because it is possible to reduce the maximum main stress in the vicinity of the abutting end sections 32a and 32b.

Furthermore, the thickness of the joined metal member 12 can be selected according to the performance which is required for the member.

The weld bead 24 is formed approximately into an U-shape in the plan view along the abutting surface 32, and the end surface of the joined metal member 12 is joined to the front surface 14a of the base metal member 14.

In this embodiment, the weld bead 24 includes a side wall bead section 241a which joins the side wall section 121a of the joined metal member 12 to the front surface 14a of the base metal member 14, a side wall bead section 241b which joins the side wall section 121b of the joined metal member 12 to the front surface 14a of the base metal member 14, and a bottom wall bead section 241c which joins the bottom wall section 121c of the joined metal member 12 to the front surface 14a of the base metal member 14. The weld bead 24, for example, is formed by arc welding.

In this embodiment, the weld bead 24 is formed from the front surface 14a of the base metal member 14 to a predetermined depth position in a plate thickness direction of the base metal member 14. That is, the weld bead 24 is formed not to penetrate through the base metal member 14. Here, the weld bead 24 may be formed to penetrate through the base metal member 14.

The weld bead 24 includes the weld bead end sections 24a and 24b in each position separated to the front from the abutting end sections 32a and 32b of the abutting surface 32 between the joined metal member 12 and the base metal member 14. It is preferable that the separation distance $L_W$ (mm) between the abutting end sections 32a and 32b and the weld bead end sections 24a and 24b is set to satisfy Expression (A) described above in consideration of the plate thickness T of the base metal member 14.

Furthermore, a bead formed between the joined metal member 12 and the base metal member 14 is defined as the weld bead 24 by assuming that the joined metal member 12 and the base metal member 14 maintain the shape before being welded.

The weld overlay sections 30a and 30b are weld overlay beads which are not involved in the joint between the base metal member 14 and the other member, and are formed on the rear surface 14b of the base metal member 14 into the shape of a line, as illustrated in FIG. 2 to FIG. 4.

The weld overlay section 30a is disposed to correspond to the side wall section 121a of the joined metal member 12, and the weld overlay section 30b is disposed to correspond to the side wall section 121b of the joined metal member 12. The weld overlay sections 30a and 30b, for example, are formed by arc welding or brazing by using a welding material. In a case where the weld overlay sections 30a and 30b are formed by the arc welding, the weld overlay sections 30a and 30b are formed to enter the base metal member 14, and thus, it is possible to reduce the maximum main stress in the vicinity of the abutting end sections 32a and 32b and to further improve a fatigue strength of the welded structure member.

Furthermore, beads which are formed on the rear surface 14b of the plate-like section 141 are defined as the weld overlay sections 30a and 30b by assuming that the shape of the plate-like section 141 before forming the weld overlay sections 30a and 30b is maintained.

The weld overlay sections 30a and 30b are formed on the rear surface 14b of the base metal member 14, and thus, a restriction on the manufacturing decreases compared to a case of being formed on the front surface 14a of the base metal member 14. For example, even in a case where the plate-like section 121 is welded to the plate-like section 141 by being greatly inclined, the weld overlay sections 30a and 30b may be formed on the rear surface 14b of the plate-like section 141 but not between the plate-like section 121 and the plate-like section 141, and thus, it is possible to easily form the weld overlay sections 30a and 30b. Accordingly, it is possible to easily manufacture the welded structure member 10A.

Further, in a case where the weld overlay sections 30a and 30b are formed on the rear surface 14b of the base metal member 14, for example, in a case where the welded structure member 10A is used as a vehicle body material, it is possible to form the weld overlay sections 30a and 30b in a position where the weld overlay sections 30a and 30b are not exposed to the appearance. In this case, it is possible to prevent the sense of beauty of a vehicle body from being impaired by the weld overlay sections 30a and 30b.

The length of each of the weld overlay sections 30a and 30b in a front-rear direction may be greater than or equal to 6.0 mm, is preferably greater than or equal to 10.0 mm, is more preferably greater than or equal to 14.0 mm, and is even more preferably greater than or equal to 20.0 mm.

The width of each of the weld overlay sections 30a and 30b is preferably greater than or equal to 5.0 mm, and is more preferably greater than or equal to 6.0 mm. In addition, it is preferable that the width of each of the weld overlay sections 30a and 30b is greater than the thickness of the joined metal member 12, that is, the width of the abutting surface 32. Even in a case where the width of the weld overlay sections 30a and 30b is greater than 40.0 mm, an effect of reducing the maximum main stress in the vicinity of the abutting end sections 32a and 32b is saturated, and a component weight and a work rate increase. Therefore, the width of the weld overlay sections 30a and 30b is preferably less than or equal to 30.0 mm, and is more preferably less than or equal to 20.0 mm.

As illustrated in FIG. 3, it is preferable that a height H of the weld overlay section 30a, that is, a protruding height from the rear surface 14b of the base metal member 14 is greater than or equal to 2.0 mm. Even in a case where the height H of the weld overlay section 30a is greater than 20.0 mm, the effect of reducing the maximum main stress in the vicinity of the abutting end sections 32a and 32b is saturated, and the component weight and the work rate increase. Therefore, the height H of the weld overlay section 30a is preferably less than or equal to 20.0 mm, and is more preferably less than or equal to 10.0 mm. The same applies to the height of the weld overlay section 30b.

In a case where the joined metal member 12 is pulled in a direction perpendicular to the front surface of the base metal member 14, the direction of a maximum main stress which is generated in the vicinity of an abutting end section of the base metal member 14 is a direction parallel to a stretching direction of a abutting surface. Accordingly, it is preferable that the weld overlay sections 30a and 30b are formed to be approximately parallel to the abutting surface 32.

In other words, it is preferable that the weld overlay sections 30a and 30b are formed to be parallel to the stretching direction of the abutting surface, in the view of facing the rear surface 14b of the base metal member 14 and of penetrating through the base metal member 14. Specifically, it is preferable that the weld overlay section 30a is approximately parallel to an abutting side surface 322a and the side wall bead section 241a, and the weld overlay section 30b is approximately parallel to an abutting side surface 322b and the side wall bead section 241b.

Hereinafter, a positional relationship in the abutting surface 32, the weld bead 24, and the weld overlay sections 30a and 30b of the welded structure member 10A according to this embodiment will be described.

FIG. 4 is a diagram in which the abutting surface 32, the weld bead 24, and the weld overlay sections 30a and 30b are projected in the direction perpendicular to the front surface 14a of the base metal member 14 (in this embodiment, the first direction D1). Furthermore, in FIG. 4, for the sake of easily understanding the positional relationship in the abutting surface 32, the weld bead 24, and the weld overlay sections 30a and 30b, a section is hatched in which the abutting surface 32 and the weld bead 24 are projected. In addition, an outer edge of the section is illustrated by a broken line in which the weld overlay sections 30a and 30b are projected.

As illustrated in FIG. 4, in the welded structure member 10A according to this embodiment, the abutting surface 32 includes a pair of abutting end sections 32a and 32b, and extends approximately into an U-shape from the abutting end section 32a towards the abutting end section 32b. Specifically, the abutting surface 32 includes the abutting side surfaces 322a and 322b, and an abutting bottom surface 322c. The abutting bottom surface 322c is an abutting surface between the bottom wall section 121c of the joined metal member 12 (refer to FIG. 1) and the plate-like section 141 of the base metal member (refer to FIG. 1). The abutting side surface 322a is an abutting surface between the side wall section 121a (refer to FIG. 1) and the plate-like section 141. The abutting side surface 322b is an abutting surface between the side wall section 121*b* (refer to FIG. 1) and the plate-like section 141. The abutting side surface 322*a* linearly extends from the abutting bottom surface 322*c* towards one abutting end section 32*a* of the abutting surface 32, and abutting side surface 322*b* linearly extends from the abutting bottom surface 322*c* towards the other abutting end section 32*b* of the abutting surface 32. In this embodiment, each of the abutting side surfaces 322*a* and 322*b* corresponds to a linear section. Furthermore, in FIG. 4, each of a boundary between the abutting bottom surface 322*c* and the abutting side surfaces 322*a* and 322*b* and a boundary between the bottom wall bead section 241*c* and the side wall bead sections 241*a* and 241*b* is illustrated by a two-dot chain line.

In the welded structure member 10A according to this embodiment, a front end of the weld overlay sections 30*a* and 30*b* is disposed on the front from a position which is separated from the abutting end sections 32*a* and 32*b* to the rear by 1.9 mm, and a rear end of the weld overlay sections 30*a* and 30*b* is disposed on the rear from a position which is separated from the abutting end sections 32*a* and 32*b* to the rear by 7.0 mm, in the view of facing the rear surface 14*b* of the base metal member 14 and of penetrating through the base metal member 14. That is, in the rear surface 14*b* of the base metal member 14, the weld overlay section 30*a* is formed to cover a region illustrated by cross-hatching in FIG. 3.

In addition, it is preferable that the front end of the weld overlay sections 30*a* and 30*b* is positioned on the front from the abutting end sections 32*a* and 32*b*, the rear end of the weld overlay sections 30*a* and 30*b* is positions on the rear from the abutting end sections 32*a* and 32*b*, in the view of facing the rear surface 14*b* of the base metal member 14 and of penetrating the base metal member 14.

The front end of the weld overlay sections 30*a* and 30*b* may extend up to the vicinity of the weld bead end sections 24*a* and 24*b*. Specifically, the front end of the weld overlay sections 30*a* and 30*b* may extend up to the front from the position which is separated from the weld bead end sections 24*a* and 24*b* to the rear by 0.1 mm. In this case, it is also possible to reduce the maximum main stress in the vicinity of the weld bead end sections 24*a* and 24*b*.

As illustrated in FIG. 4, the weld overlay sections 30*a* and 30*b* overlap the abutting surface 32 and the weld bead 24 in the vicinity of the abutting end sections 32*a* and 32*b*. Specifically, the weld overlay section 30*a* is disposed to correspond to the abutting side surface 322*a*, and overlaps the abutting side surface 322*a* and the side wall bead section 241*a* in the vicinity of the abutting end section 32*a*. The weld overlay section 30*b* is disposed to correspond to the abutting side surface 322*b*, and overlaps the abutting side surface 322*b* and the side wall bead section 241*b* in the vicinity of the abutting end section 32*b*.

Furthermore, in an example illustrated in FIG. 4, the weld overlay sections 30*a* and 30*b* overlap the abutting surface 32 and the weld bead 24, and the weld overlay sections 30*a* and 30*b* may overlap only one of the abutting surface 32 and the weld bead 24.

It is preferable that the rear end of the weld overlay section 30*a* is disposed on the rear from a position which is separated from the abutting end sections 32*a* and 32*b* to the rear by 8.0 mm, it is more preferable that the rear end of the weld overlay section 30*a* is disposed on the rear from a position which is separated from the abutting end sections 32*a* and 32*b* to the rear by 10.0 mm, and it is even more preferable that the rear end of the weld overlay section 30*a* is disposed on the rear from a position which is separated from the abutting end sections 32*a* and 32*b* to the rear by 14.0 mm.

It is preferable that the front end of the weld overlay section 30*a* is disposed on the front from a position which is separated from the abutting end sections 32*a* and 32*b* to the rear by 0.4 mm, it is more preferable that the front end of the weld overlay section 30*a* is disposed on the front from a position which is separated from the abutting end sections 32*a* and 32*b* to the front by 0.3 mm, it is even more preferable that the front end of the weld overlay section 30*a* is disposed on the front from a position which is separated from the abutting end sections 32*a* and 32*b* to the front by 0.7 mm, and it is even more preferable that the front end of the weld overlay section 30*a* is disposed on the front from a position which is separated from the abutting end sections 32*a* and 32*b* to the front by 1.7 mm.

A manufacturing method of the welded structure member 10A includes a weld bead applying step of applying the weld bead 24 which joins the end surface of the joined metal member 12 to the front surface 14*a* of the base metal member 14, and a weld overlay section applying step of applying the weld overlay sections 30*a* and 30*b* onto the rear surface 14*b* of the base metal member 14 by arc welding or brazing. Any one of the weld bead applying step and the weld overlay section applying step may be performed first, and it is preferable that the weld bead applying step is performed, and then, the weld overlay section applying step is performed, from the viewpoint of workability.

According to the configuration described above, rigidity in the vicinity of the abutting end sections 32*a* and 32*b* is increased by the weld overlay sections 30*a* and 30*b*, and thus, it is possible to reduce the maximum main stress. Therefore, it is possible to increase the fatigue strength of the welded structure member 10A.

Figure 5:
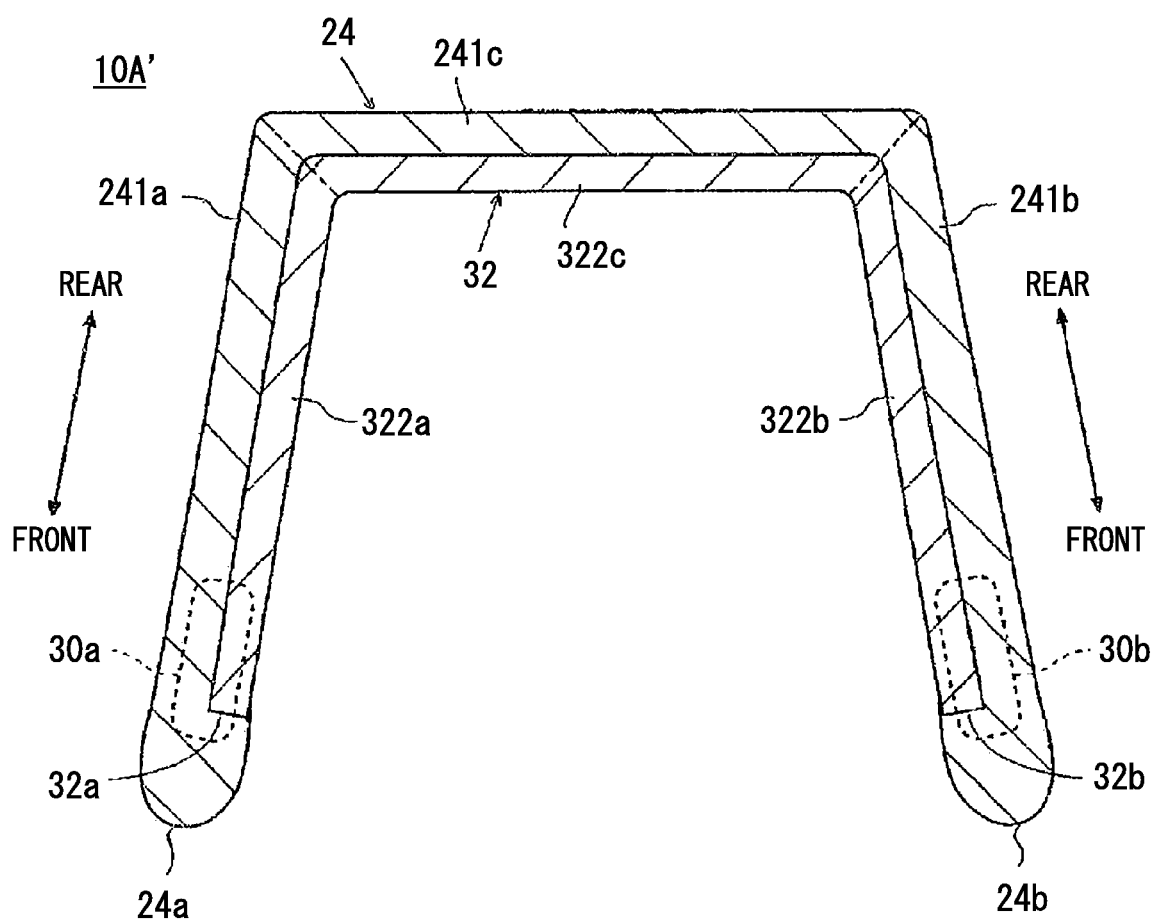
FIG. 5 is a projection view of an abutting surface, a weld bead, and a weld overlay section of a welded structure member 10A' according to a modification example of the first embodiment of the present invention.

In FIG. 5, a welded structure member 10N according to a modification example of this embodiment is illustrated. In the welded structure member 10A according to the first embodiment described above, a case where the side wall section 121*a* and the side wall section 121*b* are disposed to be parallel to each other has been described, but the side wall section 121*a* and the side wall section 121*b* may not be disposed to be parallel to each other. For example, in a case where the plate-like section 121 has an opened cross-sectional shape in which an opening end side is opened, a projection view of the abutting surface 32, the weld bead 24, and the weld overlay sections 30*a* and 30*b* becomes the drawing illustrated in FIG. 5. In this case, in each of the abutting side surfaces 322*a* and 322*b*, the front-rear direction is defined by setting the abutting bottom surface 322*c* side to the rear, and by setting the opposite side thereof to the front. Then, as with the welded structure member 10A according to the first embodiment, the positional relationship in the abutting surface 32, the weld bead 24, and the weld overlay sections 30*a* and 30*b* is defined on the basis of the front-rear direction which is defined with respect to each of the abutting side surfaces 322*a* and 322*b*.

Second Embodiment

Next, a welded structure member 10B according to a second embodiment of the present invention will be described. The welded structure member 10B according to the second embodiment has the same configuration as that of the welded structure member 10A according to the first embodiment except for the position where the weld overlay sections 30*a* and 30*b* are formed, and thus, the same reference numerals are applied to the same constituents, and the description thereof will be omitted.

Figure 6:
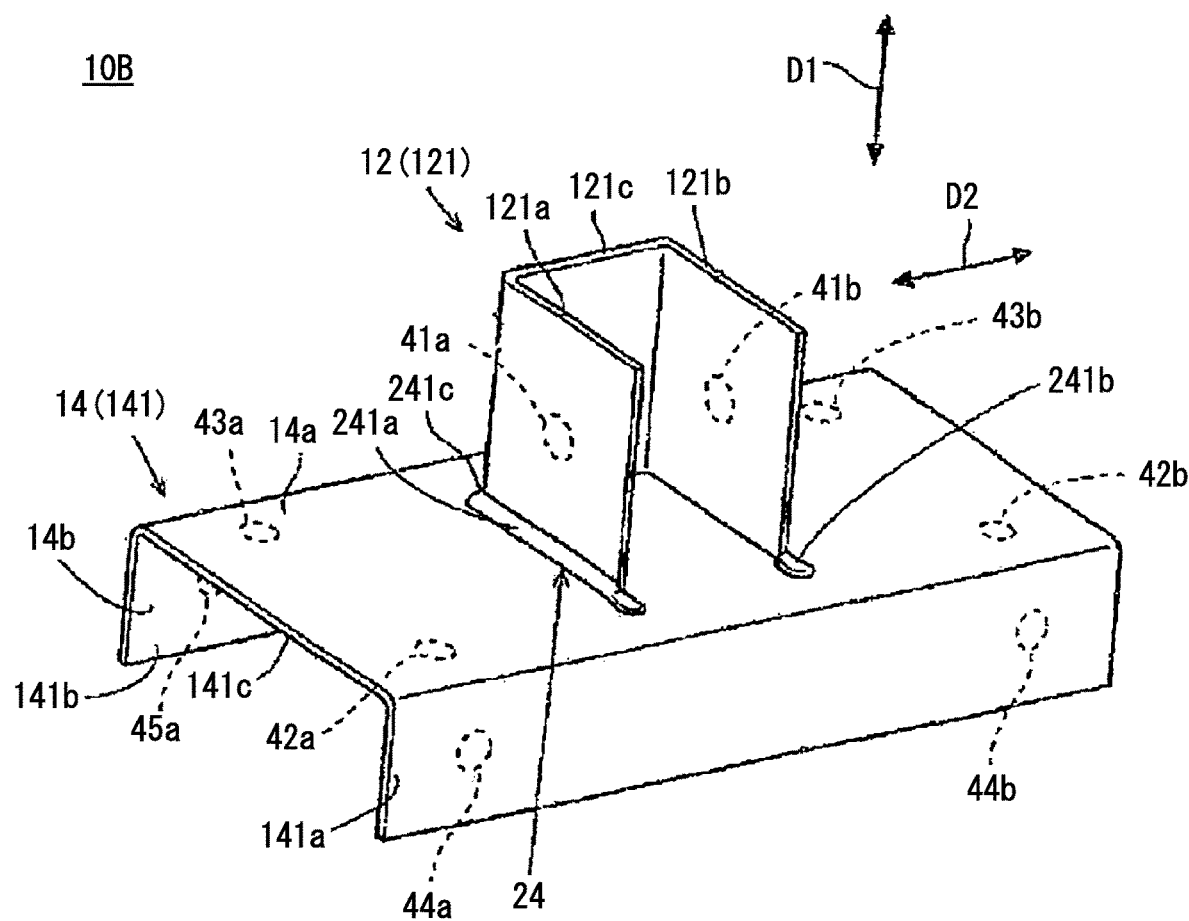
FIG. 6 is a perspective view illustrating a welded structure member 10B according to a second embodiment of the present invention.
Figure 7:
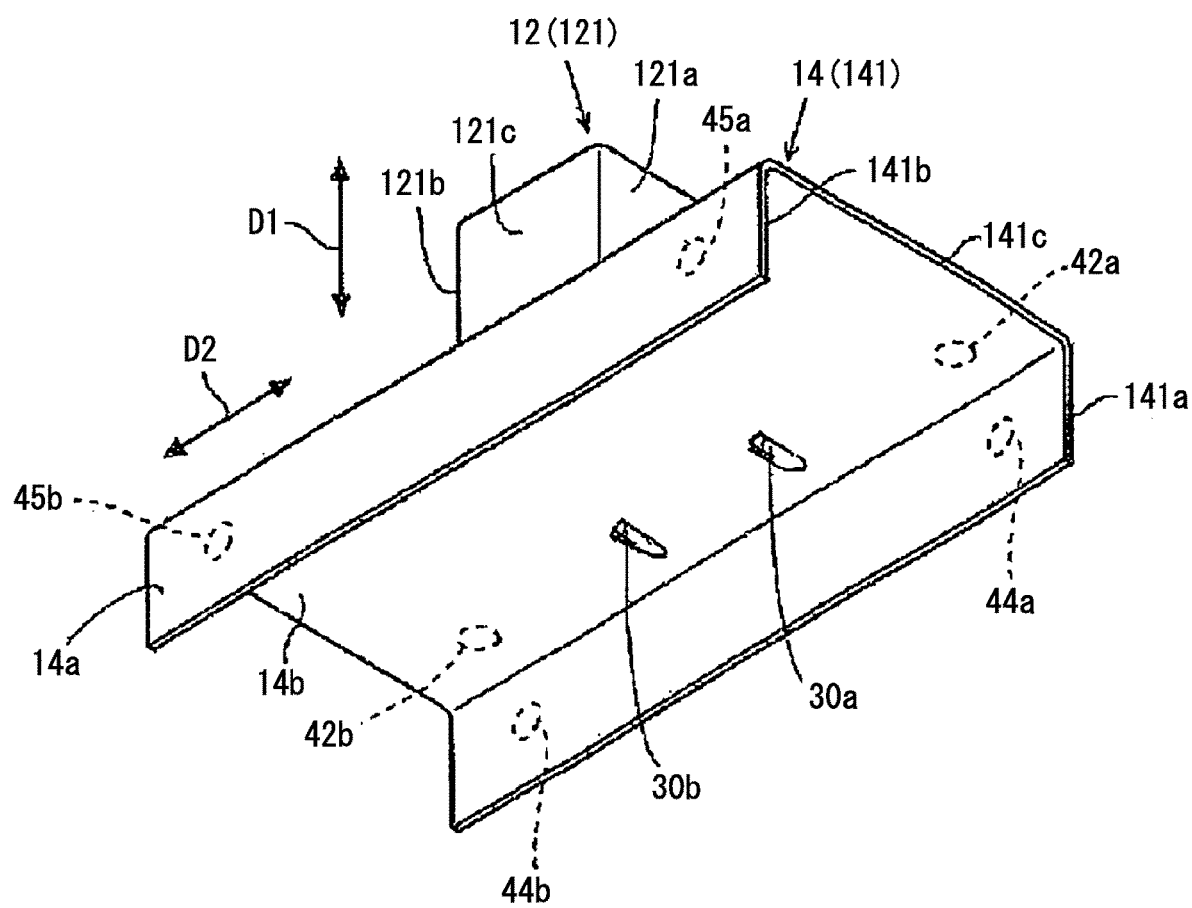
FIG. 7 is a perspective view of the welded structure member 10B according to the same embodiment seen from a lower side.
Figure 8:
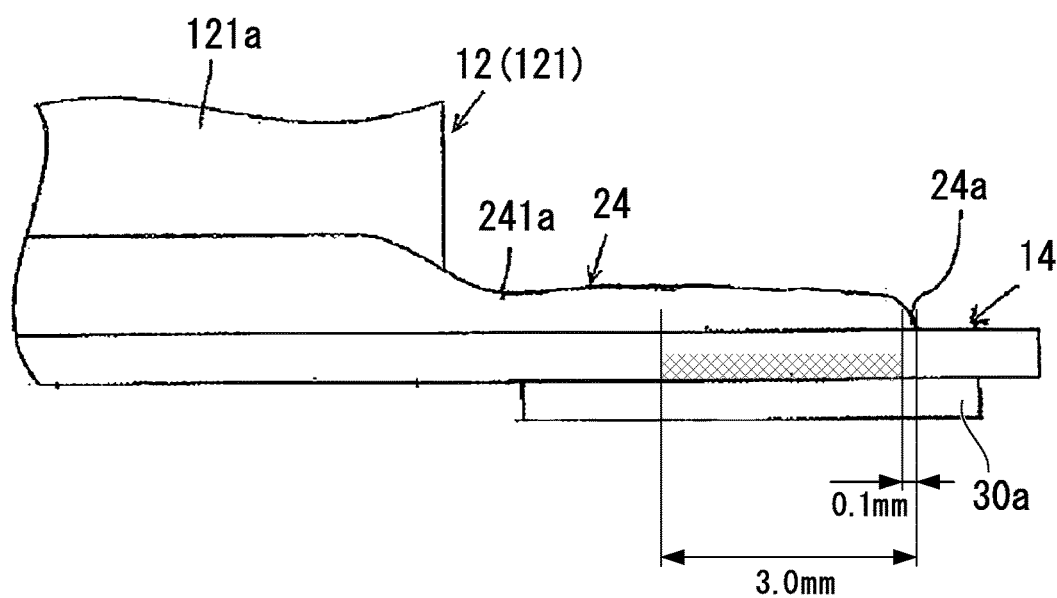
FIG. 8 is a side view illustrating a part of the welded structure member 10B according to the same embodiment.
Figure 9:
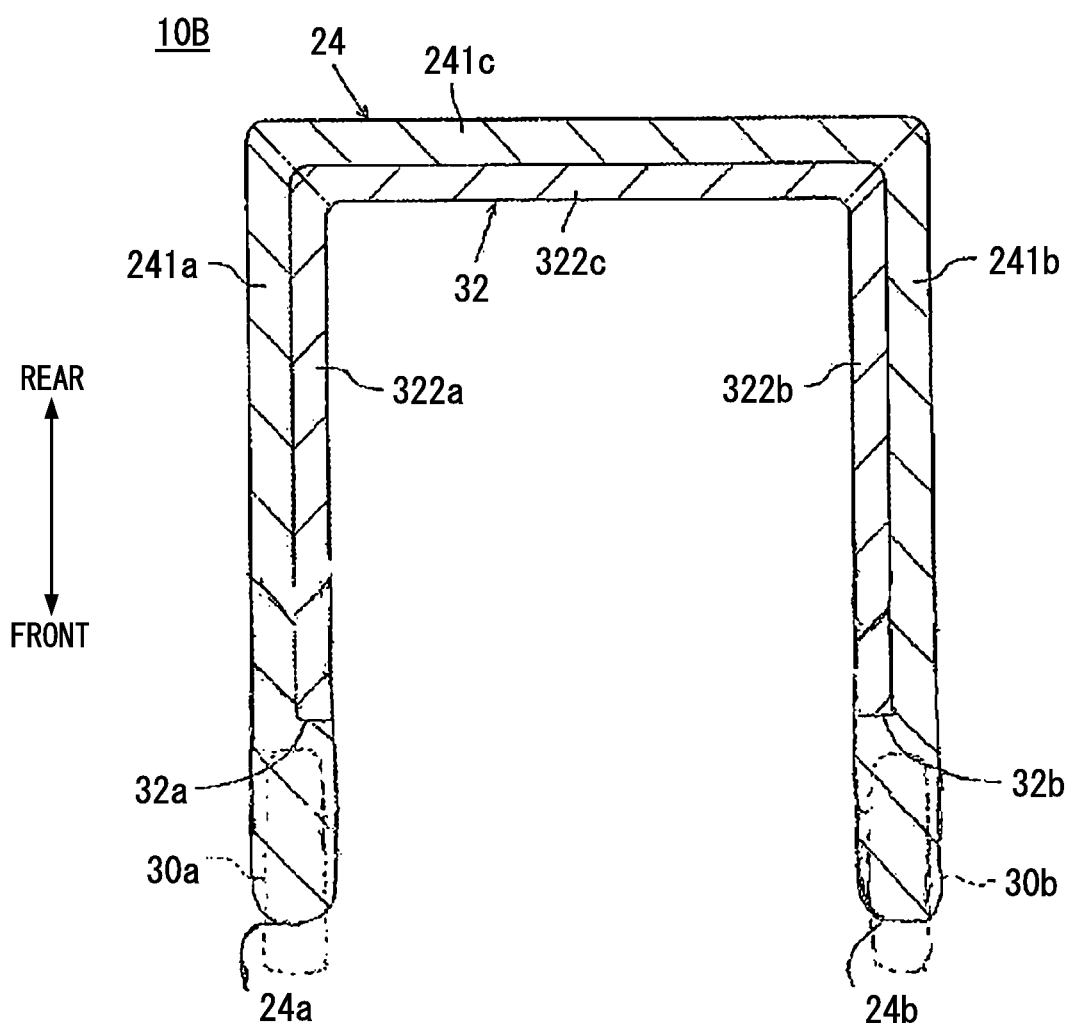
FIG. 9 is a projection view of an abutting surface, a weld bead, and a weld overlay section of the welded structure member 10B according to the same embodiment.

In FIG. 6 to FIG. 9, the welded structure member 10B according to the second embodiment is illustrated. More specifically, FIG. 6 is a perspective view of the welded structure member 10B seen from an upper side, FIG. 7 is a perspective view of the welded structure member 10B seen from a lower side, FIG. 8 is a side view illustrating a part of the welded structure member 10B, and FIG. 9 is a projection view of the abutting surface 32, the weld bead 24, and the weld overlay sections 30a and 30b of the welded structure member 10B.

The welded structure member 10A according to the first embodiment described above and the welded structure member 10N according to the first modification example thereof has a configuration in which the weld overlay sections 30a and 30b are disposed in a region corresponding to the vicinity of the abutting end sections 32a and 32b, in the rear surface 14b of the base metal member 14. According to such a configuration, it is possible to reduce the maximum main stress in the vicinity of the abutting end sections 32a and 32b, and to obtain an effect of increasing the fatigue strength of the welded structure member 10A.

On the other hand, the welded structure member 10B according to the second embodiment has a configuration in which the weld overlay sections 30a and 30b are disposed in a region in the vicinity of the weld bead end sections 24a and 24b, in the rear surface 14b of the base metal member 14. According to such a configuration, it is possible to reduce the maximum main stress in the vicinity of the weld bead end sections 24a and 24b, and to obtain an effect of increasing a fatigue strength of the welded structure member 10B.

As with the welded structure member 10A according to the first embodiment, each of the thickness of the joined metal member 12 and the thickness of the base metal member 14 of the welded structure member 10B according to the second embodiment, for example, may be set to be in a range of 0.8 mm to 4.5 mm.

Here, in the welded structure member 10B according to the second embodiment, the weld overlay sections 30a and 30b are disposed to reduce the maximum main stress in the vicinity of the weld bead end sections 24a and 24b. The maximum main stress in the vicinity of the weld bead end sections 24a and 24b tends to be larger than the maximum main stress in the vicinity of the abutting end sections 32a and 32b as the thickness of the base metal member 14 decreases. Accordingly, in the welded structure member 10B according to this embodiment aimed at reducing the maximum main stress in the vicinity of the weld bead end sections 24a and 24b, in order to reduce the maximum main stress, it is effective that the weld overlay sections 30a and 30b are disposed in the vicinity of the weld bead end sections 24a and 24b.

As a result of conducting further studies by the present inventors on the basis of the tendency described above, it has been found that in the welded structure member 10B according to this embodiment, it is preferable to set the separation distance $L_W$ (mm) between the abutting end sections 32a and 32b and the weld bead end sections 24a and 24b, and the plate thickness T (mm) of the base metal member 14 to satisfy Expression (B) described below.

$$0.8\ \text{mm} \leq T < -0.125 L_W + 4.06\ \text{mm} \qquad \text{Expression (13)}$$

Here, even in a case where Expression (B) is not satisfied, it is preferable that the weld overlay sections 30a and 30b are disposed in the vicinity of the weld bead end sections 24a and 24b. This is because it is possible to reduce the maximum main stress in the vicinity of the weld bead end sections 24a and 24b.

Furthermore, the thickness of the joined metal member 12 can be selected according to the performance which is required for the member.

Hereinafter, the positional relationship in the abutting surface 32, the weld bead 24, and the weld overlay sections 30a and 30b of the welded structure member 10B according to the second embodiment will be described.

As illustrated in FIG. 8, in the welded structure member 10B according to this embodiment, the front end of the weld overlay sections 30a and 30b is disposed on the front from a position which is separated from the weld bead end sections 24a and 24b to the rear by 0.1 mm, and the rear end of the weld overlay sections 30a and 30b is disposed on the rear from a position which is separated from the weld bead end sections 24a and 24b to the rear by 3.0 mm, in the view of facing the rear surface 14b of the base metal member 14 and of penetrating through the base metal member 14.

Furthermore, in an example illustrated in FIG. 8, the front end of the weld overlay sections 30a and 30b is positioned on the front from the weld bead end sections 24a and 24b, and the rear end of the weld overlay sections 30a and 30b is positioned on the rear from the weld bead end sections 24a and 24b. However, the front end of the weld overlay sections 30a and 30b may be disposed on the rear from the weld bead end sections 24a and 24b.

It is preferable that the rear end of the weld overlay section 30a is disposed on the rear from a position which is separated from the weld bead end sections 24a and 24b to the rear by 5.0 mm, and it is more preferable that the rear end of the weld overlay section 30a is disposed on the rear from a position which is separated from the weld bead end sections 24a and 24b to the rear by 10.0 mm.

It is preferable that the front end of the weld overlay section 30a is disposed on the front from a position which is separated from the weld bead end sections 24a and 24b to the front by 0.3 mm, and it is more preferable that the front end of the weld overlay section 30a is disposed on the front from a position which is separated from the weld bead end sections 24a and 24b to the front by 1.2 mm, and it is even more preferable that the front end of the weld overlay section 30a is disposed on the front from a position which is separated from the weld bead end sections 24a and 24b to the front by 1.9 mm.

As described above, the present invention has been described on the basis of the first embodiment and the second embodiment, but the present invention is not limited only to the embodiments described above, and various changes can be performed within the scope of claims.

For example, the first embodiment in which the weld overlay sections 30a and 30b are disposed in the vicinity of the abutting end sections 32a and 32b and the second embodiment in which the weld overlay sections 30a and 30b are disposed in the vicinity of the weld bead end sections 24a and 24b are combined, and thus, the weld overlay sections 30a and 30b may be disposed from the vicinity of the abutting end sections 32a and 32b over the vicinity of the weld bead end sections 24a and 24b. In this case, the weld overlay sections 30a and 30b may be divided between the abutting end sections 32a and 32b and the weld bead end sections 24a and 24b.

In addition, in the first embodiment and the second embodiment described above, a case where the weld overlay sections 30a and 30b are formed in the vicinity of both of the abutting end sections 32a and 32b or in the vicinity of both of the weld bead end sections 24a and 24b has been described, but any one of the weld overlay sections 30a and 30b may not be formed.

In addition, in the first embodiment or the second embodiment described above, a case where the weld overlay sections 30a and 30b formed to extend to be approximately parallel to the abutting surface 32 or the weld bead 24 has been described, but the weld overlay sections 30a and 30b may be formed to extend to a direction inclined to the abutting surface 32 or the weld bead 24. Even in a case where the weld overlay sections 30a and 30b are formed to extend to the direction inclined to the abutting surface 32 or the weld bead 24, the weld overlay sections 30a and 30b are disposed over a position which is separated from the abutting end sections 32a and 32b to the rear by 1.9 mm to 7.0 mm or a position which is separated from the weld bead end sections 24a and 24b to the rear by 0.1 mm to 3.0 mm, and thus, it is possible to reduce the maximum main stress in the vicinity of the abutting end sections 32a and 32b or in the vicinity of the weld bead end sections 24a and 24b, and to obtain an effect of increasing the fatigue strength of the welded structure member.

In addition, in the first embodiment and the second embodiment described above, the plate-like section 121 has an opened cross-sectional shape which is opened in a direction orthogonal to the first direction D1 and the second direction D2, but the plate-like section 121 may have an opened cross-sectional shape which is opened in the second direction D2.

In addition, in the first embodiment and the second embodiment described above, a case where the entire joined metal member 12 is configured as the plate-like section 121 has been described, but the joined metal member 12 may include a section (for example, a columnar section) having a shape other than that of the plate-like section insofar as a joining surface between the joined metal member 12 and the base metal member 14 has an opened cross-sectional shape. The joined metal member 12, for example, may be a rectangular column having an acute angle.

In addition, in the first embodiment and the second embodiment described above, a case where the plate-like section 121 has an opened cross-sectional shape has been described, but the present invention can be applied to a welded structure member which includes a plate-like section having various shapes. Therefore, for example, the joined metal member 12 may includes a plate-like section having a simply flat shape, a plate-like section having an L-shaped cross section or a plate-like section having an H-shaped cross section, instead of the plate-like section 121 described above.

In addition, in the first embodiment and the second embodiment described above, the base metal member 14 including the side wall sections 141a and 141b has been described, but the present invention can be applied to a welded structure member which includes various base metal members including a flat plate section. Therefore, the base metal member may not include the side wall sections 141a and 141b.

In addition, in the first embodiment and the second embodiment described above, a case where the joining surface between the base metal member 14 and the joined metal member 12 is a flat surface has been described, but the present invention may also be applied to a welded structure member in which the joining surface between the base metal member 14 and the joined metal member 12 is a curved surface.

In addition, in the first embodiment and the second embodiment described above, a case where the weld bead 24 includes the bottom wall bead section 241c has been described, but the weld bead may not include the bottom wall bead section.

(Examination 1 Based on Simulation)

Hereinafter, a simulation result using a computer and the effect of the configuration according to the first embodiment will be described in more detail. In this simulation, an analysis model (hereinafter, also referred to as a first model) having the same configuration as that of the welded structure member 10A illustrated in FIGS. 1 to 4 was prepared. Then, in the first model, the position and the length of the weld overlay sections 30a and 30b in the front-rear direction were changed, the maximum main stress which was generated in the vicinity of the abutting end sections 32a and 32b of the abutting surface 32 was obtained. In addition, an analysis model not including the weld overlay sections 30a and 30b (hereinafter, also referred to as a second model) was prepared for comparison, and the maximum main stress which was generated in the vicinity of the abutting end sections 32a and 32b of the abutting surface 32 was obtained.

Furthermore, in both of the first model and the second model, holes were formed in positions illustrated by the dotted circles 41a, 41b, 42a, 42b, 43a, 43b, 44a, 44b, 45a, and 45b in FIG. 1 and FIG. 2 (hereinafter, each of the holes illustrated by the dotted line will be referred to as a hole). In the simulation, a fixing jig (a rigid body) was disposed on each of the holes 42a, 42b, 43a, 43b, 44a, 44b, 45a, and 45b, and the base metal member 14 was fixed. Then, a columnar member (a rigid body) penetrated through the holes 41a and 41b, the plate-like section 121 (the joined metal member 12) was pulled in a direction perpendicular to the front surface 14a of the plate-like section 141 by a force of 2.0 kN through the member.

The configuration of both of the first model and the second model was defined as described below. Furthermore, as described above, in the first model, the position of the weld overlay sections 30a and 30b in the front-rear direction was variously changed.

(Configuration of Analysis Model)

Joined Metal Member
  Material: Steel
  Thickness: 2.6 mm
  Height (Length in First Direction D1): 80 mm
  Length in Right-Left Direction (Second Direction D2): 70 mm
  Length in Front-Rear Direction (refer to FIG. 4): 80 mm
  Position of Hole 41a: Center of Side Wall Section 121a
  Position of Hole 41b: Center of Side Wall Section 121b
  Young's Modulus: 210,000 MPa
  Poisson's Ratio: 0.3

Base Metal Member
  Material: Steel
  Thickness: 2.6 mm
  Height (Length in First Direction D1): 50 mm
  Length in Right-Left Direction (Second Direction D2): 300 mm
  Length in Front-Rear Direction (refer to FIG. 4): 150 mm
  Center-to-Center Distance between Holes 42a and 42b: 230 mm
  Center-to-Center Distance between Holes 43a and 43b: 230 mm
  Center-to-Center Distance between Holes 44a and 44b: 230 mm Center-to-Center Distance between Holes 45a and 45b: 230 mm Center-to-Center Distance between Holes 42a and 43a: 100 mm Center-to-Center Distance between Holes 42b and 43b: 100 mm Distance in Vertical Direction from Front Surface 14a to Center of Holes 44a, 44b, 45a, and 45b: 25 mm Young's Modulus: 210,000 MPa Poisson's Ratio: 0.3

Weld Bead

Width (Width of Section Excluding Section Protruding from Abutting End Sections 32a and 32b (refer to FIG. 4) to Front): 4.3 mm Height (Height of Section Excluding Section Protruding from Abutting End Sections 32a and 32b to Front): 5.0 mm Width (Width of Section Protruding from Abutting End Sections 32a and 32b to Front): 10.6 mm Height (Height of Section Protruding from Abutting End Sections 32a and 32b to Front): 2.2 mm Protrusion Amount (Distance $L_W$) from Abutting End Sections 32a and 32b: 13.7 mm Young's Modulus: 210,000 MPa Poisson's Ratio: 0.3

Weld Overlay Section (First Model)

Width: 6.0 mm

Height: 2.0 mm

Length: 10.0 mm, 12.0 mm, 14.0 mm, 16.0 mm, 19.8 mm, 23.6 mm, 26.0 mm, and 28.0 mm Position of Weld Overlay Section 30a in Right-Left Direction: Center Line of Weld Overlay Section 30a is Coincident with Left Edge of Abutting Side Surface 322a (refer to FIG. 4)

Position of Weld Overlay Section 30b in Right-Left Direction: Center Line of Weld Overlay Section 30b is Coincident with Right Edge of Abutting Side Surface 322b (refer to FIG. 4)

Young's Modulus: 210,000 MPa

Poisson's Ratio: 0.3

Furthermore, in a case where the analysis is performed in consideration of the yield of the material of the joined metal member 12 and the base metal member 14 and in a case where the analysis is performed without consideration of the yield, a magnitude relationship between a stress generated in the first model and a stress generated in the second model is not changed. Therefore, in a case where a magnitude relationship between the maximum main stress generated in the first model and the maximum main stress generated in the second model is relatively evaluated, the presence or absence of the yield of the material may not be considered. Therefore, in this simulation, in order to simplify the analysis, elastic property analysis was performed without consideration of the yield of the material of the joined metal member 12 and the base metal member 14. In addition, in a case where the magnitude relationship between the maximum main stresses is relatively evaluated as described above, the yield of the material may not be considered, and thus, it is possible to evaluate the welded structure member including the joined metal member 12 and the base metal member 14 having an arbitrary tensile strength by this simulation. That is, for example, it is possible to evaluate a welded structure member using a material having a tensile strength of 270 MPa, and to evaluate a welded structure member using a material having a tensile strength of 1,500 MPa, by this simulation.

Figure 10A:
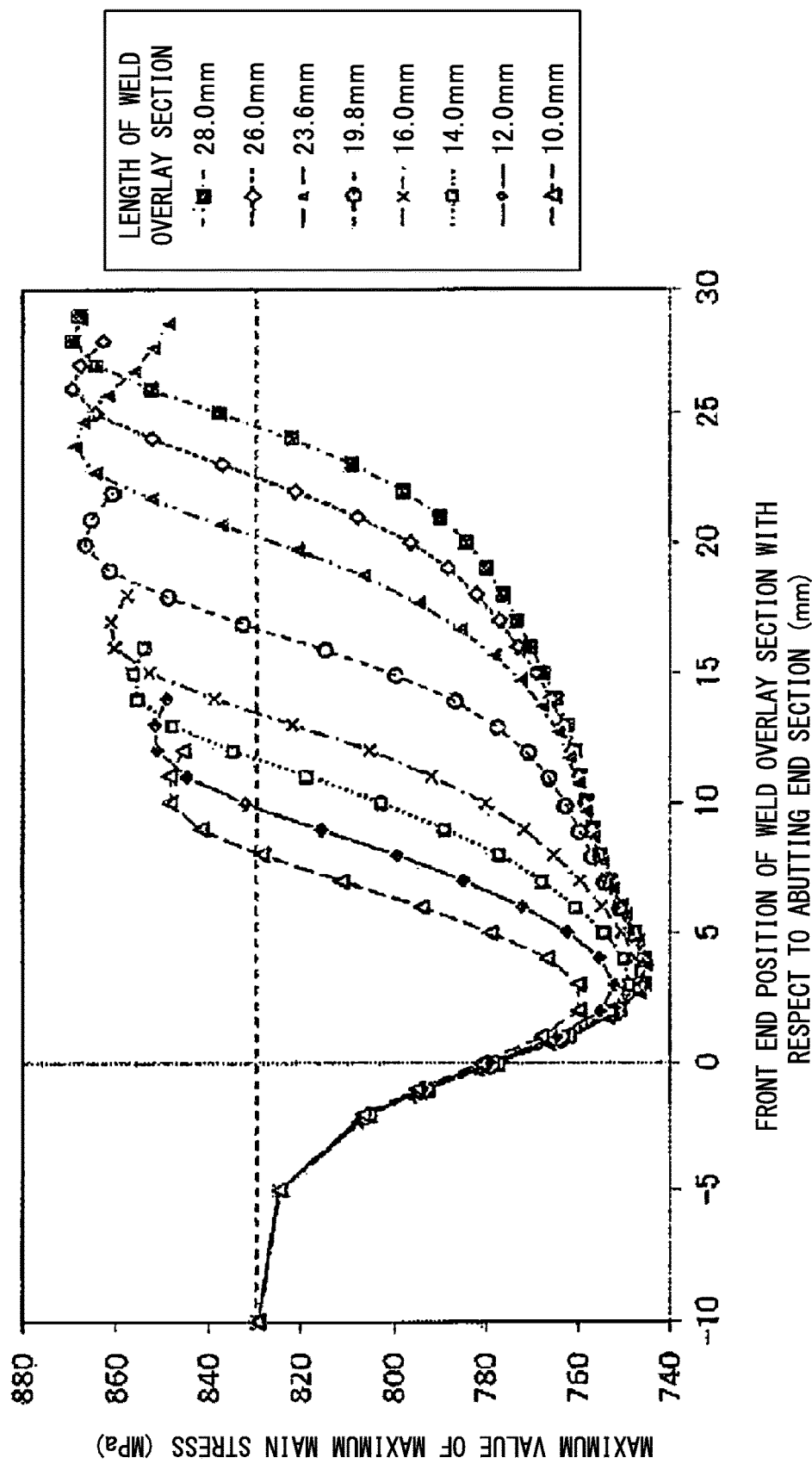
FIG. 10A is a graph illustrating a relationship between a front end position of the weld overlay section with respect to an abutting end section and a maximum value of a maximum main stress in the abutting end section at each length of the weld overlay section, which is obtained by computer analysis.

In FIG. 10A, a relationship between a front end position of the weld overlay section 30a and a maximum value of the maximum main stress which is generated in the vicinity of the abutting end section 32a at each length of the weld overlay section 30a (refer to FIG. 4) is illustrated. Furthermore, the front end position of the weld overlay section 30a indicates the position of the front end of the weld overlay section 30a in the front-rear direction in a case of being on the basis of the abutting end section 32a (refer to FIG. 4). In FIG. 10A, in a case where the front end of the weld overlay section 30a is positioned on the front from the abutting end section 32a, the front end position of the weld overlay section 30a is represented by a positive value, and in a case where the front end of the weld overlay section 30a is positioned on the rear from the abutting end section 32a, the front end position of the weld overlay section 30a is represented by a negative value. For example, in the welded structure member 10A illustrated in FIG. 4, the front end of the weld overlay section 30a is positioned on the front from the abutting end section 32a, and thus, the front end position of the weld overlay section 30a is represented by a positive value. In addition, in FIG. 10A, the maximum value (830 MPa) of the maximum main stress in the analysis model not including the weld overlay sections 30a and 30b is illustrated by a broken line. Furthermore, even though the description is omitted, a relationship between the front end position of the weld overlay section 30b and a maximum value of the maximum main stress which is generated in the vicinity of the abutting end section 32b also became the same relationship as that illustrated in FIG. 10A.

Figure 10B:
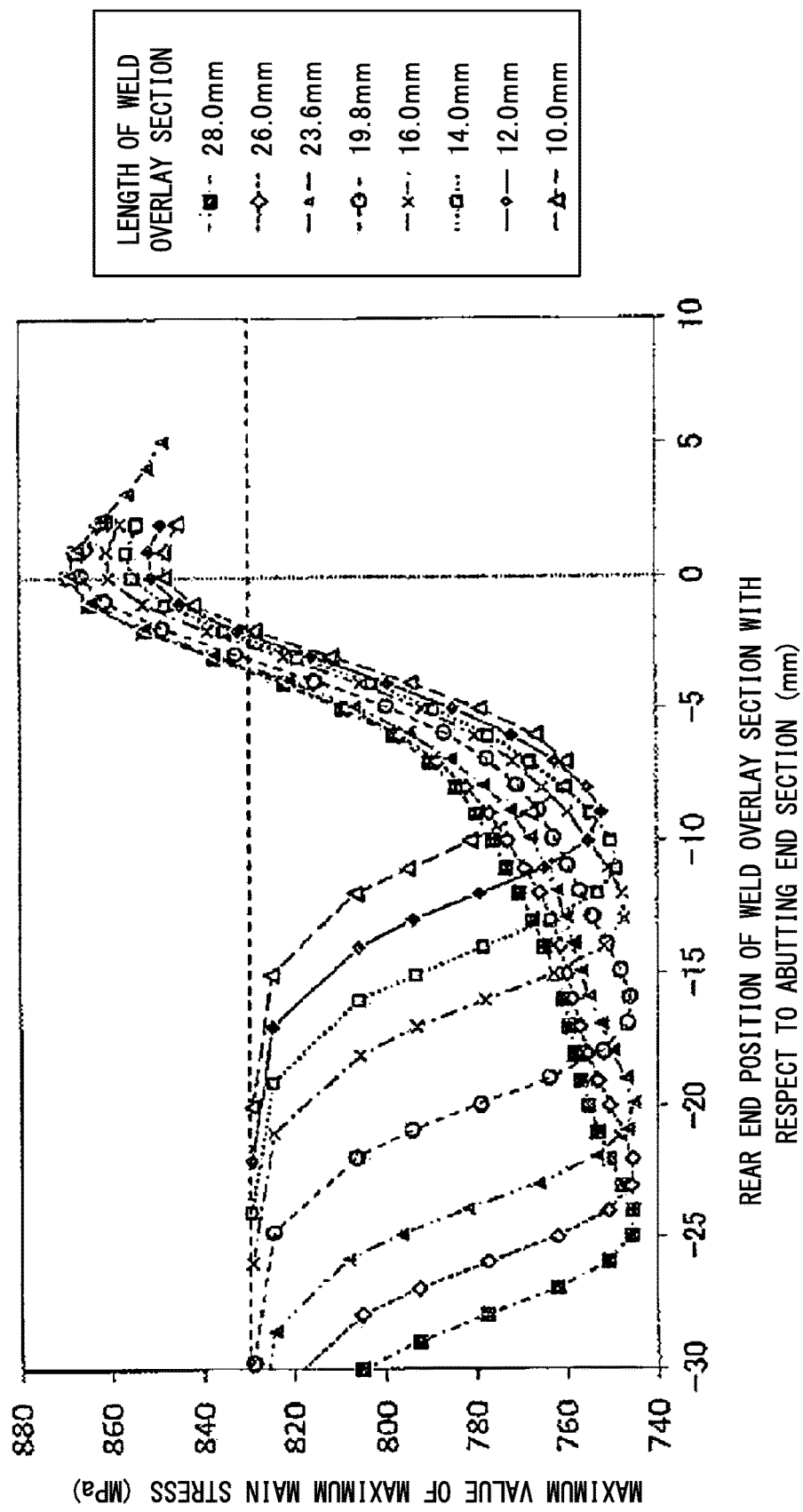
FIG. 10B is a graph illustrating a relationship between a rear end position of the weld overlay section with respect to the abutting end section and the maximum value of the maximum main stress in the abutting end section at each length of the weld overlay section, which is obtained by the computer analysis.

In FIG. 10B, a relationship between the rear end position of the weld overlay section 30a and the maximum value of the maximum main stress which is generated in the vicinity of the abutting end section 32a at each length of the weld overlay section 30a (refer to FIG. 4) is illustrated. Furthermore, the rear end position of the weld overlay section 30a indicates the position of the rear end of the weld overlay section 30a in the front-rear direction in a case of being on the basis of the abutting end section 32a (refer to FIG. 4). In FIG. 10B, in a case where the rear end of the weld overlay section 30a is positioned on the front from the abutting end section 32a, the rear end position of the weld overlay section 30a is represented by a positive value, and in a case where the rear end of the weld overlay section 30a is positioned on the rear from the abutting end section 32a, the rear end position of the weld overlay section 30a is represented by a negative value. For example, in the welded structure member 10A illustrated in FIG. 4, the rear end of the weld overlay section 30a is positioned on the rear from the abutting end section 32a, and thus, the rear end position of the weld overlay section 30a is represented by a negative value. In addition, as with FIG. 10A, in FIG. 10B, the maximum value (830 MPa) of the maximum main stress in the analysis model not including the weld overlay sections 30a and 30b is illustrated by a broken line. Furthermore, even though the description is omitted, a relationship between the rear end position of the weld overlay section 30b and the maximum value of the maximum main stress which is generated in the vicinity of the abutting end section 32b became the same relationship as that illustrated in FIG. 10B.

From FIG. 10A and FIG. 10B, it is known that according to the present invention, the front end position and the rear end position of the weld overlay sections 30a and 30b are suitably set, and thus, it is possible to reduce the maximum value of the maximum main stress of the abutting end sections 32a and 32b of the abutting surface 32. Specifically, from FIG. 10A, it is known that even in a case where the length of the weld overlay sections 30a and 30b is short, which is 10.0 mm, the front end position of the weld overlay sections 30a and 30b is set to be less than or equal to 8.0 mm, and to be preferably less than or equal to 7.0 mm, and thus, it is possible to reliably reduce the maximum value of the maximum main stress compared to a case where the weld overlay section does not exist. In addition, it is known that the front end position of the weld overlay sections 30a and 30b is set to be 0 to 6.0 mm, to be preferably 0 to 4.0 mm, and to be more preferably 2.0 to 4.0 mm, and thus, it is possible to sufficiently reduce the maximum value of the maximum main stress. In addition, as it is known from FIG. 10B, the rear end position of the weld overlay sections 30a and 30b was set to be less than or equal to −3.6 mm regardless of the length of the weld overlay sections 30a and 30b, and thus, it was possible to reduce the maximum value of the maximum main stress compared to a case where the weld overlay section does not exist. In addition, from FIG. 10A and FIG. 10B, it is known that in a case where the length of the weld overlay sections 30a and 30b is greater than or equal to 14.0 mm, the effect of reducing the stress particularly increases, and in a case where the length of the weld overlay sections 30a and 30b is greater than or equal to 19.8 mm, the effect of reducing the stress is approximately the same. From this, it is known that it is preferable that the length of the weld overlay sections 30a and 30b is greater than or equal to 14.0 mm, and in order to maximally exhibit the effect of the present invention, it is more preferable that the length of the weld overlay section is greater than or equal to 19.8 mm.

(Examination 2 Based on Simulation)

With reference to FIG. 10A, in the simulation described above, in a case where the length of the weld overlay sections 30a and 30b was 10.0 mm, the maximum value of the maximum main stress decreased to 760 MPa when the front end position of the weld overlay sections 30a and 30b was 3.0 mm. As described above, the maximum value of the maximum main stress in the analysis model not including the weld overlay section was 830 MPa. Therefore, it is known that the weld overlay sections 30a and 30b are disposed, and thus, the maximum value of the maximum main stress maximally decreases by 70 MPa. At this time, when a decrease rate of the maximum value of the maximum main stress (a decrease rate of the maximum value of the maximum main stress with respect to the analysis model not including the weld overlay section) was set to 100%, the front end position of the weld overlay sections 30a and 30b at the time that the decrease rate became 30% (a decrease of 21 MPa) was −2.5 mm and 7.0 mm. That is, in a case where the front end position of the weld overlay sections 30a and 30b is in a range of −2.5 mm to 7.0 mm, it is possible to set the decrease rate of the maximum value of the maximum main stress (hereinafter, simply referred to as a decrease rate) to be greater than or equal to 30%. That is, a lower limit of the front end position of the weld overlay sections 30a and 30b for setting the decrease rate to be greater than or equal to 30% is −2.5 mm, and an upper limit thereof is 7.0 mm.

Similarly, in a case where the length of the weld overlay sections 30a and 30b is 12.0 mm, the maximum value of the maximum main stress when the front end position of the weld overlay sections 30a and 30b was 3.0 mm decreased to 752 MPa. As described above, the maximum value of the maximum main stress in the analysis model not including the weld overlay section was 830 MPa. Therefore, it is known that the weld overlay sections 30a and 30b are disposed, and thus, the maximum value of the maximum main stress maximally decreases by 78 MPa. At this time, when the decrease rate was set to 100%, the front end position of the weld overlay sections 30a and 30b at the time that the decrease rate became 30% (a decrease of 23.4 MPa) was −2.3 mm and 8.7 mm. That is, the lower limit of the front end position of the weld overlay sections 30a and 30b for setting the decrease rate to be greater than or equal to 30% is −2.3 mm, and the upper limit thereof is 8.7 mm.

Even though the detailed description is omitted, in a case where the length of the weld overlay sections 30a and 30b was 14.0 mm, 16.0 mm, 19.8 mm, 23.6 mm, and 28.0 mm, the same examination was also performed with respect to the position of the weld overlay sections 30a and 30b for setting the decrease rate to be greater than or equal to 50%, to be greater than or equal to 75%, and to be greater than or equal to 90%. Further, in the first model described above, the thickness of the base metal member 14 was set to 3.5 mm and 3.0 mm, and the same simulation as that described above was performed. Then, the same examination was performed with respect to a relationship between the decrease rate and the weld overlay sections 30a and 30b. Furthermore, in a case where the thickness of the base metal member 14 was 3.5 mm and 3.0 mm, the length of the weld overlay sections 30a and 30b was set to 10.0 mm, 12.0 mm, 14.0 mm, 16.0 mm, 20.0 mm, 24.0 mm, and 28.0 mm. Examination results thereof are shown in FIG. 11A to FIG. 14D along with examination results in a case where the thickness of the base metal member 14 is 2.6 mm.

Figure 11A:
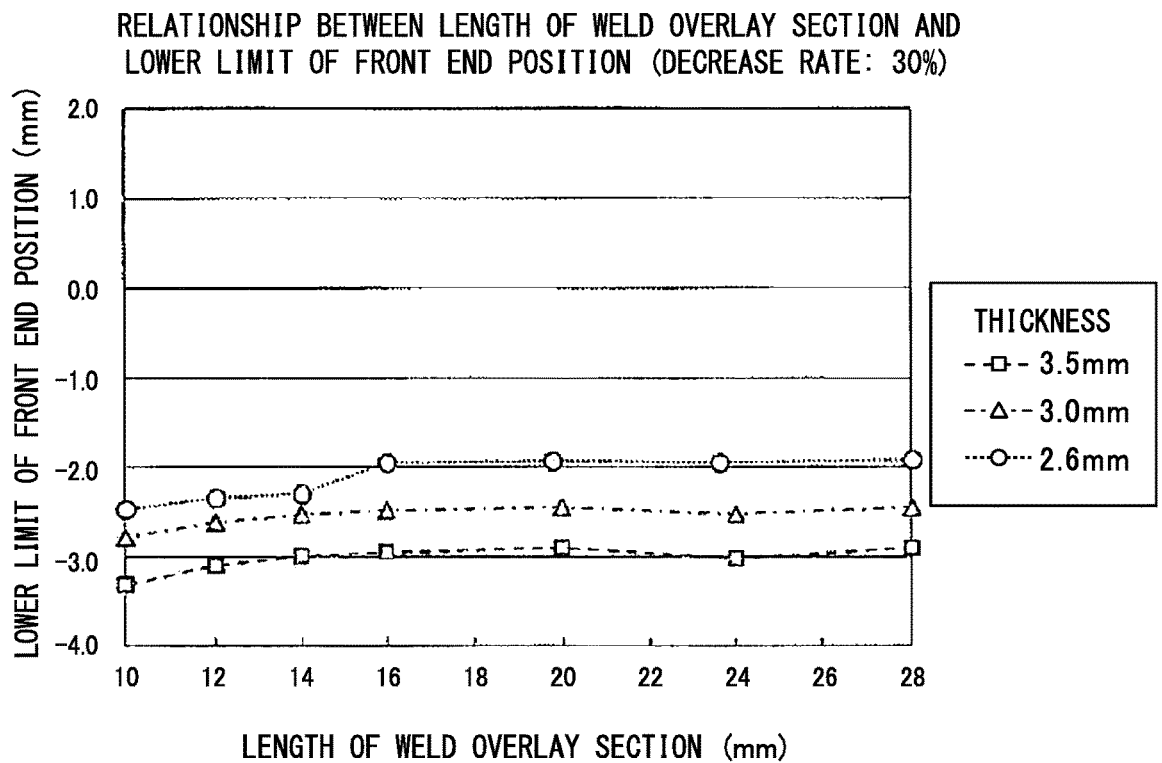
FIG. 11A is a graph illustrating a relationship between the length of the weld overlay section and a lower limit of the front end position of the weld overlay section, when a decrease rate of the maximum value of the maximum main stress in the abutting end section is 30%.
Figure 11B:
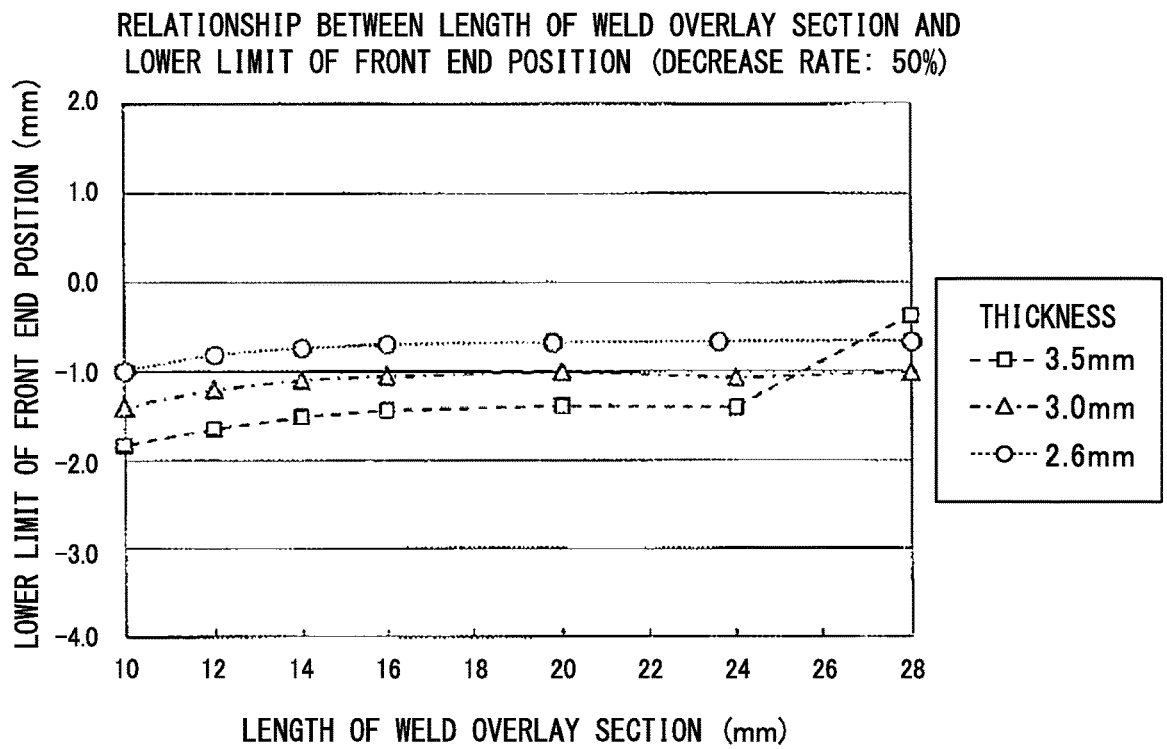
FIG. 11B is a graph illustrating a relationship between the length of the weld overlay section and the lower limit of the front end position of the weld overlay section, when the decrease rate of the maximum value of the maximum main stress in the abutting end section is 50%.
Figure 11C:
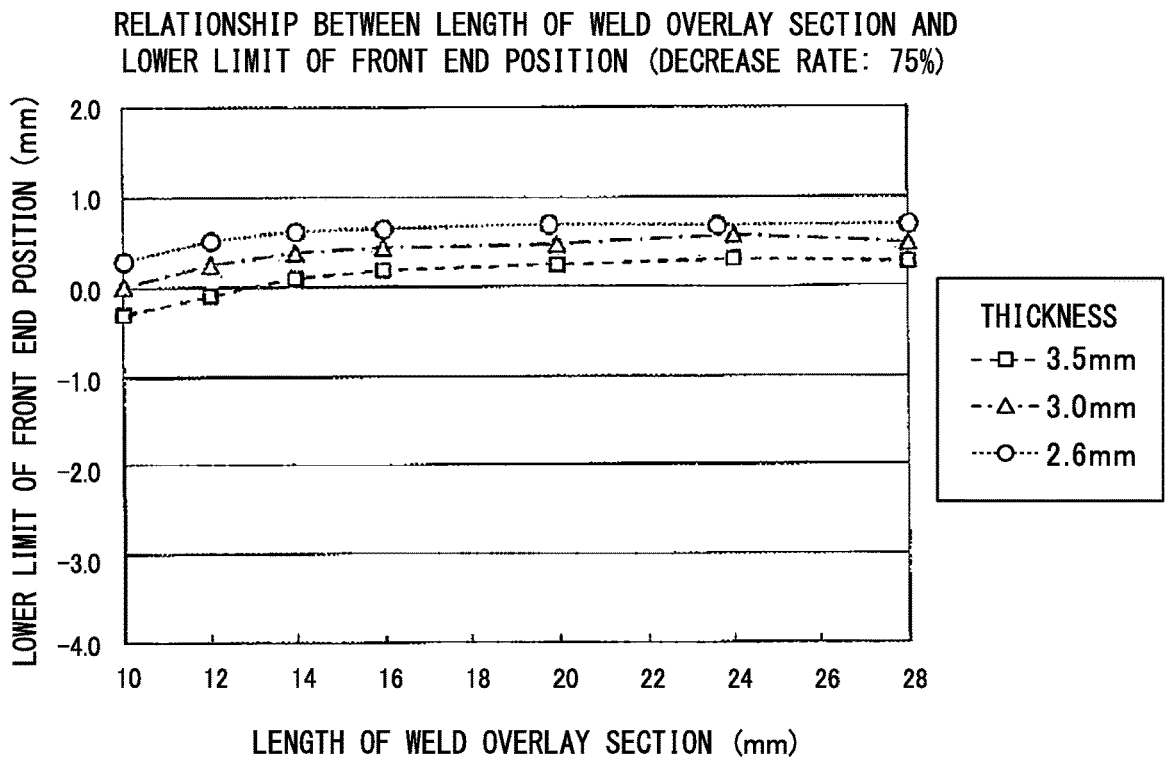
FIG. 11c is a graph illustrating a relationship between the length of the weld overlay section and the lower limit of the front end position of the weld overlay section, when the decrease rate of the maximum value of the maximum main stress in the abutting end section is 75%.

As it is known from FIG. 11A, in a case where the lower limit of the front end position of the weld overlay sections 30a and 30b is greater than or equal to −1.9 mm, it is possible to set the decrease rate to be at least 30% regardless of the thickness of the base metal member 14 and the length of the weld overlay sections 30a and 30b. In other words, (A) the front end of the weld overlay sections 30a and 30b is positioned on the front from a position which is separated from the abutting end sections 32a and 32b to the rear by 1.9 mm, and thus, the decrease rate of at least 30% can be realized. In addition, from FIGS. 11B, 11C, and 11D, it was known that it was preferable that the front end of the weld overlay sections 30a and 30b was positioned on the front from a position which was separated from the abutting end sections 32a and 32b to the rear by 0.4 mm, it was more preferable that the front end of the weld overlay sections 30a and 30b was positioned on the front from a position which was separated from the abutting end sections 32a and 32b to the front by 0.7 mm, and it was even more preferable that the front end of the weld overlay sections 30a and 30b was positioned on the front from a position which was separated from the abutting end sections 32a and 32b to the front by 1.7 mm.

Figure 12A:
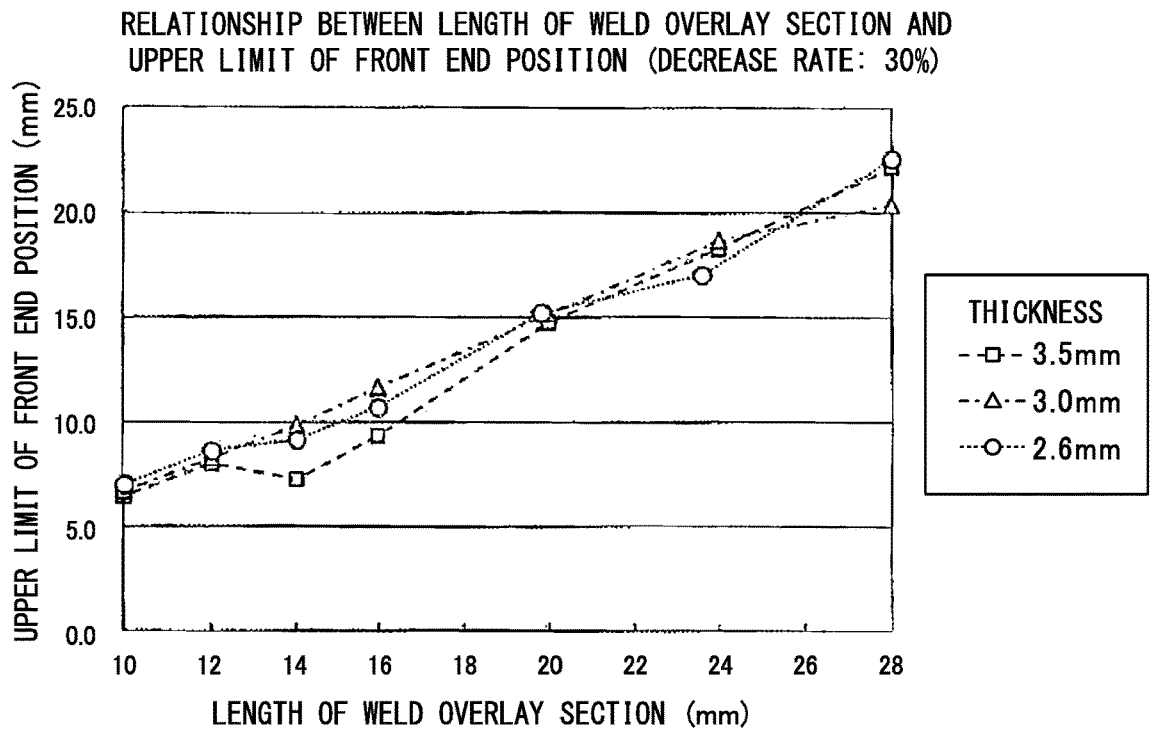
FIG. 12A is a graph illustrating a relationship between the length of the weld overlay section and an upper limit of the front end position of the weld overlay section, when the decrease rate of the maximum value of the maximum main stress in the abutting end section is 30%.
Figure 12B:
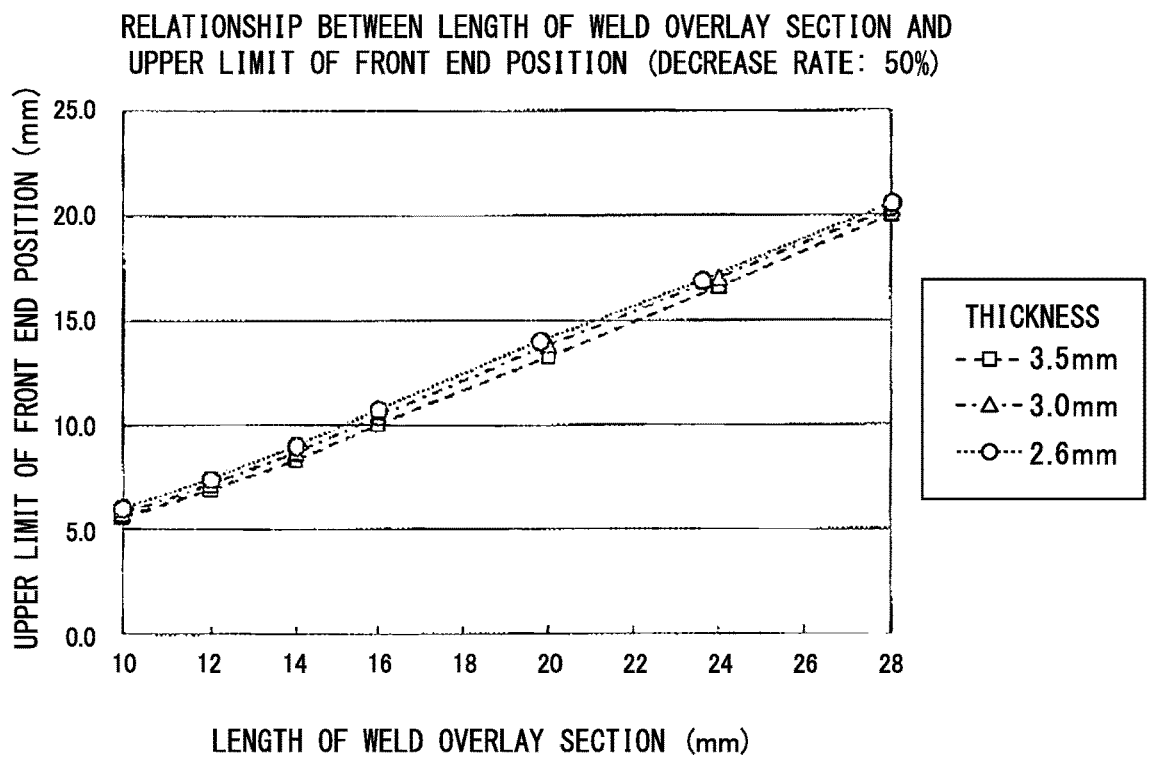
FIG. 12B is a graph illustrating a relationship between the length of the weld overlay section and the upper limit of the front end position of the weld overlay section, when the decrease rate of the maximum value of the maximum main stress in the abutting end section is 50%.
Figure 12C:
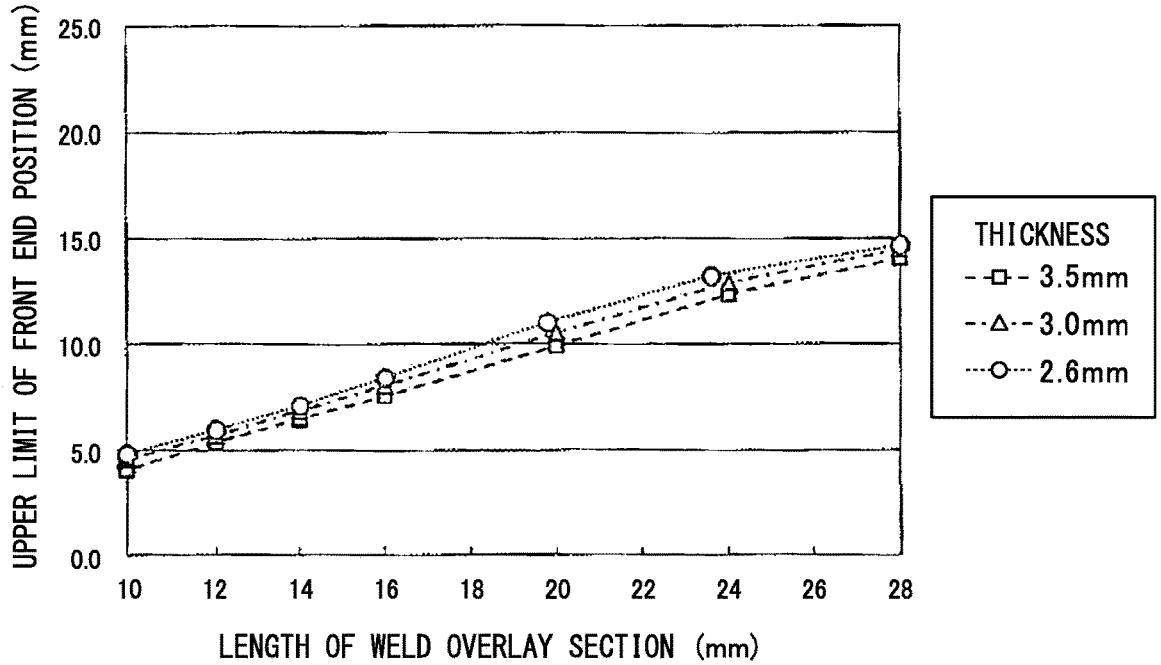
FIG. 12C is a graph illustrating a relationship between the length of the weld overlay section and the upper limit of the front end position of the weld overlay section, when the decrease rate of the maximum value of the maximum main stress in the abutting end section is 75%.
Figure 12D:
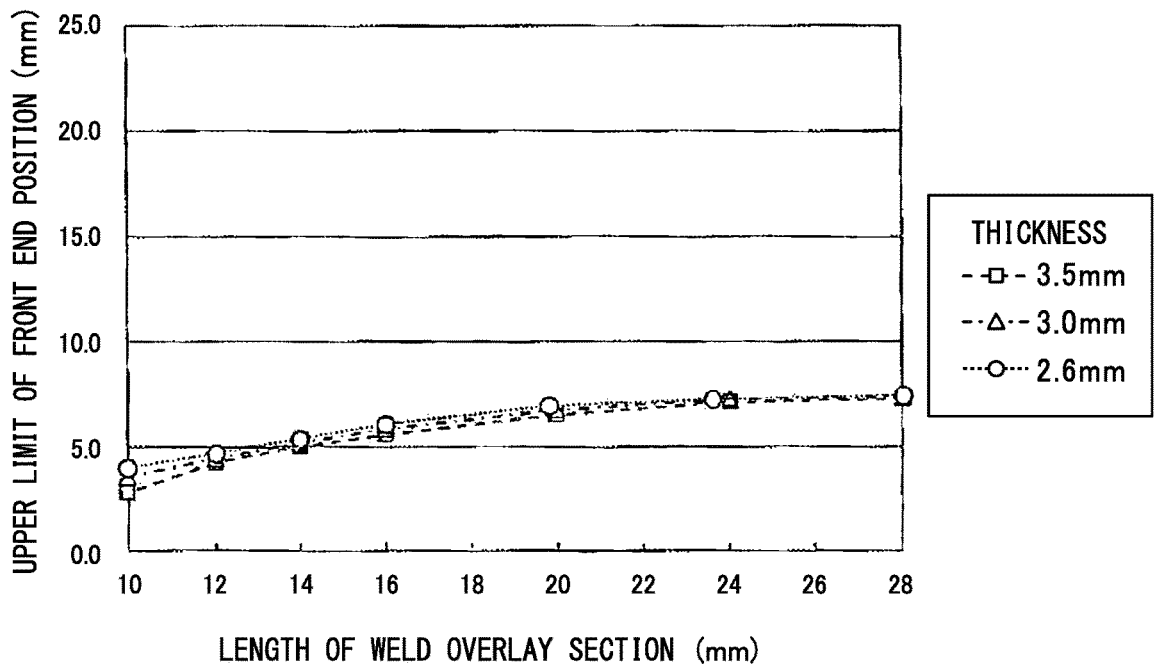
FIG. 12D is a graph illustrating a relationship between the length of the weld overlay section and the upper limit of the front end position of the weld overlay section, when the decrease rate of the maximum value of the maximum main stress in the abutting end section is 90%.

As it is known from FIG. 12A, an upper limit of the front end position of the weld overlay sections 30a and 30b at the time that the decrease rate became 30% increased according to an increase in the length of the weld overlay sections 30a and 30b. As illustrated in FIG. 12B and FIG. 12C, such a relationship was also confirmed in a case where the decrease rate was 50% and 75%. In contrast, as illustrated in FIG. 12D, in a case where the decrease rate was 90%, the upper limit of the front end position of the weld overlay sections 30a and 30b did not greatly increase even in a case where the length of the weld overlay sections 30a and 30b increased. Specifically, in a case where the upper limit of the front end position of the weld overlay sections 30a and 30b was less than or equal to 7.5 mm, it was possible to set the decrease rate to be at least 90% regardless of the length of the weld overlay sections 30a and 30b. From the result shown in FIG.

12D, it is known that the front end of the weld overlay sections 30a and 30b is preferably positioned in a position which is separated from the abutting end sections 32a and 32b (refer to FIG. 4) to the front by 7.5 mm, is more preferably positioned on the rear from a position which is separated from the abutting end sections 32a and 32b to the front by 7.0 mm, and thus, it is possible to sufficiently decrease the maximum value of the maximum main stress.

Figure 13A:
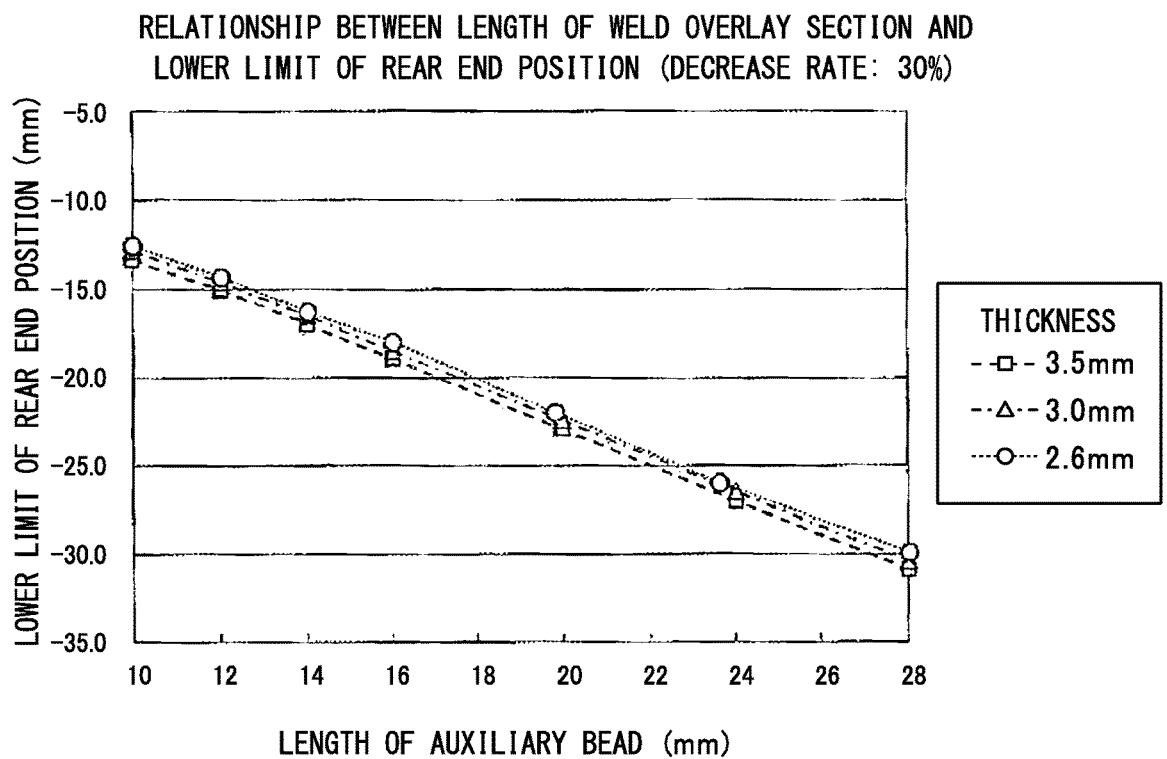
FIG. 13A is a graph illustrating a relationship between the length of the weld overlay section and a lower limit of the rear end position of the weld overlay section, when the decrease rate of the maximum value of the maximum main stress in the abutting end section is 30%.
Figure 13B:
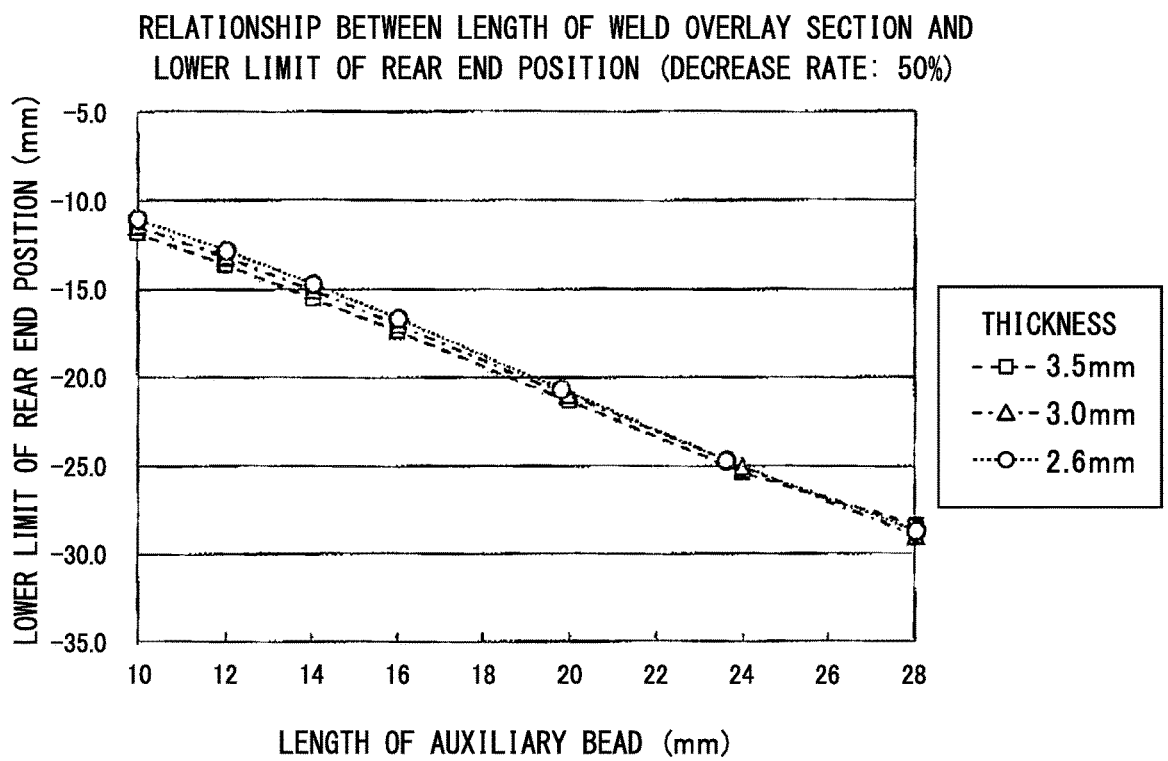
FIG. 13B is a graph illustrating a relationship between the length of the weld overlay section and the lower limit of the rear end position of the weld overlay section, when the decrease rate of the maximum value of the maximum main stress in the abutting end section is 50%.
Figure 13C:
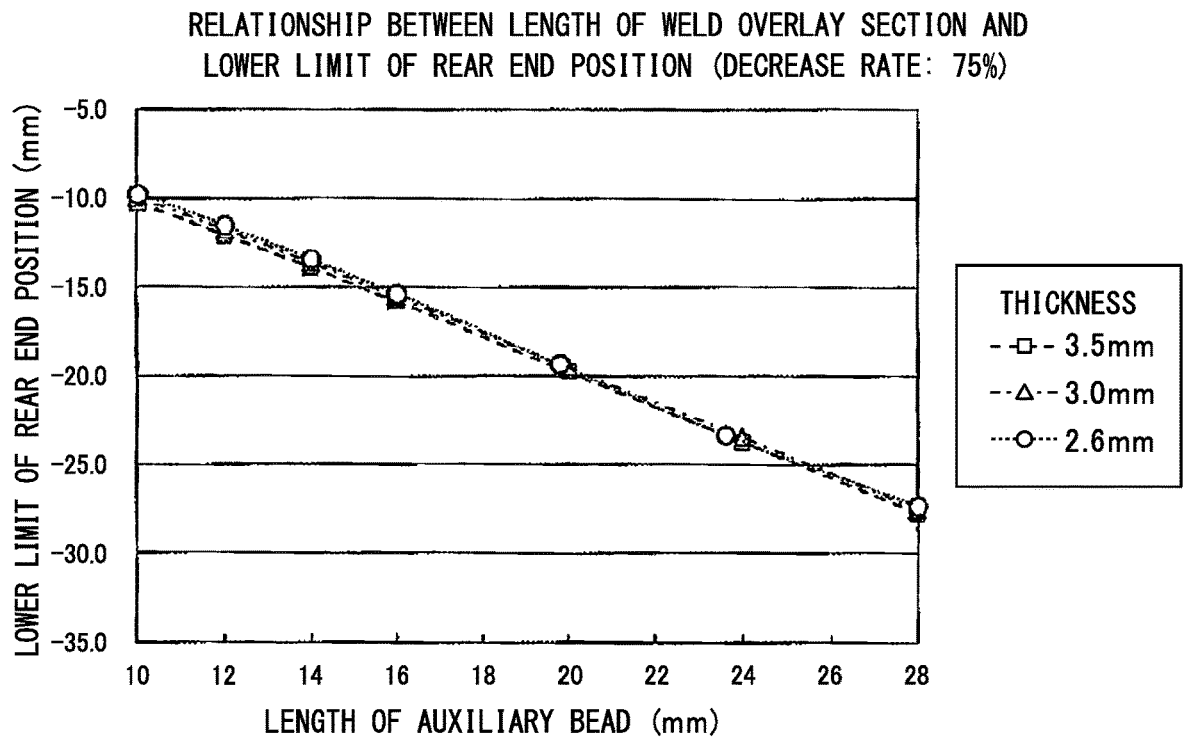
FIG. 13C is a graph illustrating a relationship between the length of the weld overlay section and the lower limit of the rear end position of the weld overlay section, when the decrease rate of the maximum value of the maximum main stress in the abutting end section is 75%.
Figure 13D:
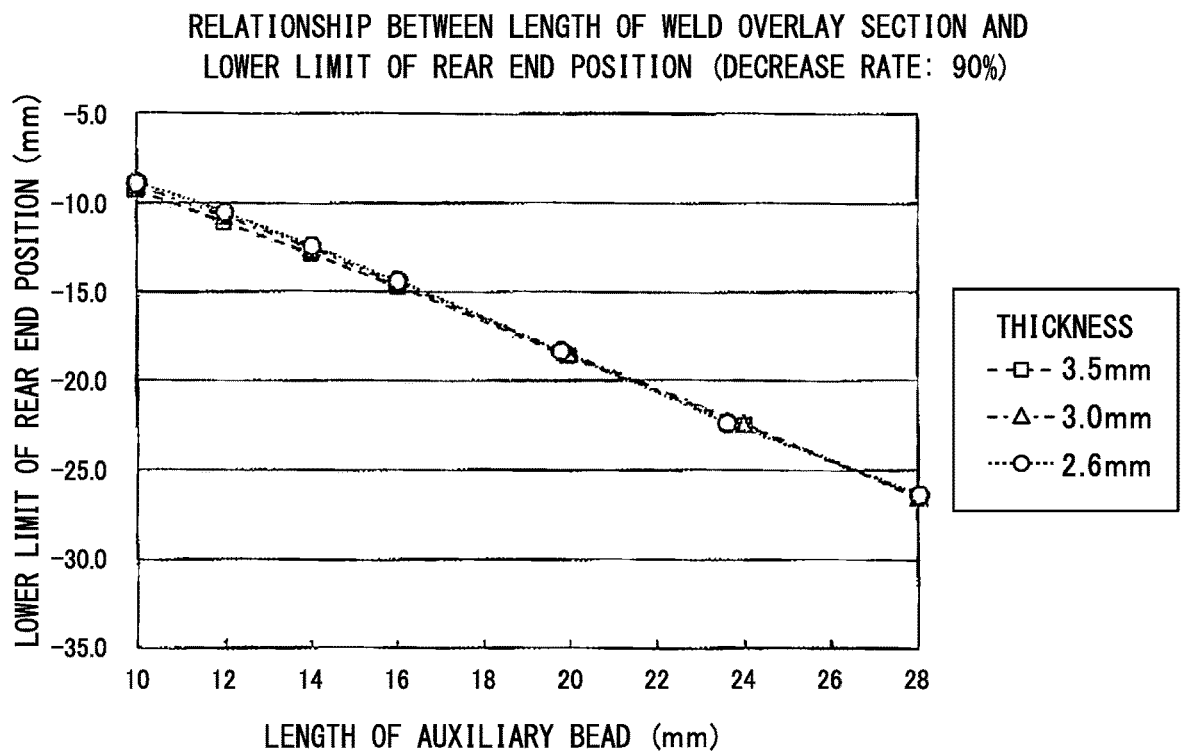
FIG. 13D is a graph illustrating a relationship between the length of the weld overlay section and the lower limit of the rear end position of the weld overlay section, when the decrease rate of the maximum value of the maximum main stress in the abutting end section is 90%.

As it is known from FIG. 13A, a lower limit of the rear end position of the weld overlay sections 30a and 30b at the time that the decrease rate became 30% decreased according to an increase in the length of the weld overlay sections 30a and 30b. As illustrated in FIGS. 13B, 13C, and 13D, such a relationship was also confirmed in a case where the decrease rate was 50%, 75%, and 90%.

Figure 14A:
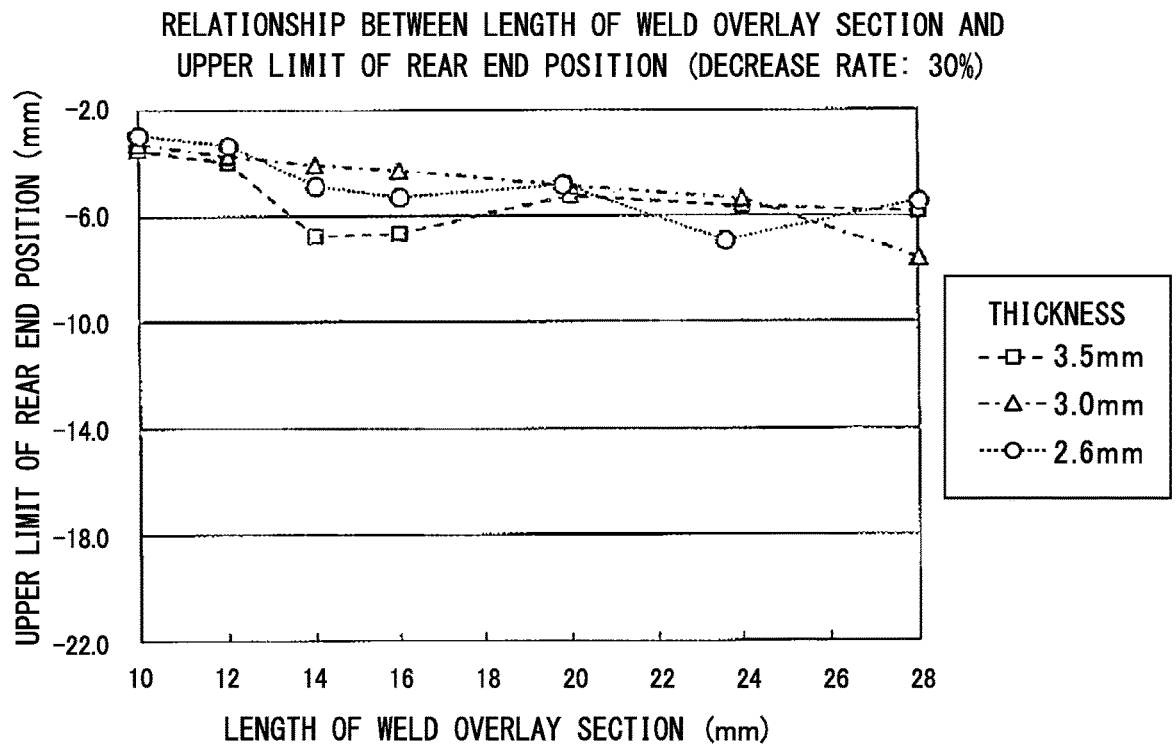
FIG. 14A is a graph illustrating a relationship between the length of the weld overlay section and an upper limit of the rear end position of the weld overlay section, when the decrease rate of the maximum value of the maximum main stress in the abutting end section is 30%.
Figure 14B:
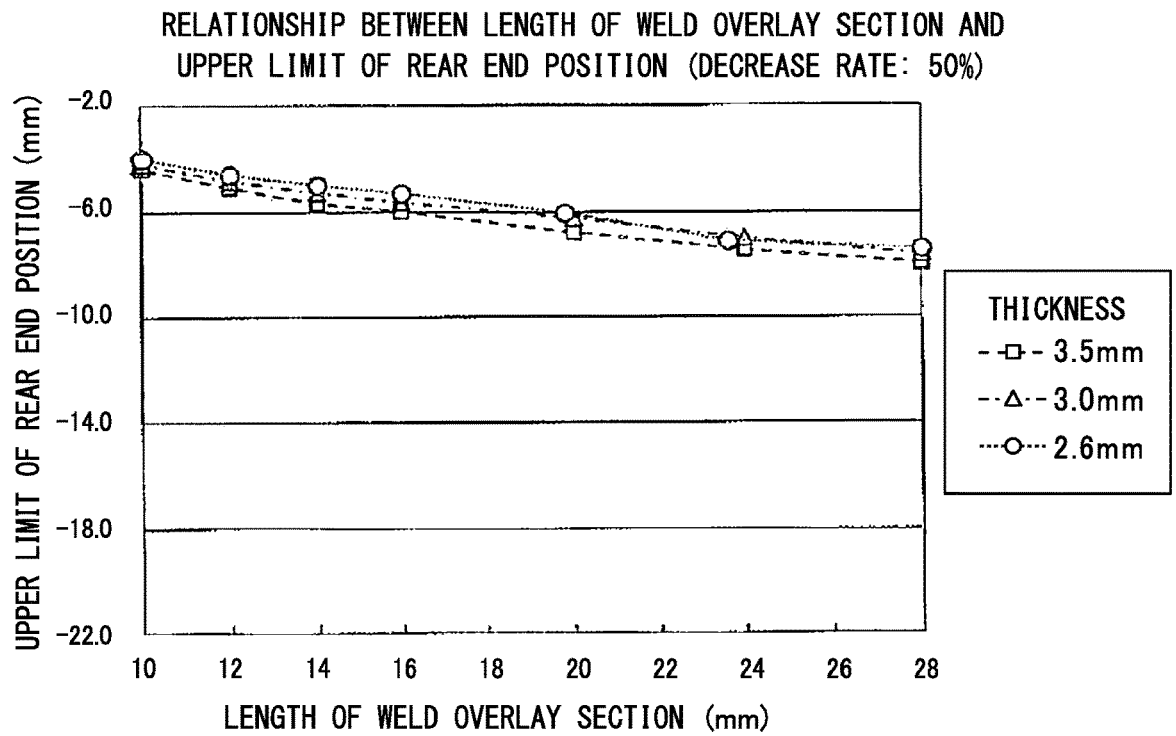
FIG. 14B is a graph illustrating a relationship between the length of the weld overlay section and the upper limit of the rear end position of the weld overlay section, when the decrease rate of the maximum value of the maximum main stress in the abutting end section is 50%.
Figure 14C:
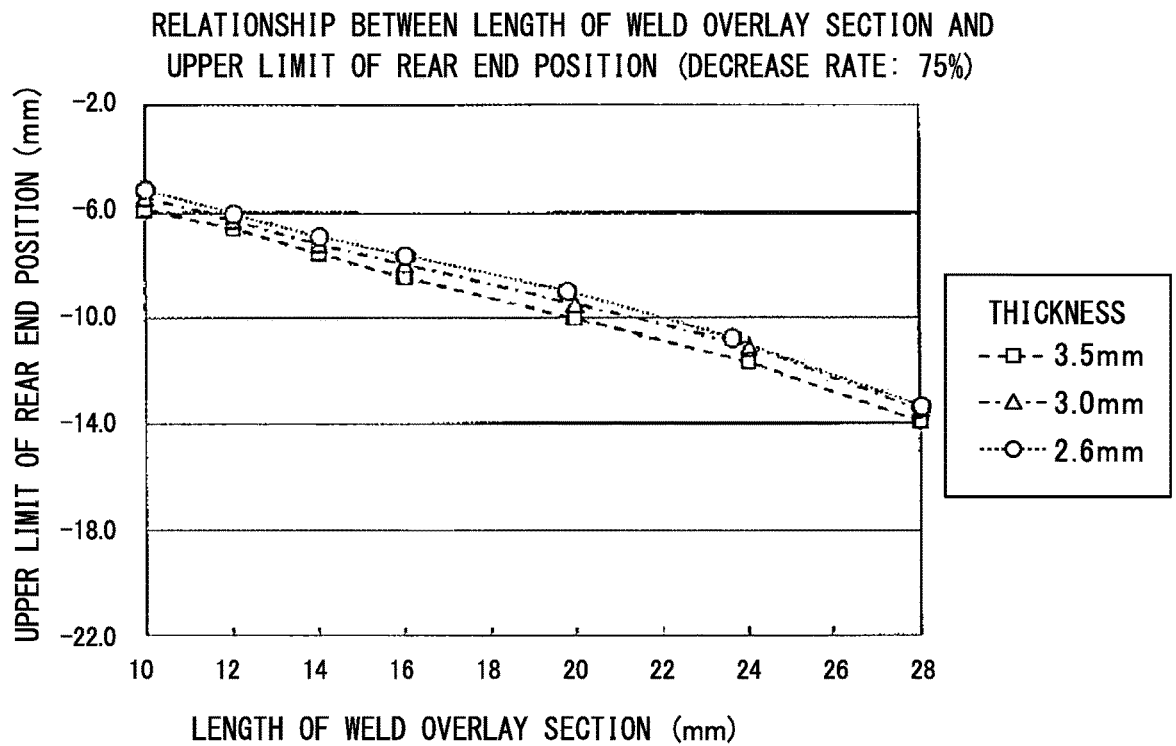
FIG. 14C is a graph illustrating a relationship between the length of the weld overlay section and the upper limit of the rear end position of the weld overlay section, when the decrease rate of the maximum value of the maximum main stress in the abutting end section is 75%.
Figure 14D:
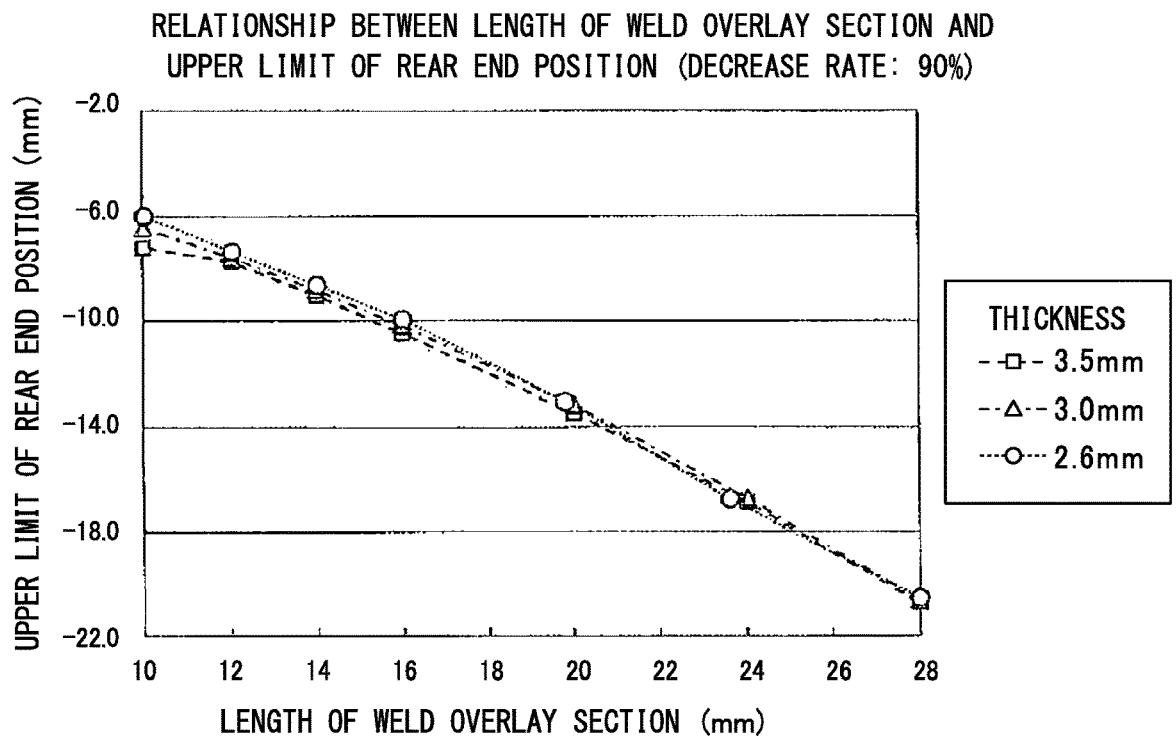
FIG. 14D is a graph illustrating a relationship between the length of the weld overlay section and the upper limit of the rear end position of the weld overlay section, when the decrease rate of the maximum value of the maximum main stress in the abutting end section is 90%.

In addition, as illustrated in FIGS. 14B, 14C, and 14D, an upper limit of the rear end position of the weld overlay sections 30a and 30b at the time that the decrease rate was 50%, 75%, and 90% decreased according to an increase in the length of the weld overlay sections 30a and 30b. In contrast, as illustrated in FIG. 14A, in a case where the decrease rate was 30%, the upper limit of the rear end position of the weld overlay sections 30a and 30b did not greatly decrease even in a case where the length of the weld overlay sections 30a and 30b increased.

Furthermore, as it is known from FIG. 14A, in a case where the plate thickness of the base metal member 14 is 2.6 mm, insofar as the upper limit of the rear end position of the weld overlay sections 30a and 30b is less than or equal to −7.0 mm, it is possible to set the decrease rate to be at least 30% regardless of the length of the weld overlay sections 30a and 30b. Here, the maximum value of the maximum main stress which is generated in the vicinity of the abutting end sections 32a and 32b is higher in a case where the thickness of the base metal member 14 is 3.0 mm than in a case where the thickness of the base metal member 14 is 3.5 mm, and is higher in a case where the thickness of the base metal member 14 is 2.6 mm than in a case where the thickness of the base metal member 14 is 3.0 mm. Therefore, in particular, in a case where the thickness of the base metal member 14 decreases, it is preferable to increase the decrease rate. From such a viewpoint, it is preferable that the upper limit of the rear end position of the weld overlay sections 30a and 30b is less than or equal to −7.0 mm. In other words, (B) the rear end of the weld overlay sections 30a and 30b is positioned on the rear from a position which is separated from the abutting end sections 32a and 32b to the rear by 7.0 mm, and thus, the decrease rate of at least 30% can be realized. Accordingly, it is possible to sufficiently reduce the maximum value of the maximum main stress which is generated in the vicinity of the abutting end sections 32a and 32b, and thus, even in a case where the thickness of the base metal member 14 decreases, it is possible to sufficiently ensure the fatigue strength of the welded structure member 10.

In consideration of (A) and (B) described above, in order to more reliably realize the decrease rate of greater than or equal to 30%, it is preferable that the weld overlay sections 30a and 30b are disposed over a position which is separated at least from the abutting end sections 32a and 32b to the rear by 1.9 mm to 7.0 mm.

Figure 11D:
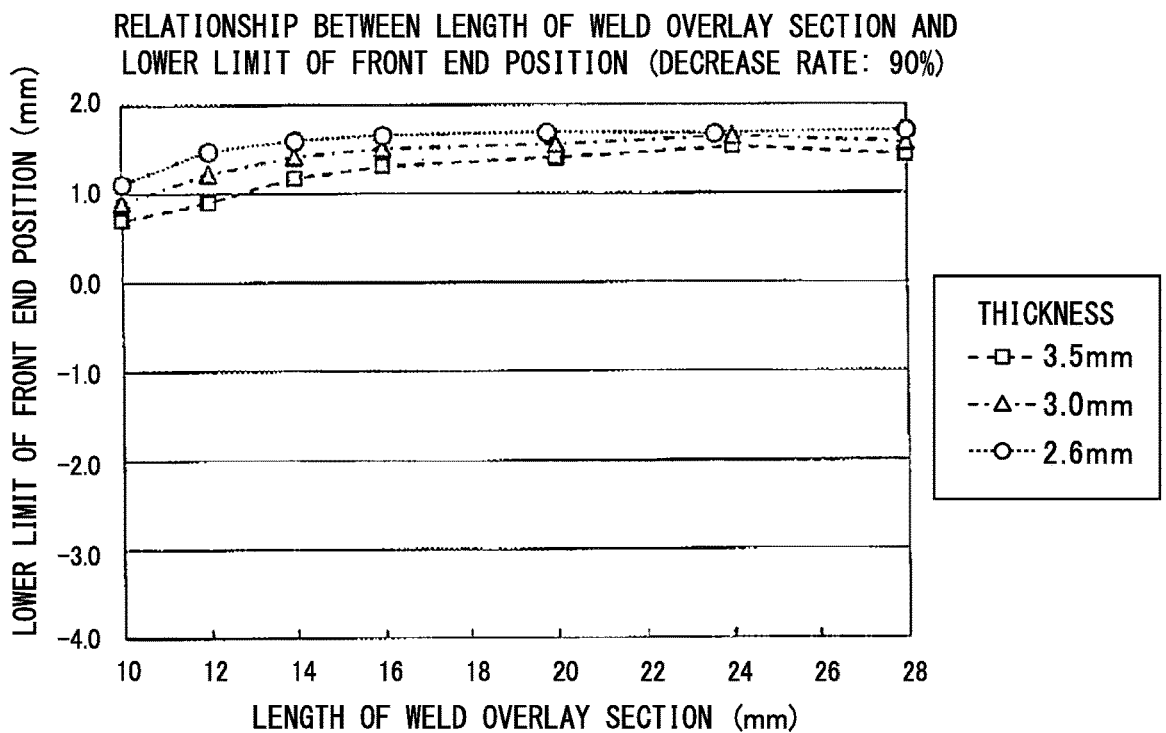
FIG. 11D is a graph illustrating a relationship between the length of the weld overlay section and the lower limit of the front end position of the weld overlay section, when the decrease rate of the maximum value of the maximum main stress in the abutting end section is 90%.

In addition, in consideration of 90% at which an improvement rate is further improved, as illustrated in FIG. 11D and FIG. 12D, both of the upper limit and the lower limit of the front end position of the weld overlay section are positive values. In addition, as illustrated in FIG. 13D and FIG. 14D, both of the upper limit and the lower limit of the rear end position of the weld overlay section are negative values. From this, in order for better improvement, it is preferable that the weld overlay sections 30a and 30b are disposed to cross the abutting end sections 32a and 32b.

(Examination 3 Based on Simulation)

Hereinafter, a simulation result using a computer and the effect of the configuration according to the second embodiment will be described in more detail. In this simulation, an analysis model (hereinafter, also referred to as a third model) having the same configuration as that of the welded structure member 10B illustrated in FIGS. 6 to 9 was prepared. Then, in the third model, the maximum main stress which was generated in the vicinity of the weld bead end sections 24a and 24b was obtained by changing the position and the length of the weld overlay sections 30a and 30b in the front-rear direction. In addition, an analysis model not including the weld overlay sections 30a and 30b (hereinafter, also referred to as a fourth model) was prepared for comparison, and the maximum main stress which was generated in the vicinity of the weld bead end sections 24a and 24b was obtained.

Furthermore, in both of the third model and the fourth model, holes were formed in positions illustrated by the dotted circles 41a, 41b, 42a, 42b, 43a, 43b, 44a, 44b, 45a, and 45b in FIG. 6 and FIG. 7 (hereinafter, each of the holes illustrated by the dotted line will be referred to as a hole). In the simulation, a fixing jig (a rigid body) was disposed on each of the holes 42a, 42b, 43a, 43b, 44a, 44b, 45a, and 45b, and the base metal member 14 was fixed. Then, a columnar member (a rigid body) penetrated through the holes 41a and 41b, the plate-like section 121 (the joined metal member 12) was pulled in a direction perpendicular to the front surface 14a of the plate-like section 141 by a force of 2.0 kN through the member.

The configuration of both of the third model and the fourth model was defined as described below. Furthermore, as described above, in the third model, the position of the weld overlay sections 30a and 30b in the front-rear direction was variously changed.

(Configuration of Analysis Model)
Joined Metal Member
  Material: Steel
  Thickness: 2.6 mm
  Height (Length in First Direction D1): 80 mm
  Length in Right-Left Direction (Second Direction D2): 70 mm
  Length in Front-Rear Direction (refer to FIG. 9): 80 mm
  Position of Hole 41a: Center of Side Wall Section 121a
  Position of Hole 41b: Center of Side Wall Section 121b
  Young's Modulus: 210,000 MPa
  Poisson's Ratio: 0.3
Base Metal Member
  Material: Steel
  Thickness: 2.0 mm
  Height (Length in First Direction D1): 50 mm
  Length in Right-Left Direction (Second Direction D2): 300 mm
  Length in Front-Rear Direction (refer to FIG. 9): 150 mm
  Center-to-Center Distance between Holes 42a and 42b: 230 mm
  Center-to-Center Distance between Holes 43a and 43b: 230 mm
  Center-to-Center Distance between Holes 44a and 44b: 230 mm Center-to-Center Distance between Holes 45a and 45b:
    230 mm
Center-to-Center Distance between Holes 42a and 43a:
    100 mm
Center-to-Center Distance between Holes 42b and 43b:
    100 mm
Distance in Vertical Direction from Front Surface 14a
    to Center of Holes 44a, 44b, 45a, and 45b: 25 mm
Young's Modulus: 210,000 MPa
Poisson's Ratio: 0.3
Weld Bead
    Width (Width of Section Excluding Section Protruding
        from Abutting End Sections 32a and 32b (refer to
        FIG. 9) to Front): 4.3 mm
    Height (Height of Section Excluding Section Protruding from Abutting End Sections 32a and 32b to
        Front): 5.0 mm
    Width (Width of Section Protruding from Abutting End
        Sections 32a and 32b to Front): 10.6 mm
    Height (Height of Section Protruding from Abutting
        End Sections 32a and 32b to Front): 2.2 mm
    Protrusion Amount (Distance $L_W$) from Abutting End
        Sections 32a and 32b: 13.7 mm
    Young's Modulus: 210,000 MPa
    Poisson's Ratio: 0.3
Weld Overlay Section (Third Model)
    Width: 6.0 mm
    Height: 2.0 mm
    Length: 6.0 mm, 10.0 mm, 12.0 mm, 14.0 mm, 16.0
        mm, 20.0 mm, 24.0 mm, and 28.0 mm
    Position of Weld Overlay Section 30a in Right-Left
        Direction: Center Line of Weld Overlay Section 30a
        is Coincident with Left Edge of Abutting Side Surface 322a (refer to FIG. 9)
    Position of Weld Overlay Section 30b in Right-Left
        Direction: Center Line of Weld Overlay Section 30b
        is Coincident with Right Edge of Abutting Side
        Surface 322b (refer to FIG. 9)
    Young's Modulus: 210,000 MPa
    Poisson's Ratio: 0.3

Furthermore, in a case where the analysis is performed in consideration of the yield of the material of the joined metal member 12 and the base metal member 14 and in a case where the analysis is performed without consideration of the yield, a magnitude relationship between a stress generated in the third model and a stress generated in the fourth model is not changed. Therefore, in a case where a magnitude relationship between the maximum main stress generated in the third model and the maximum main stress generated in the fourth model is relatively evaluated, the presence or absence of the yield of the material may not be considered. Therefore, in this simulation, in order to simplify the analysis, elastic property analysis was performed without consideration of the yield of the material of the joined metal member 12 and the base metal member 14. In addition, in a case where the magnitude relationship between the maximum main stresses is relatively evaluated as described above, the yield of the material may not be considered, and thus, it is possible to evaluate the welded structure member including the joined metal member 12 and the base metal member 14 having an arbitrary tensile strength by this simulation. That is, for example, it is possible to evaluate a welded structure member using a material having a tensile strength of 270 MPa, and to evaluate a welded structure member using a material having a tensile strength of 1,500 MPa, by this simulation.

In FIG. 15A, a relationship between the front end position of the weld overlay section 30a and a maximum value of the maximum main stress which is generated in the vicinity of the weld bead end section 24a at each length of the weld overlay section 30a (refer to FIG. 9) is illustrated. Furthermore, the front end position of the weld overlay section 30a indicates the position of the front end of the weld overlay section 30a in the front-rear direction in a case of being on the basis of the weld bead end section 24a (refer to FIG. 9). In FIG. 15A, in a case where the front end of the weld overlay section 30a is positioned on the front from the weld bead end section 24a, the front end position of the weld overlay section 30a is represented by a positive value, and in a case where the front end of the weld overlay section 30a is positioned on the rear from the weld bead end section 24a, the front end position of the weld overlay section 30a is represented by a negative value. For example, in the welded structure member 10B illustrated in FIG. 9, the front end of the weld overlay section 30a is positioned on the front from the weld bead end section 24a, and thus, the front end position of the weld overlay section 30a is represented by a positive value. In addition, in FIG. 15A, the maximum value (1,273 MPa) of the maximum main stress in the analysis model not including the weld overlay sections 30a and 30b is illustrated by a broken line. Furthermore, even though the description is omitted, a relationship between the front end position of the weld overlay section 30b and a maximum value of the maximum main stress which is generated in the vicinity of the weld bead end section 24b also became the same relationship as that illustrated in FIG. 15A.

Figure 15B:
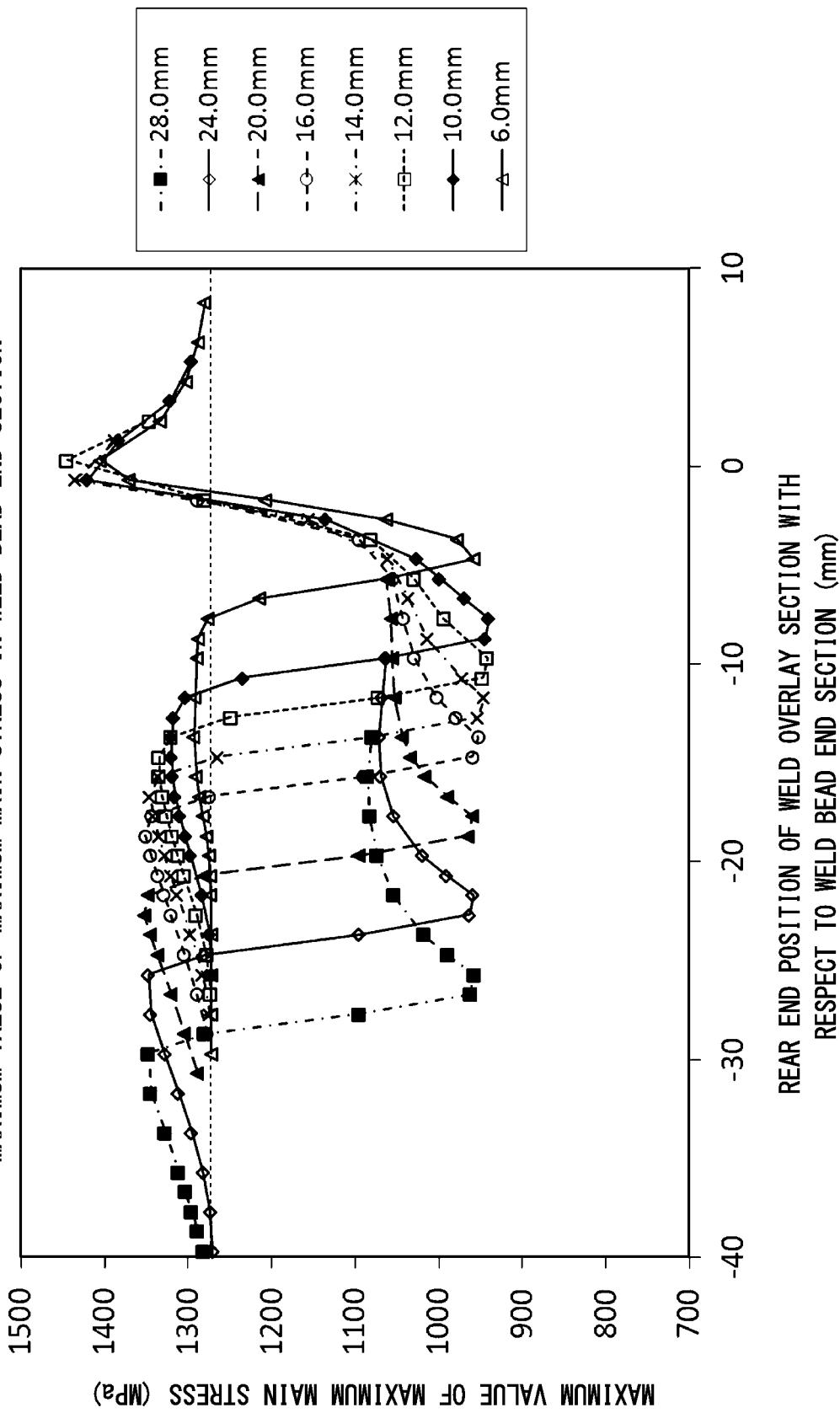
FIG. 15B is a graph illustrating a relationship between the rear end position of the weld overlay section with respect to the weld bead end section and the maximum value of the maximum main stress in the weld bead end section at each length of the weld overlay section, which is obtained by the computer analysis.

In FIG. 15B, a relationship between the rear end position of the weld overlay section 30a and the maximum value of the maximum main stress which is generated in the vicinity of the weld bead end section 24a at each length of the weld overlay section 30a (refer to FIG. 9) is illustrated. Furthermore, the rear end position of the weld overlay section 30a indicates the position of the rear end of the weld overlay section 30a in the front-rear direction in a case of being on the basis of the weld bead end section 24a (refer to FIG. 9). In FIG. 15B, in a case where the rear end of the weld overlay section 30a is positioned on the front from the weld bead end section 24a, the rear end position of the weld overlay section 30a is represented by a positive value, and in a case where the rear end of the weld overlay section 30a is positioned on the rear from the weld bead end section 24a, the rear end position of the weld overlay section 30a is represented by a negative value. For example, in the welded structure member 10B illustrated in FIG. 9, the rear end of the weld overlay section 30a is positioned on the rear from the weld bead end section 24a, and thus, the rear end position of the weld overlay section 30a is represented by a negative value. In addition, as with FIG. 15A, in FIG. 15B, the maximum value (1,273 MPa) of the maximum main stress in the analysis model not including the weld overlay sections 30a and 30b is illustrated by a broken line. Furthermore, even though the description is omitted, a relationship between the rear end position of the weld overlay section 30b and the maximum value of the maximum main stress which is generated in the vicinity of the weld bead end section 24b became the same relationship as that illustrated in FIG. 15B.

From FIG. 15A and FIG. 15B, it is known that according to the present invention, the front end position and the rear end position of the weld overlay sections 30a and 30b are suitably set, and thus, it is possible to reduce the maximum value of the maximum main stress of the weld bead end sections 24a and 24b. Specifically, from FIG. 15A, it is known that even in a case where the length of the weld overlay sections 30a and 30b is short, which is 6.0 mm, the front end position of the weld overlay sections 30a and 30b is set to be −1.7 mm to 4.7 mm, and thus, it is possible to reliably reduce the maximum value of the maximum main stress compared to a case where the weld overlay section does not exist. In addition, it is known that the front end position of the weld overlay sections 30a and 30b is set to be −0.1 mm to 3.7 mm, to be preferably 0.5 mm to 3.0 mm, and to be more preferably 1.0 mm to 2.4 mm, and thus, it is possible to sufficiently reduce the maximum value of the maximum main stress. In addition, as it is known from FIG. 15B, the rear end position of the weld overlay sections 30a and 30b was set to be less than or equal to −1.3 mm regardless of the length of the weld overlay sections 30a and 30b, and thus, it was possible to reduce the maximum value of the maximum main stress compared to a case where the weld overlay section did not exist.

(Examination 4 Based on Simulation)

With reference to FIG. 15A, in the simulation described above, in a case were the length of the weld overlay sections 30a and 30b was 6.0 mm, the maximum value of the maximum main stress decreased to 958 MPa when the front end position of the weld overlay sections 30a and 30b was 1.3 mm. As described above, the maximum value of the maximum main stress in the analysis model not including the weld overlay section was 1,273 MPa. Therefore, it is known that the weld overlay sections 30a and 30b are disposed, and thus, the maximum value of the maximum main stress maximally decreases by 315 MPa. At this time, when a decrease rate of the maximum value of the maximum main stress (a decrease rate of the maximum value of the maximum main stress with respect to the analysis model not including the weld overlay section) was set to 100%, the front end position of the weld overlay sections 30a and 30b at the time that the decrease rate became 30% (a decrease of 95 MPa) was −0.5 mm and 4.1 mm. That is, in a case where the front end position of the weld overlay sections 30a and 30b is in a range of −0.5 mm to 4.1 mm, it is possible to set the decrease rate of the maximum value of the maximum main stress (hereinafter, simply referred to as a) to be greater than or equal to 30%. That is, a lower limit of the front end position of the weld overlay sections 30a and 30b for setting the decrease rate to be greater than or equal to 30% is −0.5 mm, and an upper limit thereof is 4.1 mm.

Similarly, in a case where the length of the weld overlay sections 30a and 30b is 10.0 mm, the maximum value of the maximum main stress when the front end position of the weld overlay sections 30a and 30b was 2.3 mm decreased to 940 MPa. As described above, the maximum value of the maximum main stress in the analysis model not including the weld overlay section was 1,273 MPa. Therefore, it is known that the weld overlay sections 30a and 30b are disposed, and thus, the maximum value of the maximum main stress maximally decreases by 333 MPa. At this time, when the decrease rate was set to 100%, the front end position of the weld overlay sections 30a and 30b at the time that the decrease rate became 30% (a decrease of 100 MPa) was −0.3 mm and 7.6 mm. That is, the lower limit of the front end position of the weld overlay sections 30a and 30b for setting the decrease rate to be greater than or equal to 30% is −0.3 mm, and the upper limit thereof is 7.6 mm.

Even though the detailed description is omitted, in a case where the length of the weld overlay sections 30a and 30b was 12.0 mm, 14.0 mm, 16.0 mm, 20.0 mm, 24.0 mm, and 28.0 mm, the same examination was also performed with respect to the position of the weld overlay sections 30a and 30b for setting the decrease rate to be greater than or equal to 50%, to be greater than or equal to 75%, and to be greater than or equal to 90%. Further, in the third model described above, the thickness of the base metal member 14 was set to 2.3 mm, 1.6 mm, and 1.2 mm, and the same simulation as that described above was performed. Then, the same examination was performed with respect to a relationship between the decrease rate and the weld overlay sections 30a and 30b. Furthermore, even in a case where the thickness of the base metal member 14 is 2.3 mm, 1.6 mm, and 1.2 mm, the length of the weld overlay sections 30a and 30b was set to 6.0 mm, 10.0 mm, 12.0 mm, 14.0 mm, 16.0 mm, 20.0 mm, 24.0 mm, and 28.0 mm. Examination results thereof are shown in FIG. 16A to FIG. 19D along with examination results in a case where the thickness of the base metal member 14 is 2.0 mm.

Figure 16A:
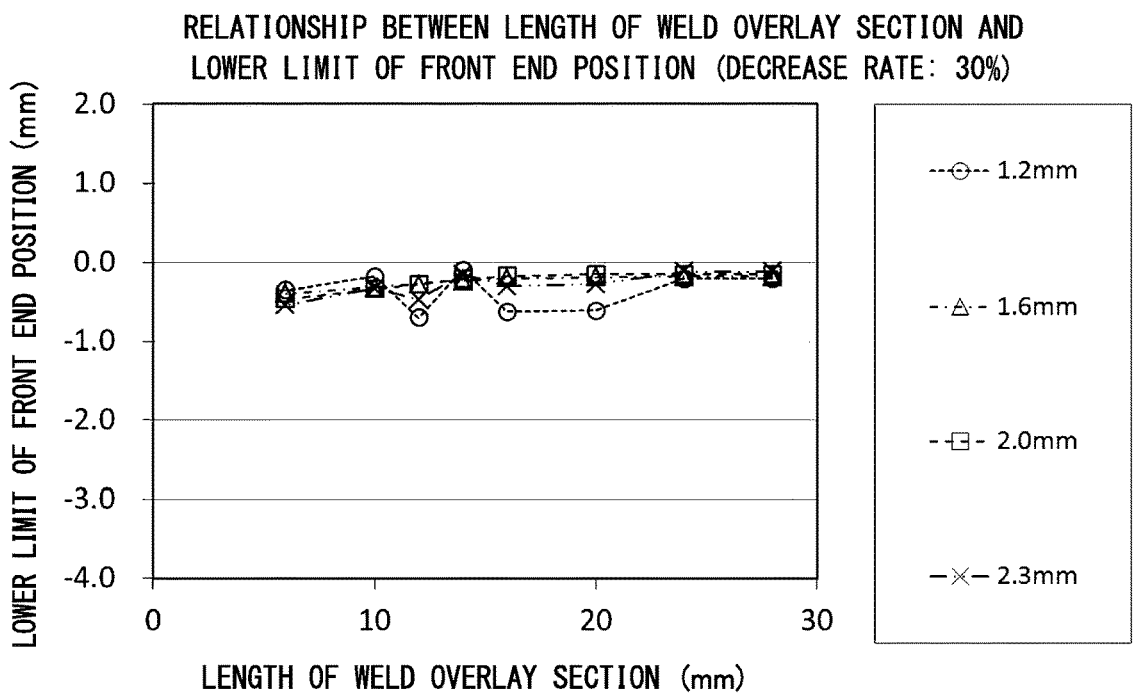
FIG. 16A is a graph illustrating a relationship between the length of the weld overlay section and the lower limit of the front end position of the weld overlay section, when the decrease rate of the maximum value of the maximum main stress in the weld bead end section is 30%.
Figure 16B:
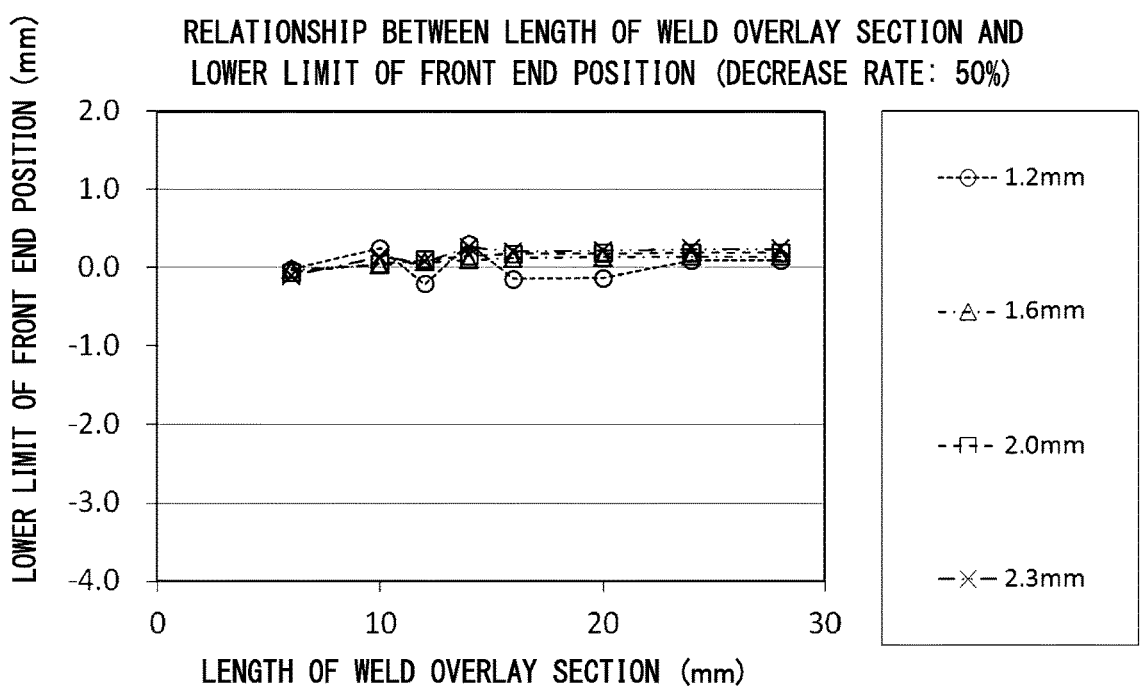
FIG. 16B is a graph illustrating a relationship between the length of the weld overlay section and the lower limit of the front end position of the weld overlay section, when the decrease rate of the maximum value of the maximum main stress in the weld bead end section is 50%.
Figure 16C:
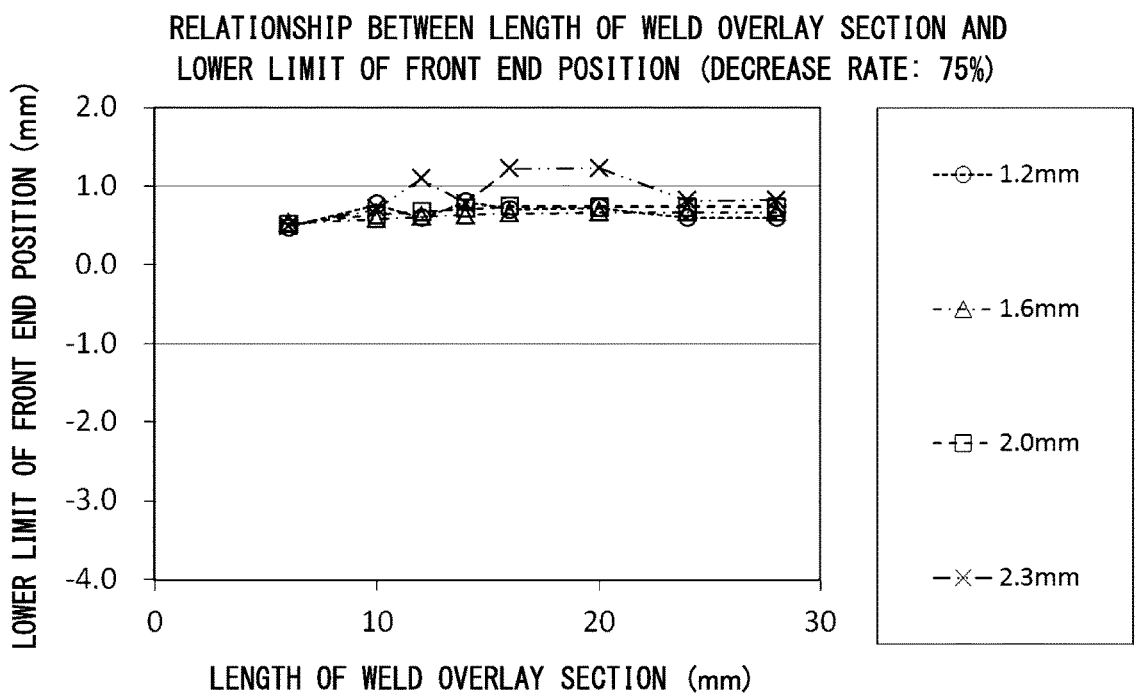
FIG. 16C is a graph illustrating a relationship between the length of the weld overlay section and the lower limit of the front end position of the weld overlay section, when the decrease rate of the maximum value of the maximum main stress in the weld bead end section is 75%.

As it is known from FIG. 16A, in a case where the lower limit of the front end position of the weld overlay sections 30a and 30b is greater than or equal to −0.1 mm, it is possible to set the decrease rate to be at least 30% regardless of the thickness of the base metal member 14 and the length of the weld overlay sections 30a and 30b. In other words, (C) the front end of the weld overlay sections 30a and 30b is positioned on the front from a position which is separated from the weld bead end sections 24a and 24b (refer to FIG. 9) to the rear by 0.1 mm, and thus, the decrease rate of at least 30% can be realized. In addition, from FIG. 16B to FIG. 16D, it was known that it was preferable that the front end of the weld overlay sections 30a and 30b was positioned on the front from a position which was separated from the weld bead end sections 24a and 24b to the front by 0.3 mm, it was more preferable that the front end of the weld overlay sections 30a and 30b was positioned on the front from a position which was separated from the weld bead end sections 24a and 24b to the front by 1.2 mm, and it was even more preferable that the front end of the weld overlay sections 30a and 30b was positioned on the front from a position which was separated from the weld bead end sections 24a and 24b to the front by 1.9 mm.

Figure 17A:
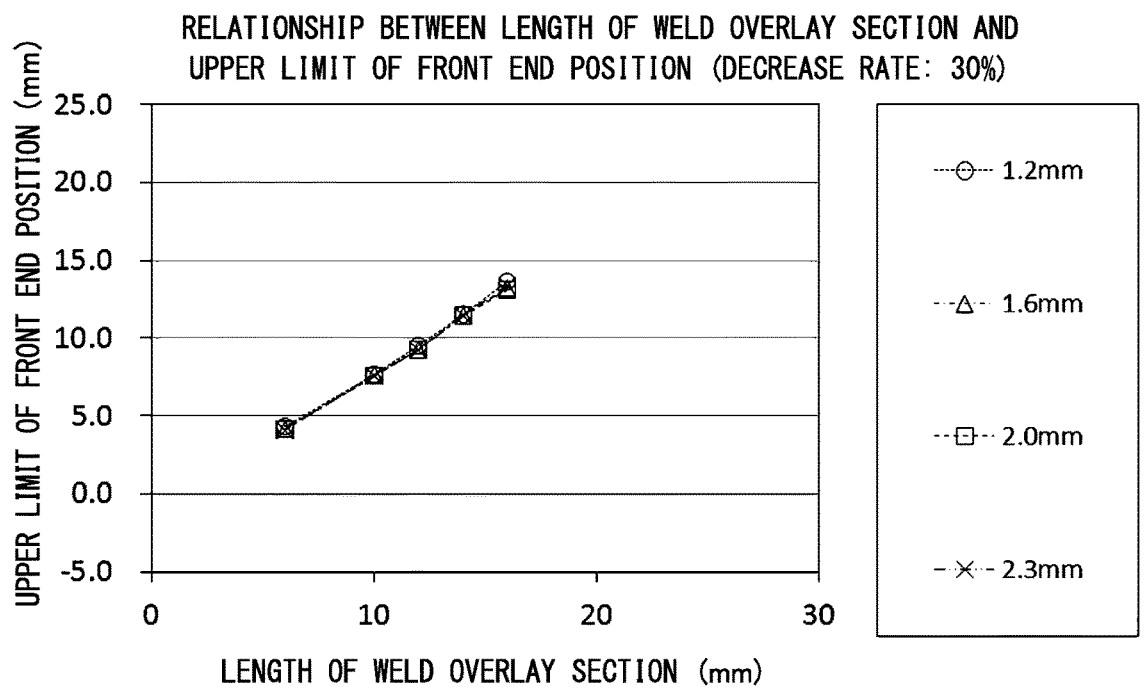
FIG. 17A is a graph illustrating a relationship between the length of the weld overlay section and the upper limit of the front end position of the weld overlay section, when the decrease rate of the maximum value of the maximum main stress in the weld bead end section is 30%.
Figure 17B:
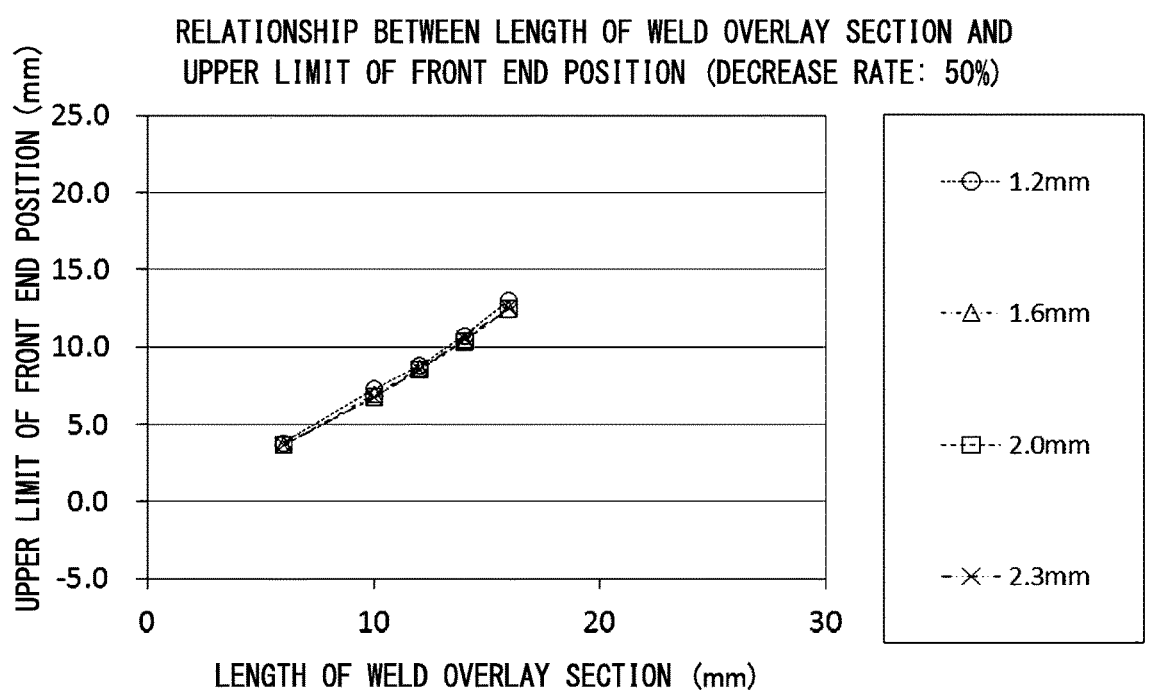
FIG. 17B is a graph illustrating a relationship between the length of the weld overlay section and the upper limit of the front end position of the weld overlay section, when the decrease rate of the maximum value of the maximum main stress in the weld bead end section is 50%.
Figure 17C:
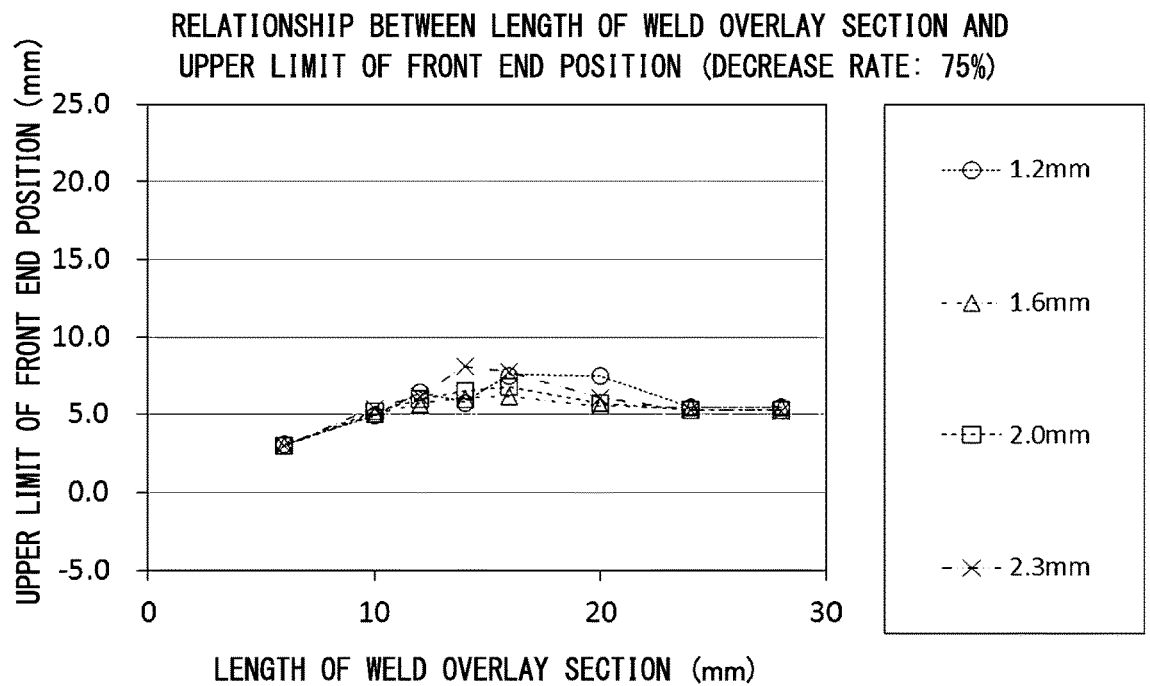
FIG. 17C is a graph illustrating a relationship between the length of the weld overlay section and the upper limit of the front end position of the weld overlay section, when the decrease rate of the maximum value of the maximum main stress in the weld bead end section is 75%.
Figure 17D:
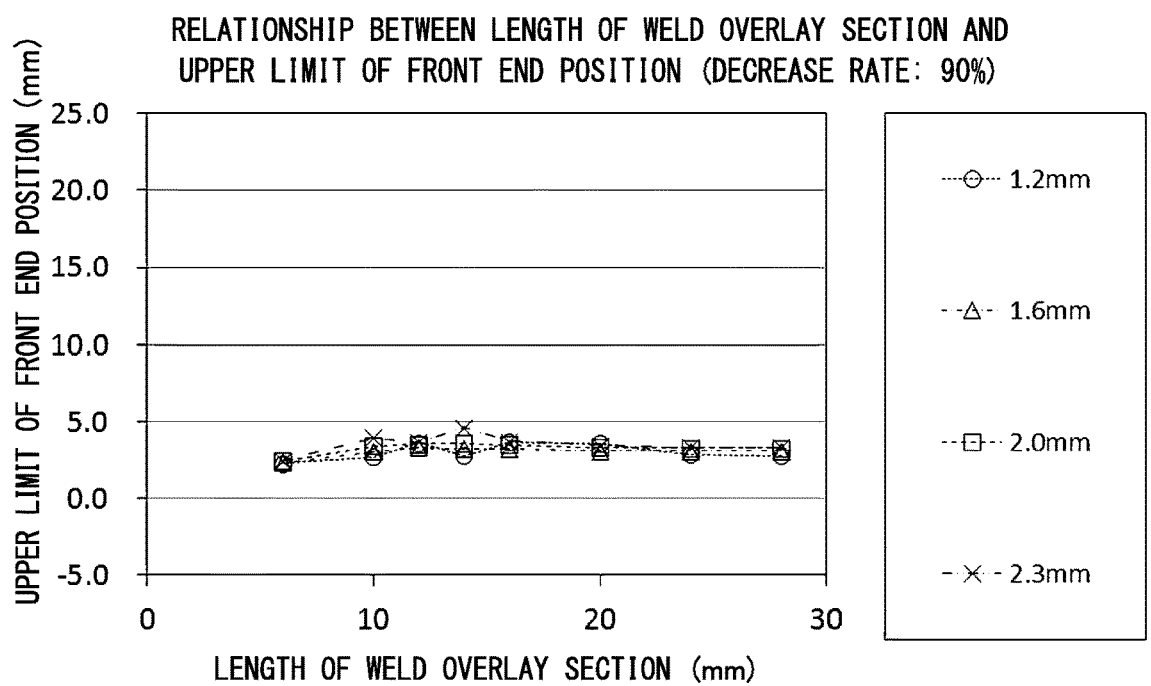
FIG. 17D is a graph illustrating a relationship between the length of the weld overlay section and the upper limit of the front end position of the weld overlay section, when the decrease rate of the maximum value of the maximum main stress in the weld bead end section is 90%.

As it is known from FIG. 17A, an upper limit of the front end position of the weld overlay sections 30a and 30b at the time that the decrease rate became 30% increased according to an increase in the length of the weld overlay sections 30a and 30b. As illustrated in FIG. 17B, such a relationship was also confirmed in a case where the decrease rate was 50%. In contrast, as illustrated in FIG. 17C and FIG. 17D, in a case where the decrease rate was 75% and 90%, the upper limit of the front end position of the weld overlay sections 30a and 30b did not greatly increase even in a case where the length of the weld overlay sections 30a and 30b increased. Specifically, in a case where the upper limit of the front end position of the weld overlay sections 30a and 30b was less than or equal to 2.3 mm, it was possible to set the decrease rate to be at least 90% regardless of the length of the weld overlay sections 30a and 30b.

Figure 18A:
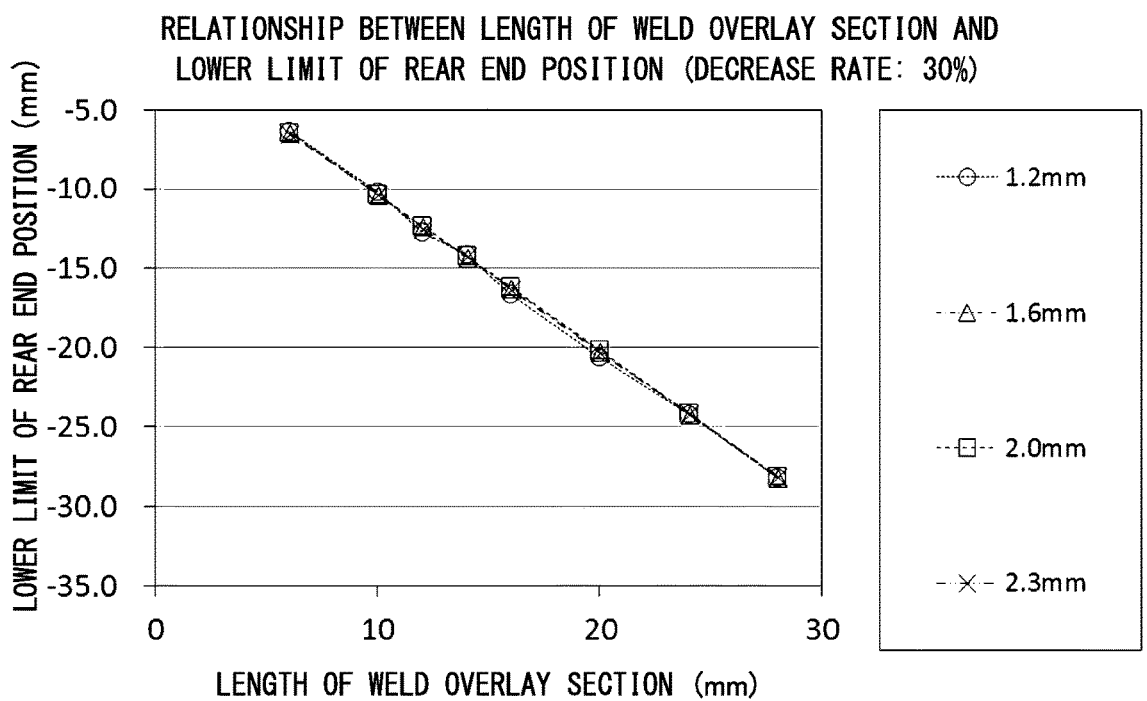
FIG. 18A is a graph illustrating a relationship between the length of the weld overlay section and the lower limit of the rear end position of the weld overlay section, when the decrease rate of the maximum value of the maximum main stress in the weld bead end section is 30%.
Figure 18B:
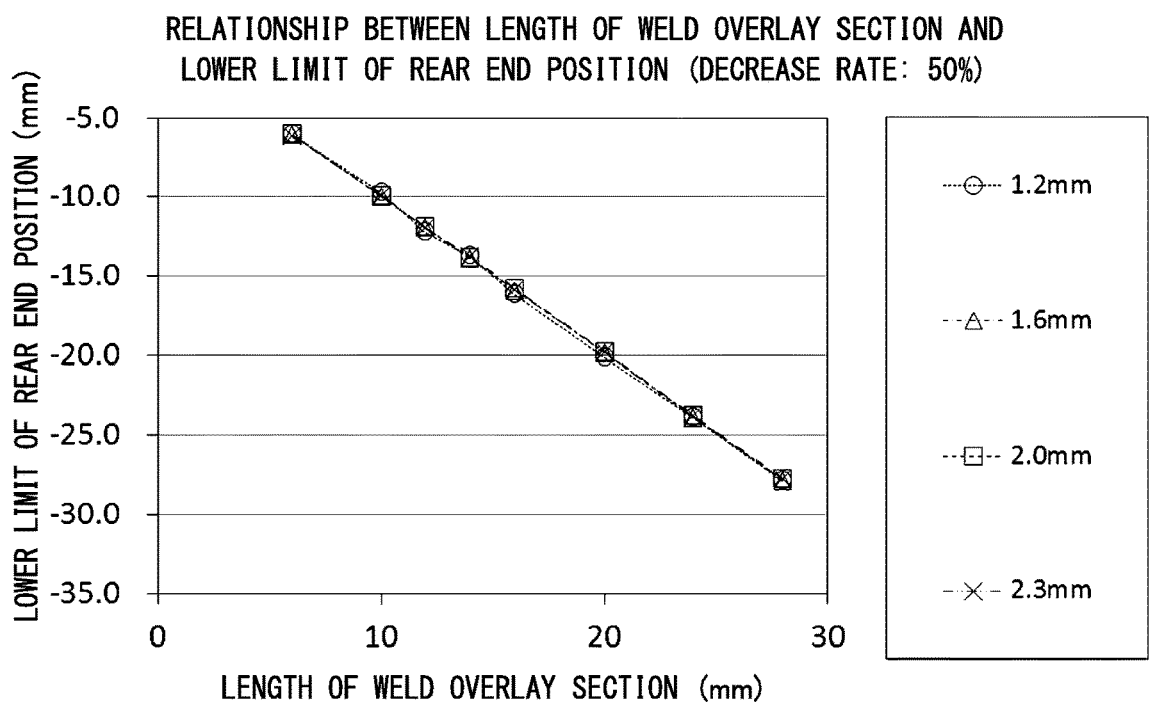
FIG. 18B is a graph illustrating a relationship between the length of the weld overlay section and the lower limit of the rear end position of the weld overlay section, when the decrease rate of the maximum value of the maximum main stress in the weld bead end section is 50%.
Figure 18C:
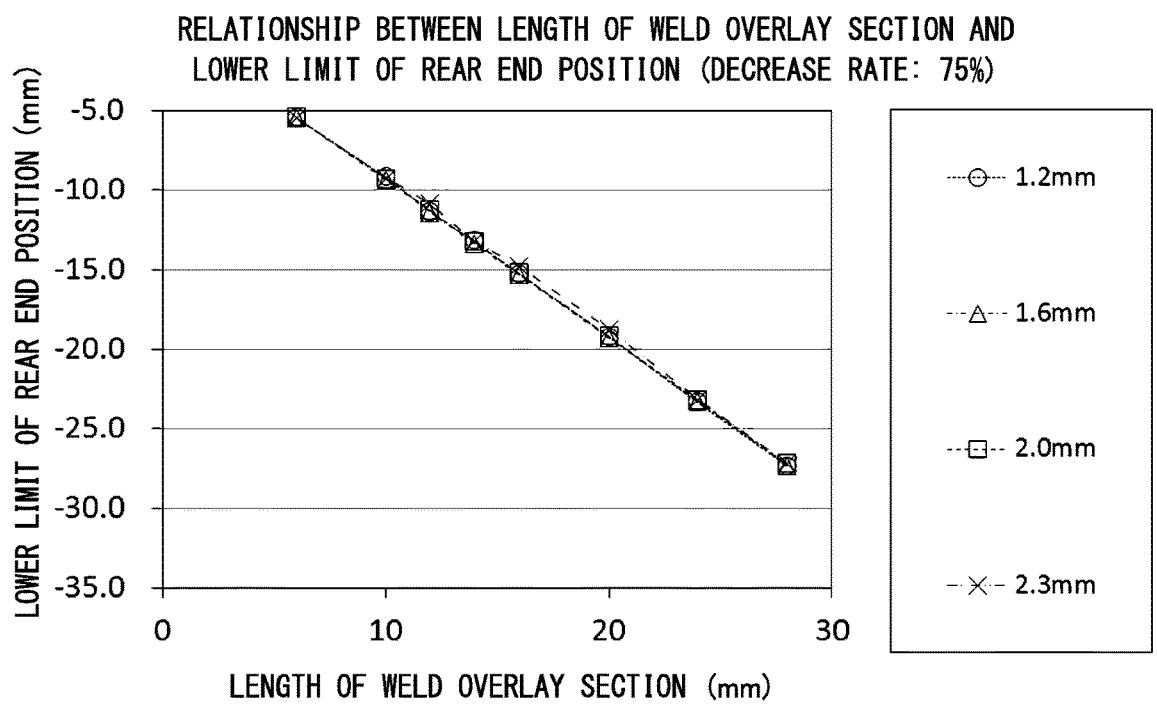
FIG. 18C is a graph illustrating a relationship between the length of the weld overlay section and the lower limit of the rear end position of the weld overlay section, when the decrease rate of the maximum value of the maximum main stress in the weld bead end section is 75%.
Figure 18D:
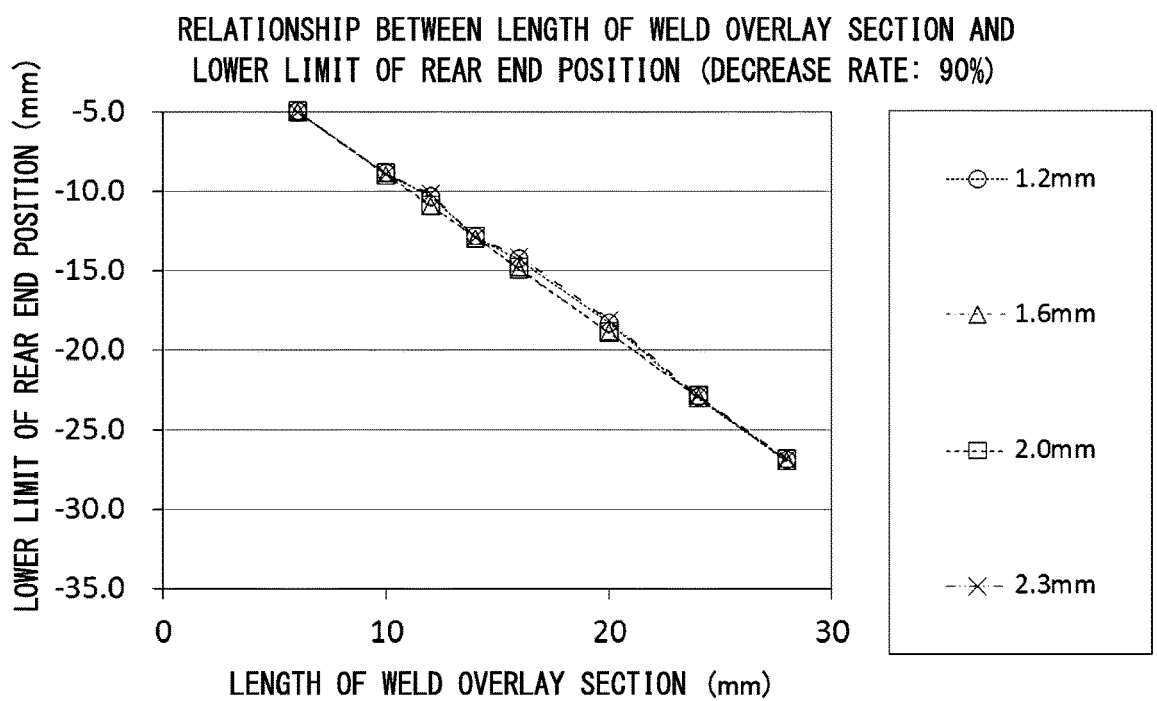
FIG. 18D is a graph illustrating a relationship between the length of the weld overlay section and the lower limit of the rear end position of the weld overlay section, when the decrease rate of the maximum value of the maximum main stress in the weld bead end section is 90%.

As it is known from FIG. 18A, a lower limit of the rear end position of the weld overlay sections 30a and 30b at the time that the decrease rate became 30% decreased according to an increase in the length of the weld overlay sections 30a and 30b. As illustrated in FIG. 18B to FIG. 18D, such a relationship was also confirmed in a case where the decrease rate was 50%, 75%, and 90%.

Figure 19A:
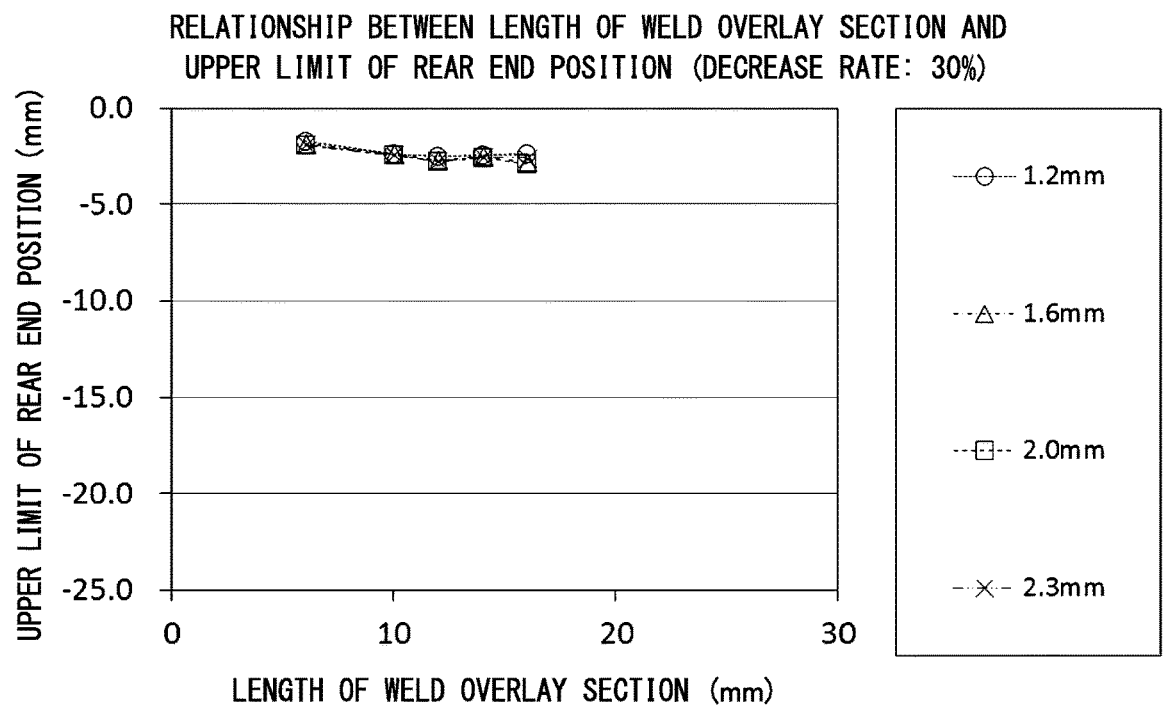
FIG. 19A is a graph illustrating a relationship between the length of the weld overlay section and the upper limit of the rear end position of the weld overlay section, when the decrease rate of the maximum value of the maximum main stress in the weld bead end section is 30%.
Figure 19B:
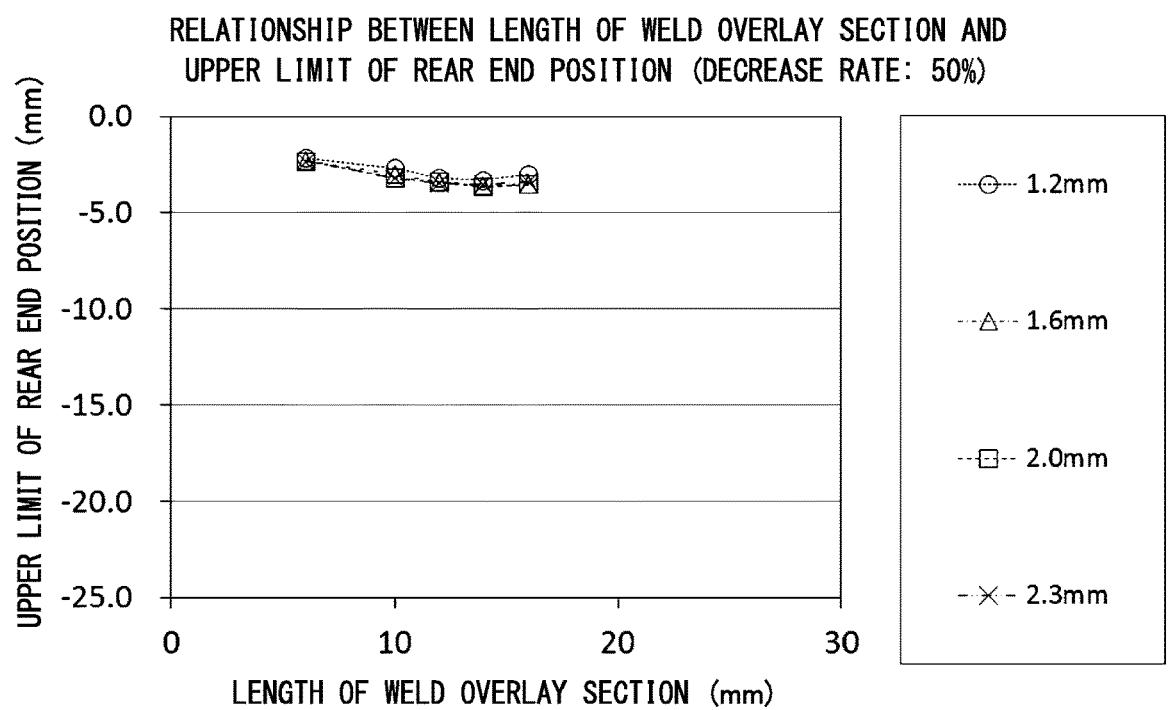
FIG. 19B is a graph illustrating a relationship between the length of the weld overlay section and the upper limit of the rear end position of the weld overlay section, when the decrease rate of the maximum value of the maximum main stress in the weld bead end section is 50%.
Figure 19C:
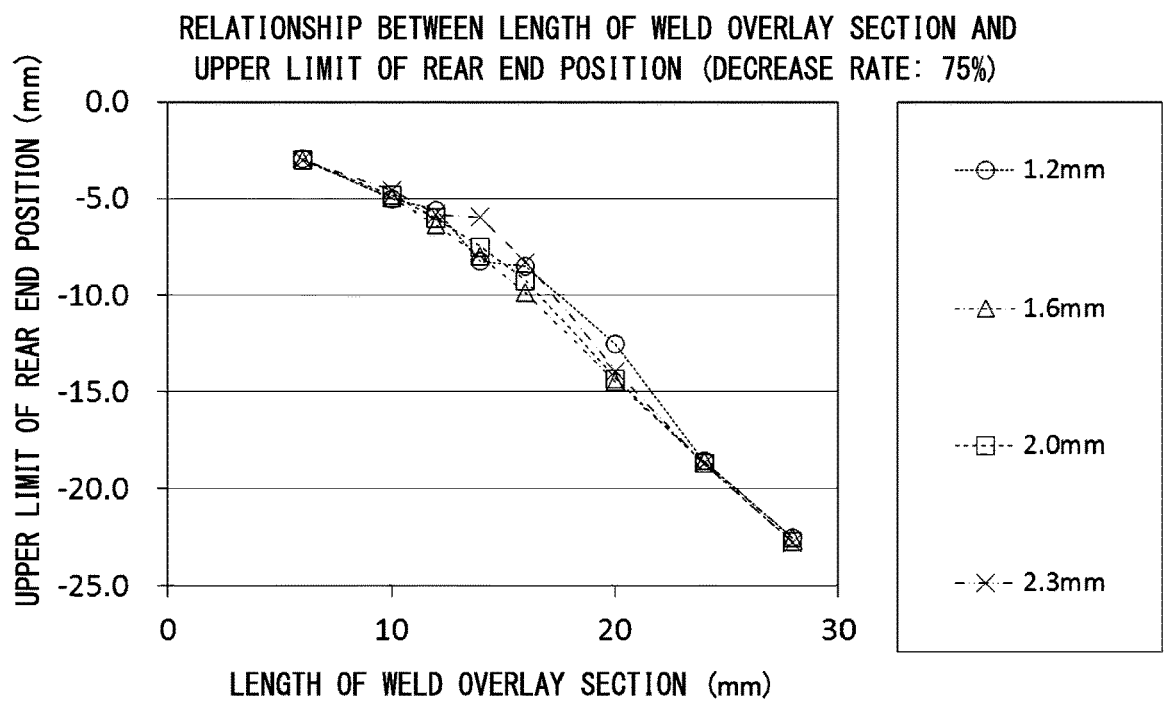
FIG. 19C is a graph illustrating a relationship between the length of the weld overlay section and the upper limit of the rear end position of the weld overlay section, when the decrease rate of the maximum value of the maximum main stress in the weld bead end section is 75%.

As it is known from FIG. 19A and FIG. 19B, the upper limit of the rear end position of the weld overlay sections 30a and 30b at the time that the decrease rate became 30% or 50% was approximately constant. In contrast, as it is known from FIG. 19C and FIG. 19D, the upper limit of the rear end position of the weld overlay sections 30a and 30b at the time that the decrease rate became 75% or 90% decreased according to an increase in the length of the weld overlay sections 30a and 30b.

Furthermore, as it is known from FIG. 19A, in a case where the upper limit of the rear end position of the weld overlay sections 30a and 30b is less than or equal to −3.0 mm, it is possible to set the decrease rate to be at least 30% regardless of the plate thickness of the base metal member 14 and the length of the weld overlay sections 30a and 30b. In other words, (D) the rear end of the weld overlay sections 30a and 30b is positioned on the rear from a position which is separated from the weld bead end sections 24a and 24b to the rear by 3.0 mm, and thus, the decrease rate of at least 30% can be realized. Accordingly, it is possible to sufficiently reduce the maximum value of the maximum main stress which is generated in the vicinity of the weld bead end sections 24a and 24b, and thus, even in a case where the thickness of the base metal member 14 decreases, it is possible to sufficiently ensure the fatigue strength of the welded structure member 10.

In consideration of (C) and (D) described above, in order to more reliably realize the decrease rate of greater than or equal to 30%, it is preferable that the weld overlay sections 30a and 30b are disposed over a position which is separated at least from the at least weld bead end section to the rear by 0.1 mm to 3.0 mm.

Figure 16D:
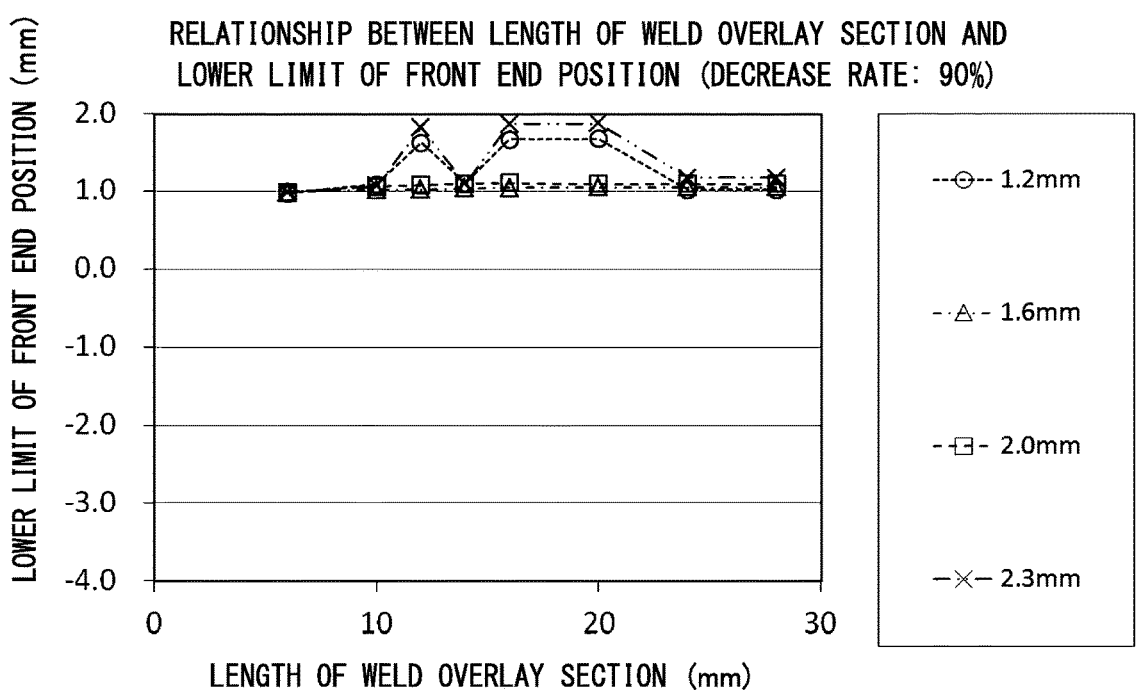
FIG. 16D is a graph illustrating a relationship between the length of the weld overlay section and the lower limit of the front end position of the weld overlay section, when the decrease rate of the maximum value of the maximum main stress in the weld bead end section is 90%.
Figure 19D:
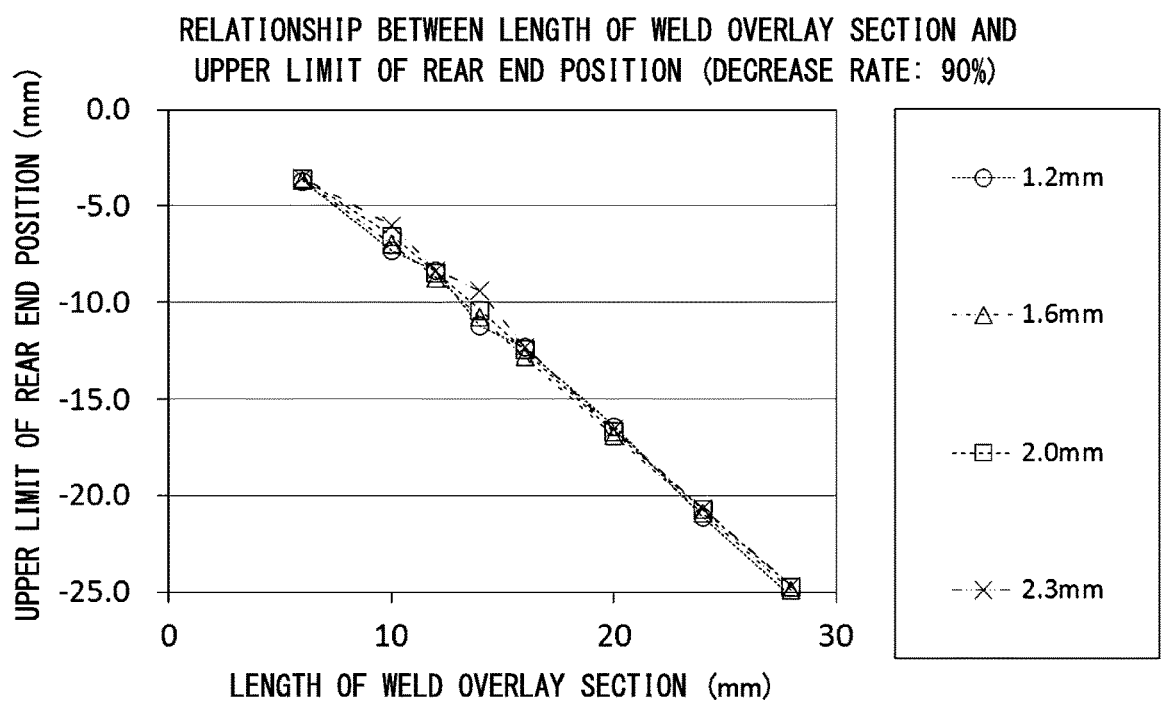
FIG. 19D is a graph illustrating a relationship between the length of the weld overlay section and the upper limit of the rear end position of the weld overlay section, when the decrease rate of the maximum value of the maximum main stress in the weld bead end section is 90%.
Figure 20:
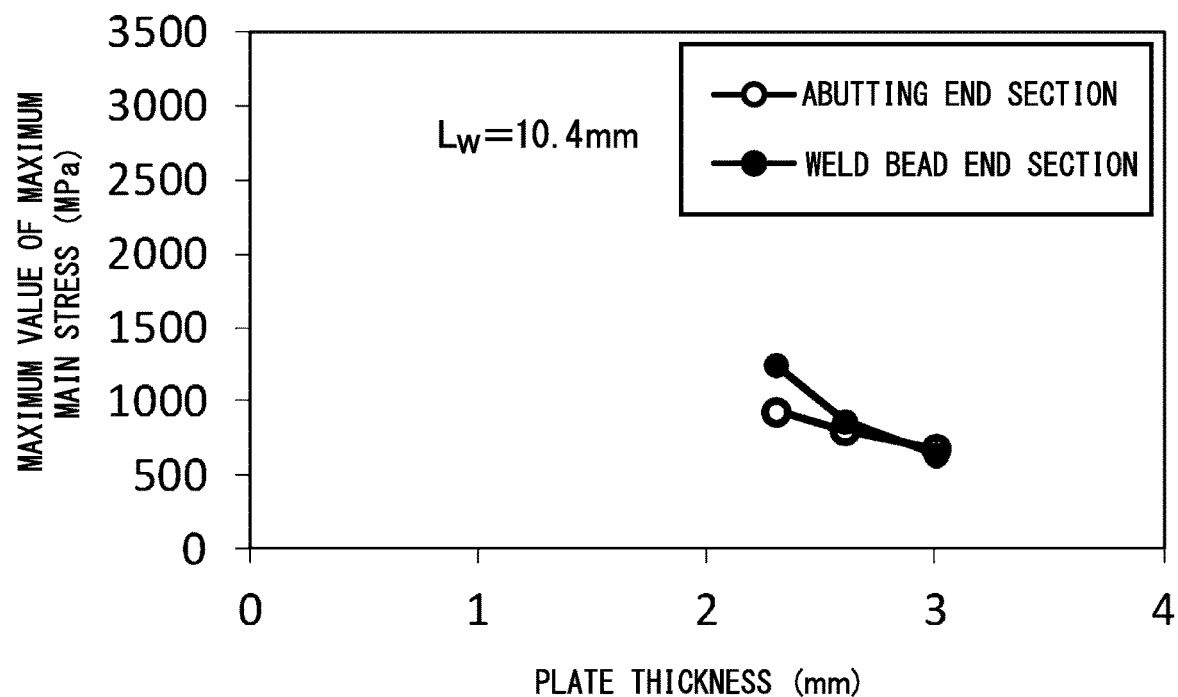
FIG. 20 is a graph illustrating a relationship between a plate thickness and the maximum value of the maximum main stress.
Figure 21:
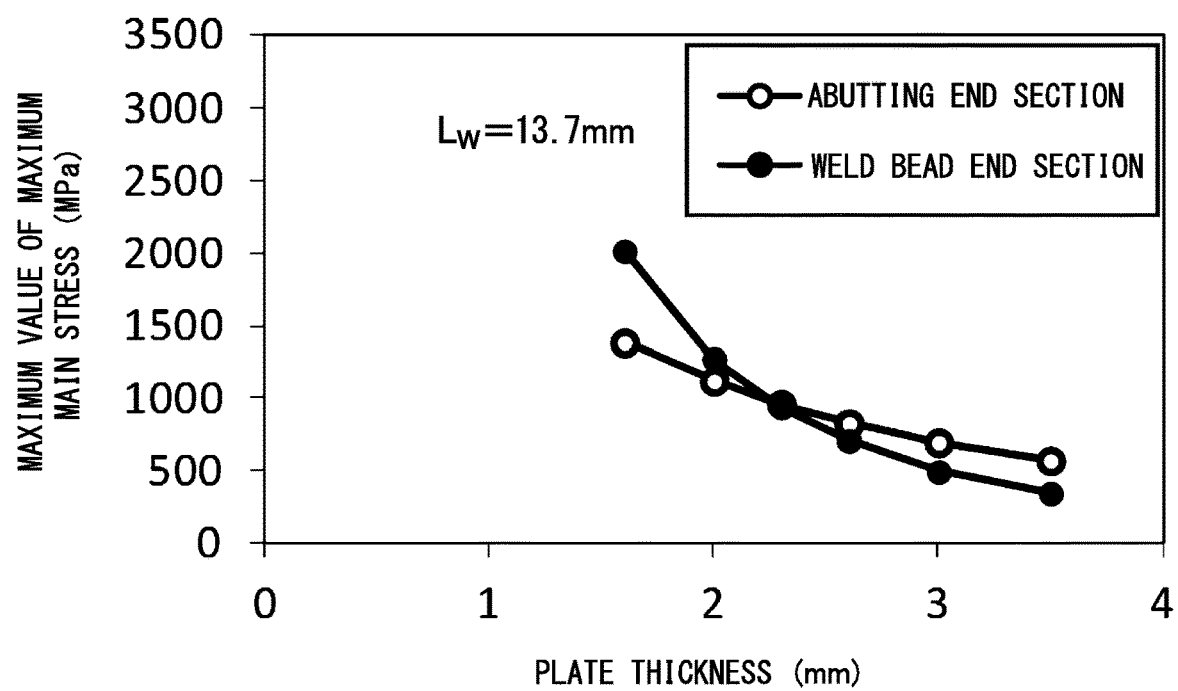
FIG. 21 is a graph illustrating a relationship between the plate thickness and the maximum value of the maximum main stress.
Figure 22:
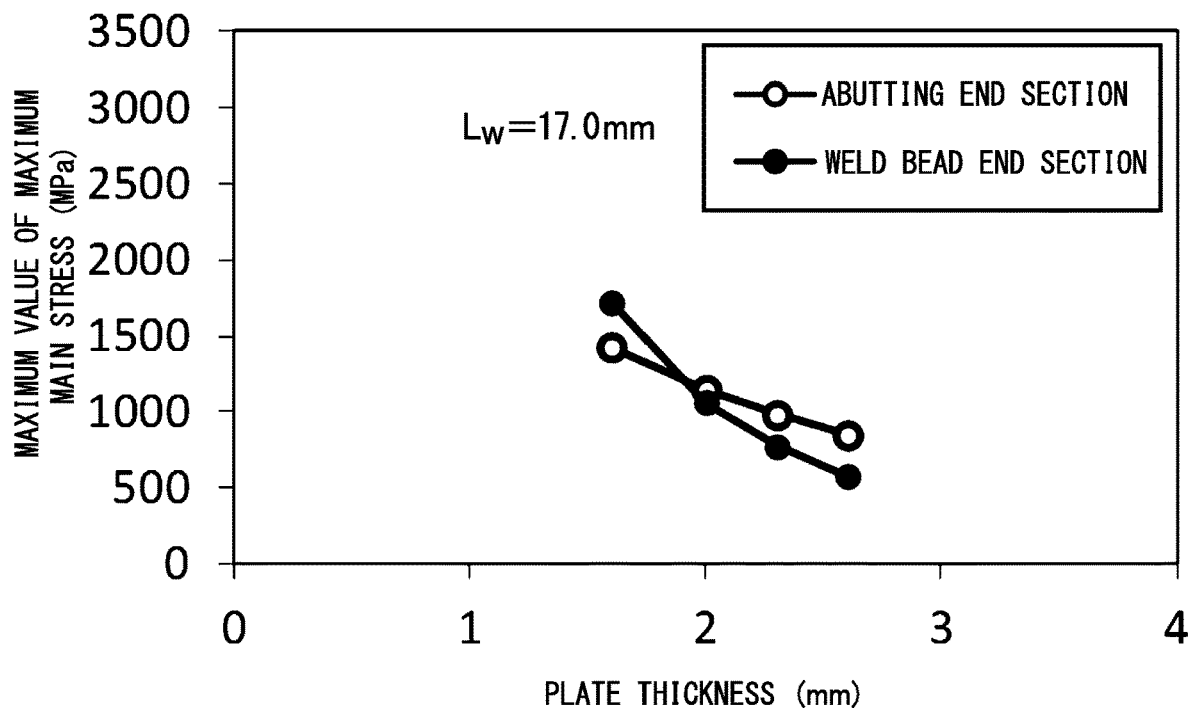
FIG. 22 is a graph illustrating a relationship between the plate thickness and the maximum value of the maximum main stress.
Figure 23:
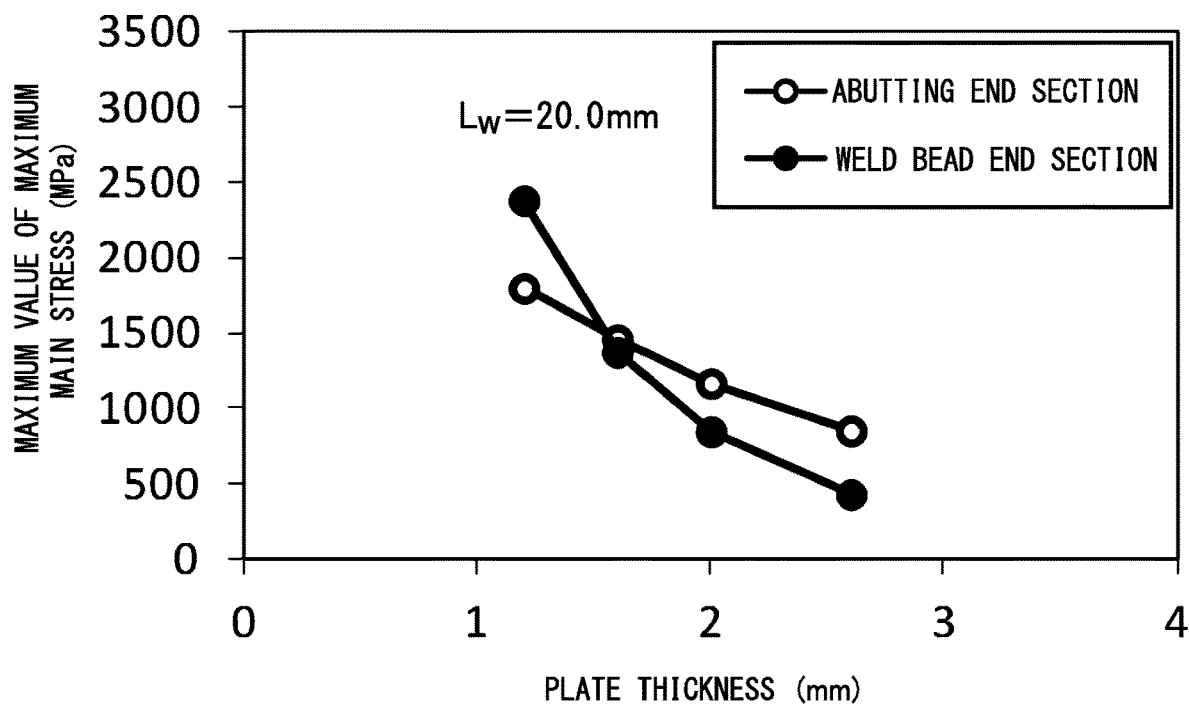
FIG. 23 is a graph illustrating a relationship between the plate thickness and the maximum value of the maximum main stress.

In addition, in consideration of 90% at which an improvement rate is further improved, as illustrated in FIG. 16D and FIG. 17D, both of the upper limit and the lower limit of the front end position of the weld overlay section are positive values. In addition, as illustrated in FIG. 18D and FIG. 19D, both of the upper limit and the lower limit of the rear end position of the weld overlay section are negative values. From this, in order for better improvement, it is preferable that the weld overlay sections 30a and 30b are disposed to cross the weld bead end sections 24a and 24b.

(Examination 5 Based on Simulation)

Hereinafter, a relationship between the maximum main stress which is generated in the vicinity of the abutting end sections 32a and 32b and the maximum main stress which is generated in the vicinity of weld bead end sections 24a and 24b in a case where the plate thickness of the base metal member 14 is changed will be described in detail along with a simulation result using a computer. In this simulation, an analysis model (hereinafter, also referred to as a fifth model) which had the same configuration as that of the welded structure member 10A illustrated in FIG. 1 to FIG. 4 but not included the weld overlay sections 30a and 30b was prepared, and the maximum main stress which was generated in the vicinity of the abutting end sections 32a and 32b and the maximum main stress which was generated in the vicinity of the weld bead end sections 24a and 24b were obtained.

Furthermore, in the fifth model, holes were formed in positions illustrated by the dotted circles 41a, 41b, 42a, 42b, 43a, 43b, 44a, 44b, 45a, and 45b in FIG. 1 and FIG. 2 (hereinafter, each of the holes illustrated by the dotted line will be referred to as a hole). In the simulation, a fixing jig (a rigid body) was disposed on each of the holes 42a, 42b, 43a, 43b, 44a, 44b, 45a, and 45b, and the base metal member 14 was fixed. Then, a columnar member (a rigid body) penetrated through the holes 41a and 41b, the plate-like section 121 (the joined metal member 12) was pulled in a direction perpendicular to the front surface 14a of the plate-like section 141 by a force of 2.0 kN through the member.

The configuration of the fifth model was defined as described below. Furthermore, as described above, plate thickness of the base metal member 14 was variously changed.

(Configuration of Analysis Model)

Joined Metal Member
  Material: Steel
  Thickness: 2.6 mm
  Height (Length in First Direction D1): 80 mm
  Length in Right-Left Direction (Second Direction D2): 70 mm
  Length in Front-Rear Direction (refer to FIG. 9): 80 mm
  Position of Hole 41a: Center of Side Wall Section 121a
  Position of Hole 41b: Center of Side Wall Section 121b
  Young's Modulus: 210,000 MPa
  Poisson's Ratio: 0.3

Base Metal Member
  Material: Steel
  Thickness: 1.2 mm, 1.6 mm, 2.0 mm, 2.3 mm, 2.6 mm, 3.0 mm, and 3.5 mm
  Height (Length in First Direction D1): 50 mm
  Length in Right-Left Direction (Second Direction D2): 300 mm
  Length in Front-Rear Direction (refer to FIG. 9): 150 mm
  Center-to-Center Distance between Holes 42a and 42b: 230 mm
  Center-to-Center Distance between Holes 43a and 43b: 230 mm
  Center-to-Center Distance between Holes 44a and 44b: 230 mm
  Center-to-Center Distance between Holes 45a and 45b: 230 mm
  Center-to-Center Distance between Holes 42a and 43a: 100 mm
  Center-to-Center Distance between Holes 42b and 43b: 100 mm
  Distance in Vertical Direction from Front Surface 14a to Center of Holes 44a, 44b, 45a, and 45b: 25 mm
  Young's Modulus: 210,000 MPa
  Poisson's Ratio: 0.3

Weld Bead
  Width (Width of Section Excluding Section Protruding from Abutting End Sections 32a and 32b (refer to FIG. 9) to Front): 4.3 mm
  Height (Height of Section Excluding Section Protruding from Abutting End Sections 32a and 32b to Front): 5.0 mm
  Width (Width of Section Protruding from Abutting End Sections 32a and 32b to Front): 10.6 mm
  Height (Height of Section Protruding from Abutting End Sections 32a and 32b to Front): 2.2 mm
  Protrusion Amount (Distance $L_W$) from Abutting End Sections 32a and 32b: 10.4 mm, 13.7 mm, 17.0 mm, and 20.0 mm
  Young's Modulus: 210,000 MPa
  Poisson's Ratio: 0.3

Figure 24:
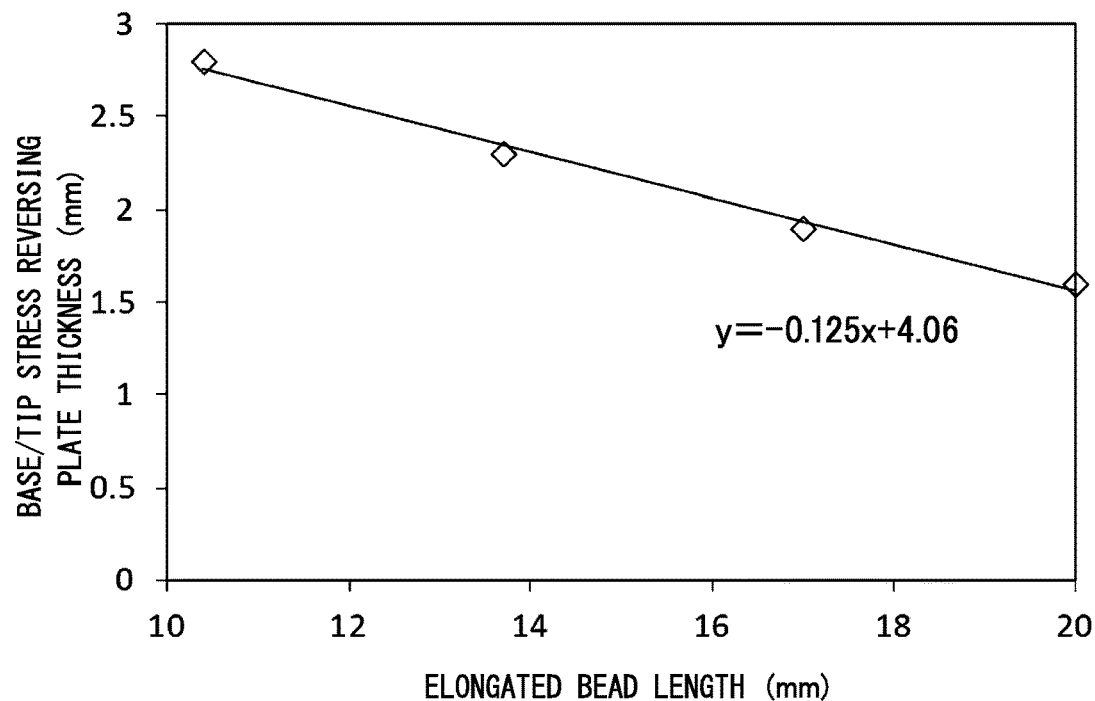
FIG. 24 is a graph illustrating a relationship between an elongated bead length (a separation distance $L_W$ between the abutting end section and the weld bead end section) and a base (the abutting end section)/a tip stress (the weld bead end section) reversing plate thickness.
Figure 25:
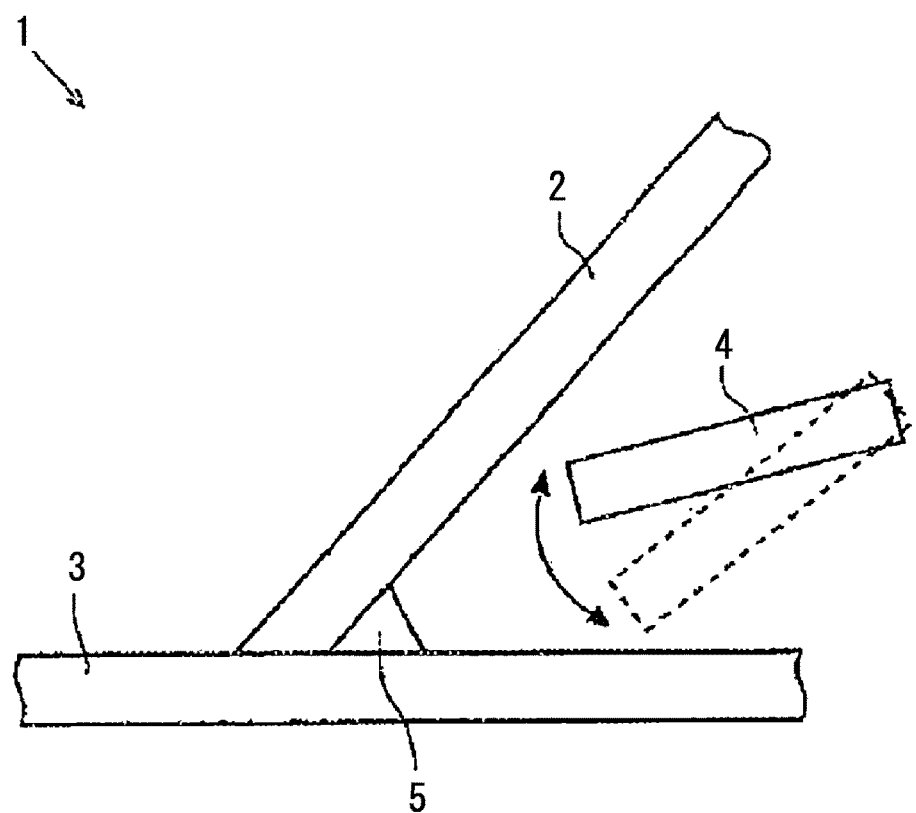
FIG. 25 is a diagram illustrating a T-joint of the related art.

In a case where the protrusion amount (the distance $L_W$) from the abutting end sections 32a and 32b of the weld bead is 10.4 mm, 13.7 mm, 17.0 mm, and 20.0 mm, the results of simulating the maximum main stress which is generated in the vicinity of the abutting end sections 32a and 32b and the maximum main stress which is generated in the vicinity of the weld bead end sections 24a and 24b at the time of changing the plate thickness of the base metal member 14 are shown in FIG. 20, FIG. 21, FIG. 22, and FIG. 23. It was known that a magnitude relationship between the maximum main stress which was generated in the vicinity of the abutting end sections 32a and 32b and the maximum main stress which was generated in the vicinity of the weld bead end sections 24a and 24b was correlated to the plate thickness and the protrusion amount (the distance $L_W$) from the abutting end sections 32a and 32b of the weld bead. Further, a relationship between the plate thickness of the base metal member 14 at which the maximum main stress which is generated in the vicinity of the abutting end sections 32a and 32b is coincident with the maximum main stress which is generated in the vicinity of the weld bead end sections 24a and 24b and the protrusion amount (the distance $L_W$) from the abutting end sections 32a and 32b of the weld bead is shown in FIG. 24. From FIG. 24, it was known that conditions where the maximum main stress which was generated in the vicinity of the abutting end sections 32a and 32b was coincident with the maximum main stress which was generated in the vicinity of the weld bead end sections 24a and 24b could satisfy Expression (C) described below of the plate thickness T (mm) of the base metal member 14.

$$-0.125L_W+4.06 \text{ mm}=T \text{ mm} \quad \text{Expression (C)}$$

From the results, it was known that in a case where a right member of Expression (C) was larger than a left member of Expression (C), the maximum main stress which was generated in the vicinity of the abutting end sections 32a and 32b was larger than the maximum main stress which was generated in the vicinity of the weld bead end sections 24a and 24b, and it was preferable that the weld overlay sections 30a and 30b were disposed in the vicinity of the abutting end sections 32a and 32b. In addition, it was known that in a case where the right member of Expression (C) was smaller than the left member of Expression (C), the maximum main stress which was generated in the vicinity of the weld bead end sections 24a and 24b was larger than the maximum main stress which was generated in the vicinity of the abutting end sections 32a and 32b, and it was preferable that the weld overlay sections 30a and 30b were disposed in the vicinity of the weld bead end sections 24a and 24b.

In particular, in a case where the value of the left member of Expression (C) described above is close to the value of the right member of Expression (C) described above, it is preferable that the weld overlay sections 30a and 30b are disposed in the vicinity of both of the weld bead end sections 24a and 24b and the abutting end sections 32a and 32b, and as a result of disposing the weld overlay section in the vicinity of the abutting end sections 32a and 32b where the maximum main stress is large even in a case where the value of the right member of Expression (C) described above is larger than the value of the left member of Expression (C) described above, the maximum main stress in the vicinity of the weld bead end sections 24a and 24b increases, and a reduction in the maximum main stress in the vicinity of the abutting end sections 32a and 32b becomes a countermeasure against improvement of the fatigue strength.

INDUSTRIAL APPLICABILITY

According to the present invention, it is possible to provide a configuration in which a fatigue strength can be easily improved in a welded structure member including a T-shaped joint portion.

BRIEF DESCRIPTION OF THE REFERENCE SYMBOLS 10A, 10N, 10B: WELDED STRUCTURE MEMBER
12: JOINED METAL MEMBER
121: PLATE-LIKE SECTION
121a, 121b: SIDE WALL SECTION
121c: BOTTOM WALL SECTION
14: BASE METAL MEMBER
14a: FRONT SURFACE (FIRST SURFACE)
14b: REAR SURFACE (SECOND SURFACE)
141: PLATE-LIKE SECTION
141a, 141b: SIDE WALL SECTION
141c: TOP PLATE SECTION
24: WELD BEAD
24a, 24b: WELD BEAD END SECTION
241a, 241b: SIDE WALL BEAD SECTION
241c: BOTTOM WALL BEAD SECTION
30a, 30b: WELD OVERLAY SECTION
32: ABUTTING SURFACE
32a, 32b: ABUTTING END SECTION
322a, 322b: ABUTTING SIDE SURFACE
322c: ABUTTING BOTTOM SURFACE

The invention claimed is:

1. A welded structure member, comprising:
a base metal member including a first surface and a second surface;
a joined metal member including an abutting surface of which an end surface abuts onto the first surface;
a weld bead which is formed on the first surface, and joins the joined metal member to the base metal member; and
a weld overlay section which is formed on the second surface of the base metal member, and is formed into a shape of a line such that the weld overlay section overlaps at least one of the abutting surface and the weld bead, in the view of facing the second surface and of penetrating through the base metal member,
wherein when a direction from an abutting end section which is an end section of the abutting surface towards a direction in which the abutting surface exists is set to the rear, and the opposite direction thereof is set to the front, the weld bead includes a weld bead end section in a position which is separated to the front of the abutting end section.

2. The welded structure member according to claim 1, wherein the weld overlay section is disposed over a position which is separated from the abutting end section to the rear by 1.9 mm to 7.0 mm, in the view of facing the second surface and of penetrating through the base metal member.

3. The welded structure member according to claim 2, wherein a front end of the weld overlay section is positioned from the abutting end section to the front, and a rear end of the weld overlay section is positioned from the abutting end section to the rear, in the view of facing the second surface and of penetrating through the base metal member.

4. The welded structure member according to claim 2, wherein the weld overlay section is parallel to the abutting surface, in the view of facing the second surface and of penetrating through the base metal member.

5. The welded structure member according to claim 2, wherein a separation distance Lw between the abutting end section and the weld bead end section, and a plate thickness T of the base metal member are such that:

$$-0.125Lw+4.06 \text{ mm} \leq T \leq 4.5 \text{ mm}.$$

6. The welded structure member according to claim 2, wherein a length of the weld overlay section is greater than or equal to 10.0 mm.

7. The welded structure member according to claim 1, wherein the weld overlay section is disposed over a position which is separated from the weld bead end section to the rear by 0.1 mm to 3.0 mm, in the view of facing the second surface and of penetrating through the base metal member.

8. The welded structure member according to claim 7, wherein a front end of the weld overlay section is positioned from the weld bead end section to the front, and a rear end of the weld overlay section is positioned from the weld bead end section to the rear, in the view of facing the second surface and of penetrating through the base metal member.

9. The welded structure member according to claim 7, wherein the weld overlay section is parallel to the weld bead, in the view of facing the second surface and of penetrating through the base metal member.

10. The welded structure member according to claim 7, wherein a separation distance Lw between the abutting end section and the weld bead end section, and a plate thickness T of the base metal member are such that:

$$0.8 \text{ mm} \leq T \leq -0.125 Lw + 4.06 \text{ mm}.$$

11. The welded structure member according to claim 7, wherein a length of the weld overlay section is greater than or equal to 6.0 mm.

12. The welded structure member according to claim 1, wherein a height of the weld overlay section from the second surface is 2.0 mm to 20.0 mm.

13. The welded structure member according to claim 1, wherein the weld overlay section is a weld overlay bead which is not involved in the joint between the base metal member and the other member.

14. The welded structure member according to claim 1, wherein the weld overlay section is formed to enter the base metal member.

15. The welded structure member according to claim 1, wherein the weld bead does not penetrate through the base metal member.

16. The welded structure member according to claim 1, wherein the base metal member is a steel sheet having a tensile strength of greater than or equal to 270 MPa.

17. A method of manufacturing the welded structure member according to claim 1, the method comprising:
   a weld bead applying step of applying a weld bead which joins the first surface of the base metal member to the end surface of the joined metal member by the abutting surface; and
   a weld overlay section applying step of applying the weld overlay section onto the second surface of the base metal member by arc welding or brazing, before the weld bead applying step or after the weld bead applying step.

* * * * *